United States Patent [19]

Rossides

[11] Patent Number: 5,749,785

[45] Date of Patent: May 12, 1998

[54] COMMUNICATIONS SYSTEM USING BETS

[76] Inventor: Michael T. Rossides, 3666 Upton St., N.W., Wash., D.C. 20008

[21] Appl. No.: 569,883

[22] Filed: Dec. 8, 1995

Related U.S. Application Data

[63] Continuation-in-part of Ser. No. 309,677, Sep. 21, 1994, Pat. No. 5,575,474, and Ser. No. 547,503, Oct. 24, 1995, abandoned.

[51] Int. Cl.⁶ .................................................. A63F 9/22
[52] U.S. Cl. ............................................................ 463/25
[58] Field of Search ........................... 463/42, 41, 40, 463/26, 25, 16, 17, 18; 364/410, 412

[56] References Cited

U.S. PATENT DOCUMENTS

| 4,669,730 | 6/1987 | Small ................................ 463/42 X |
| 4,922,522 | 5/1990 | Scanlon .............................. 463/42 X |
| 5,415,416 | 5/1995 | Scagnelli et al. ..................... 463/41 X |

*Primary Examiner*—Jessica Harrison
*Assistant Examiner*—Michael O'Neill

[57] ABSTRACT

A computer system that allows people to place, accept and settle bets for the purpose of communicating. The system cuts out the middleman, sometimes referred to as the bookmaker, allowing bettors to bet with each other directly. In addition to allowing people to place, accept and settle bets, the system enables people to settle disputes and change bets. It also allows people to place special types of bets for the purpose of demonstrating probability and quantity estimates. The system also allows people to to link bets to ordinary statements that are also entered into the system.

1 Claim, 17 Drawing Sheets 5,749,785

1

COMMUNICATIONS SYSTEM USING BETS

CROSS REFERENCE

This application is a continuation-in-part of application Ser. Nos. 08/309,677 filing date Sep. 21, 1994 now U.S. Pat. No. 5,575,474 and Ser. No. 08/547,503, filing date Oct. 24, 1995 now abandoned.

BACKGROUND

1. Field of the Invention

This invention relates to a system for storing, displaying, modifying and executing bet backed statements.

2. The Prior Art

The main prior art is application Ser. No. 08/309,677, called the parent. This application is an extension of application Ser. No. 08/547,503. For the discussion of prior art, we will consider this application and application Ser. No. 08/547,503 as one. Together these applications disclose new matter that adds features to the invention of the parent.

This application is divided into parts I and II. The new matter is disclosed in Part II where there is also an overview explaining the relation of the new matter to the old. There are a few minor changes in Part I, but they are elaborations and corrections, rather than new matter. Below we repeat, with minor changes, the discussion of the prior art that was in the parent. While this discussion does not make much mention of the new matter, of course, it still serves to explain the major differences between the invention and prior systems for transacting bets.

Betting has been around for thousands of years and computer systems that enable betting have been around for decades. However, people have not appreciated the use of bets for the purpose of communicating. Previous computer systems for handling bets have not allowed the efficient use of bets as communications tools.

The invention disclosed is therefore novel. It is a computer system that enables the easy use of bets for the purpose of communicating. For example, it cuts out the "house" and allows people to bet directly with each other. But, here is not the place to summarize the invention. The main point is that it approaches bets differently than they have been in the past. The essay below explains the point of view that the invention exploits. After the introductory essay we will go into the description.

Major Invention Unappreciated

Most people think of betting as either a form of entertainment or as a vice, something mostly associated with games like football, cards and dice. Nothing especially important, except in that it might pose a threat to some people. History has shown though that there is a lot more to betting on games than meets the eye. It was the study of a dice game bet that led to the discovery of mathematical probability, a branch of math that has become a central part of science, technology and the way we look at the world.

It is remarkable that a science which began with the consideration of games of chance should have become the most important object of human knowledge.

Pierre Simon de LaPlace, *Theorie Analytique des Probabilites*

Amazingly, though gambling had been practiced for around 4,000 years, probability was overlooked mathematically until 1654. It was then that a French diceplayer and man-of-the-court, Antoine Gombauld, the Chevalier de Mere, asked Blaise Pascal what the proper bet was in a popular game of dice. Pascal examined Gombauld's question and wrote Pierre de Fermat about it. In a series of letters, Pascal and Fermat analyzed this question and related ones, and in so doing laid the foundations of the mathematics of probability. (About a hundred years before, Girolamo Cardano covered some of the same ground but his work, Book of Dice Games, was not published until 1663).

Thus the analysis of dice bets revealed general principles of uncertainty—the laws of probability—that apply to much of our thinking about the real world. How could so much be found in such a trivial pursuit as betting on dice? Well, what applies to "trivial" examples can sometimes apply to a very broad range of things. For example, the law of gravity that applied to Newton's apple also applies to the moon and to all matter, as far as we know. In a similar way, what applies to thinking about dice bets also applies to thinking about a very broad range of things. And consequently, the laws of mathematical probability have been developed into an extremely useful set of tools. They have been used to construct many disciplines: statistics, risk analysis, and information theory, to name a few.

Betting itself however was left to the gamblers, essentially unused. Though the math of it was worked out in detail, the activity was still considered a vice, dangerous enough to be outlawed for the most part. And that is ironic, for there was still a lot more to this vice than met the eye.

How so? Well, vice type bets share with all bets the same basic set of rules. These rules create a general contest, the bet, that tests the accuracy of people's thinking about uncertainty. More precisely, the bet tests the accuracy of people's probability estimates. The contest can be used to test estimates concerning dice games, card games, horse races and other "trivial" pursuits. But it can also test the accuracy of probability estimates concerning a very broad range of subjects. Indeed, the bet, like the laws of probability, can be used in many fields.

The Rules of the Bet

No one has ever given a crisp definition of the term "bet" and no one will. It is a word that has come to cover so many activities that we can no longer restrict it to certain well defined situations that everyone agrees upon. In this application, we will define a bet as what people think of usually, while realizing that this definition will not cover all possible types of bets. In a this application a bet is an agreement between two people who agree on:

a. A bet statement that can be found true or false.

b. A probability statement (ratio), called the payoff odds, that tells the proportions of how much the person betting on True has to risk compared to how much the person betting on False has to risk.

c. The amounts of money (or other commodity) each party has at risk.

d. The sides of the bet that each party picks, such that if the bet statement is true, the person who picked True wins and vice versa if the statement is false.

(Note, as discussed in Part I briefly, and more extensively in Part II, there are other kinds of useful bet agreements—such as guarantees and quantity bets—that the system disclosed can enable users to transact. So the definition of bet above is not comprehensive enough).

A Fundamental Form of Expression

This agreement is a form of expression. That can be seen in the rules above where the whole point is to make probability statements and then back them up with money. It can also be seen in the well known phrase, "Put your money where your mouth is," which in the case of a bet means something along the lines of, "If you really believe what you're saying, you will take the chance of losing money if you are wrong in exchange for the chance of making money if you are right."

In fact, the bet is a unique and fundamental form of expression in which people express probability estimates. What makes this type of speech special is that certain kinds of faking are forbidden and others are penalized. In a bet, a person cannot fake knowledge with vagueness, for vagueness is not allowed. And in a bet, a person believes he will be penalized, on average, for giving an overly optimistic estimate of his chance of winning. And in a bet where he sets the odds but lets the other person pick the side, he believes he cannot give and overly optimistic or pessimistic estimate of either side winning, just his best estimate. Here is not the place to go into details but an example will demonstrate.

Assume UCLA and Kentucky are two college basketball teams that most bettors agree are evenly matched. And assume that some Senator is a big fan of his old college team, UCLA. And finally, assume he says, "UCLA is ten times better than Kentucky. We're going to blow Kentucky out this Sunday."

And so a skeptical constituent says, "You wanna bet, Mr. Senator?. Please lay some odds on Sunday's game." Notice that vague statements such as "ten times better" and "blow out" are forbidden in a bet. They become a statement that can be found true or false. ("UCLA will beat Kentucky this Sunday") along with a probability statement as to whether the statement is true.

We presume that the Senator in reality thinks that the teams are evenly matched and further that he does not want to lose money. If he sets odds of UCLA above 50%, he believes that he will lose money, on average. Therefore, the bet forces him to set the odds at 50% (or less). In other words, the bet forces him to admit that UCLA is no better than Kentucky.

What if he tries to be falsely pessimistic for the sake of money and claim that UCLA is worse than Kentucky? In this case, he would set the odds of UCLA winning at less than 50% and he would want to bet on UCLA. He would be getting the odds of an underdog even though the teams would be evenly matched. Well in this case the constituent can say, "You set the odds, Mr. Senator, but I'll pick the side." Now the Senator is stuck. If he unreasonably favors either team, the constituent will pick the profitable side.

The moral of the story is that a person who wants to win money in a bet cannot make a falsely optimistic probability statement that the side he is betting on will win. And if he lets the other person pick the side of the bet, he cannot be falsely optimistic about either side winning; the odds must be his best estimate of the chances each side has of winning.

Contest for Pitting Estimates

The bet is more than a contest that penalizes overly optimistic probability statements though, it is the general contest that allows two people to pit their probability estimates in a fair way. In a bet, the estimates are usually not out in the open but are indicated by the side of the bet that each person chooses. The person who has the better estimate will, on average, win money (or whatever is being risked in the bet). Therefore, a person engaging in a bet cannot fake that he knows more than his opponent about the statement being bet on.

This contest would be just an interesting game except that good probability estimates are a fundamental, though usually hidden, part of useful knowledge. By extension they are a fundamental part of reliable communication and good decision making as well. Because the bet can make people more honest about probability estimates, and because, over the long run, it gives a concrete measure of the accuracy of people's estimates, it is far more than an entertainment device; it is a profound invention.

A New Communications Medium

For people to be able to engage in this contest most efficiently, a new medium is needed. Executing bets requires more than just putting them in print. The full execution involves storing statements, setting terms, committing money, getting acceptance of the terms, deciding whether the statements are true, transferring money, settling disputes if necessary, and more. A medium is needed not only to execute bet but to record results, tally winnings and losses, transfer funds, stores and display bets along with other statements supported by bets.

Moreover, when used for communication, bets would usually support an ordinary statement: an article, a report, an ad, an editorial, etc. The bets would support certain points in these conventional statements. And so, the new medium should allow users to also enter conventional statements and link those statements to the supporting bets.

Legal?

Whether cash bets are banned or not, people will still be able to make bets because people can bet points. These can be called Credibility Points (CP's). These are legal to bet because they are free. They do not replace money because they are nontransferable. Money remains indispensable in many betting situations because it gives a unique incentive to win. Still, CP's can serve equally well in other situations and have the advantage of allowing anyone to bet regardless of financial situation. And so, this new medium would allow people to bet cash (if legal) and/or CP's.

Uses and Consequences

What are the possible uses and consequences of enabling people to bet routinely on all kinds of matters? That's hard to say. To see why, consider the printing press. It improved one of our basic activities, communicating, which means that the printing press has had far too many uses and consequences to summarize or even understand. While it's ridiculous to say that Bet Press and the Bet Central will have a comparable impact, the point is that they can have large and diverse effects because bets can improve several basic activities. How so? Well, bets can force people to be honest about what they know. That can improve communicating, discovering, thinking, deciding and doing.

SUMMARY

The bet has always been thought of as a form of entertainment or a vice. However, it is actually a fundamental method for keeping people honest. Bets can be used by people who want to demonstrate honesty by showing that they are willing to "put their money where their mouths are." Bets can also be used by people who want to challenge the statements of others by saying, basically, "You wanna bet."

We can devise a computer system that allows people to use bets efficiently in these ways, allowing people to place, accept and settle bets for the purpose of communicating. The system cuts out the middleman, sometimes referred to as the bookmaker or the house, enabling bettors to bet with each other directly. The system allows people to post bets, to accept bets, to change bets, to settle the bets, and to settle disputes. It also allows people to place special types of bets for the purpose of demonstrating probability and quantity estimates different from the estimates expressed in odds and quantity offers.

A bet used for communication can stand alone or can go along with another statement, which we will call a supported statement. The system disclosed allows people to link bets with corresponding supported statements.

DESCRIPTION

Part I

Overview to Part I

Figure 1A:
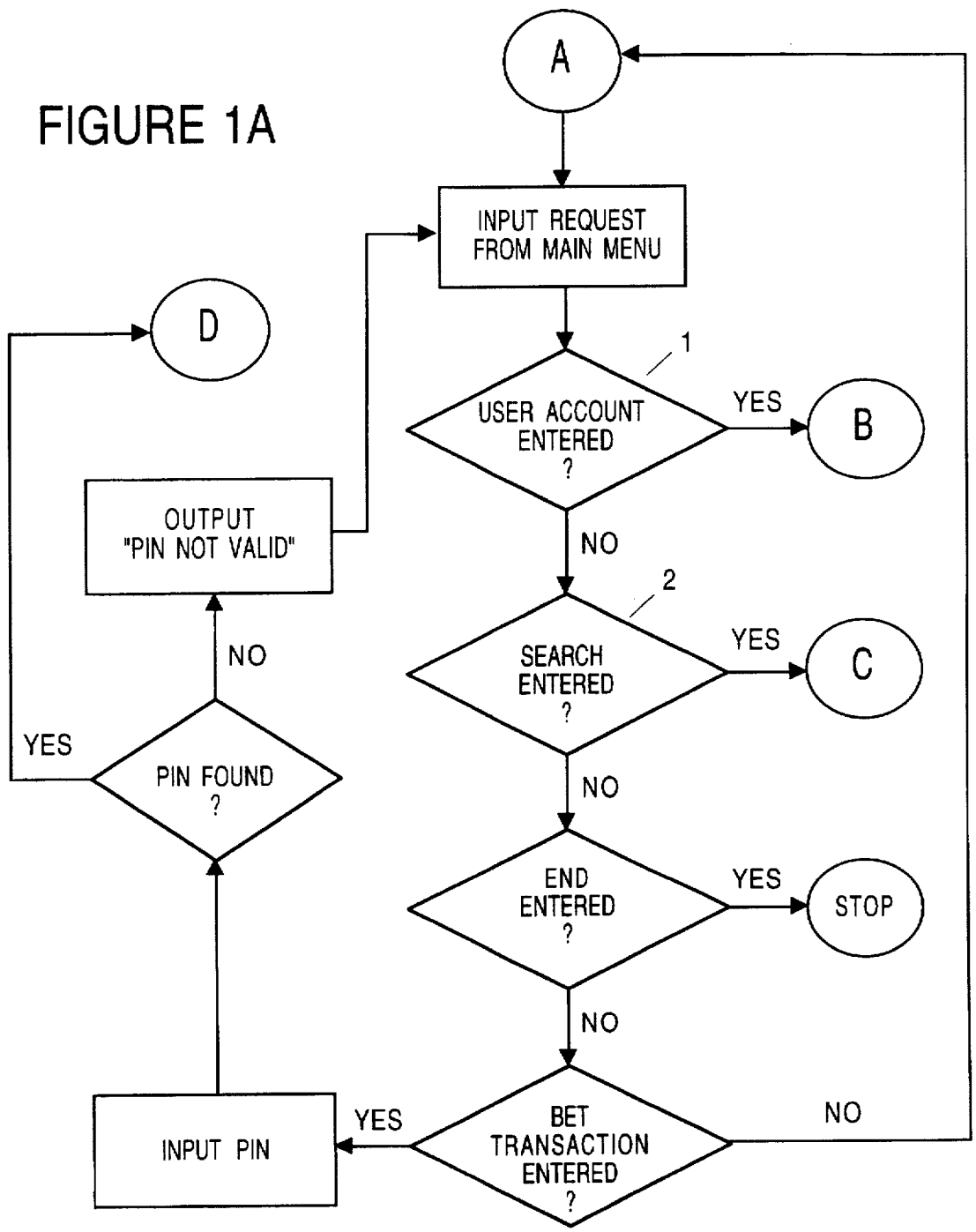
FIGS. 1a and 1b show a flowchart of the CSUB Main Menu.

The invention, a Communications System Using Bets (CSUB), is a special kind of data-base system that enables people to display, find, place, accept, settle, and record bets. The bets are made and shown for the purpose of expressing probability estimates in the honest, "put your money where your mouth is," way that only bets allow. Since honest probability estimates can be helpful for good communication, bets by themselves and attached to other statements can improve communication.

The description of the CSUB is divided into several sections for clarity's sake. The features described are meant to be combined in a system. However, not all the features are essential, so it is possible to leave out features that are deemed superfluous in a given implementation of the invention.

Section 1 is by far the longest and describes the basic system. The basic system enables people to transact the most familiar type of bet, which we will call a straight bet. The point is not to focus on this type of bet but to show the basic system for placing, accepting and settling bets.

In addition to straight bets, other types of bets can be useful for expressing probability estimates. Sections 2 and 3 describe how the system enables people to transact two of these bets, which we will call actual odds bets and range bets.

Section 4 describes how the system allows users to explicitly build an expected profit margin into the payoff odds of the three types of bets.

While the CSUB can be implemented as just a system for transacting bets, its preferred embodiment is as a more versatile communications system where bets can be linked to other statements that are not bets. We will call these other statements, supported statements. For example, a person can make a long argument about why inflation will rise and then make a bet supporting that long argument. The long argument though is not a bet. Section 5 describes how the system enables users to link bets and supported statements.

Section 6 describes a variety of other important features that the CSUB can include.

In the description, steps of the invention that are obvious and add nothing are omitted. For example, we will assume that the system usually gives users prompts before the users input information. A prompt might be something like, "Enter bet statement now." Since most prompts are obvious, they are usually omitted.

As mentioned, the first section will explain the basic system and the other sections will add to it. When additional features are explained, we will usually not repeat steps that have already been given. We will mainly show differences between bet paths and take common steps, such as verifying the user and inputting the bet statement, to be understood. Some steps, however, will be repeated for clarity's sake.

This description and drawings make no pretense at being either the most efficient method of programming, or the best way to present users with options; the goal is to describe the key steps and functions of a CSUB. In many cases steps have been described that may be omitted in a given implementation of the CSUB. The description simply lays out the principles of the present invention. Numerous modifications and adaptations thereof will be readily apparent to those skilled in the art without departing from the spirit and scope of the present invention.

We begin with some definitions. More definitions will be supplied as needed.

Some Definitions

A Bet

A bet is an agreement entered into by two or more parties. For simplicity, we will consider bets between two parties. A bet agreement has four parts:

a. The Bet Statement

A bet statement is a statement that is designed to be found true or false. The statement can be practically any length from two words to several volumes. (A bet statement will often be fairly lengthy because it can include explicit definitions for deciding how to determine if the statement is true or false).

b. The Sides

A bet has two sides, True and False. One party takes (bets on) True and the other takes (bets on) False. If the bet statement is found to be true then the party that bet on True wins. If the statement is found to be false then the party that bet on False wins.

c. The Stakes

In a bet each party puts an amount of something at risk. The amounts are called the stakes. The party that loses agrees to pay his/her stake to the party that wins. We will consider only bets where people risk things that can be counted in integer units, such as money, toothpicks, chips, or points. Furthermore, we will only consider bets where people risk identical things. Thus, for example, people can risk money against money and toothpicks against toothpicks but not money against toothpicks.

d. The Payoff Odds

The pay-odds are the proportion of the stakes risked in a bet. By convention, a convention we will follow, the odds are usually written in the form X–Y, where X represents the amount risked by the person who bets on False while Y represents the amount risked by the person who bets on True.

Payoff odds can be stated in other ways though. In fact, the system disclosed makes it easy for bettors to state the payoff odds in terms of percentages. Thus, a bettor can state the payoff odds as a percentage, p, that the statement is true. This form is then converted into a conventional payoff odds figure, X-Y. The formulas for converting payoff odds to percentages and vice versa are well known. For example, p of True=$Y/(X+Y)$. Thus, if the odds are 1—1 then p=$1/(1+1)$=50%. If the odds are 3-2 then p=$2/(3+2)$=40%.

The system can also enable users to state the payoff odds as a fraction—$Y/(X+Y)$ for True or $X/(X+Y)$ for False- which the system then converts into a conventional payoff odds figure. Bettors may prefer to state probability this way. It is more natural for some people to say that the payoff odds for True are ⅓ rather than 2-1, or that the payoff odds for False are ⅔ rather than 1-2. We do not show the system converting fraction figures into X-Y form, but note that it is easily done.

We will also adopt the convention that when the payoff odds are given in percentage form, the percentage, p, will be the probability that the statement is true. 1-p will be the probability that the statement is false. However, we do this just for simplicity. In practice, the system can allow users to enter a percentage figure for either side. For instance, a person could enter False at 30%. This could mean that the odds are 30% that the statement is true and 70% that the statement is false. Or it could mean that the odds are 30% that the statement is false and 70% that it is true. It depends on the convention used. Because of the possible confusion, we will try to stick with interpreting a payoff odds figure as the probability that the statement is true, which is converted to (1-p)-p in X-Y form.

(Notes on terminology: When we say payoff odds of p, we mean that the payoff odds for True and False are p. The reader must do the conversion to X-Y form. In the parent and grandparent applications, it was said that a user might bet on True at p and False at 1-p. In this application we try to consistently use p as the probability of true, and p as the payoff odds for True and False. These are two different senses of the term, though they can also be thought of as being equivalent.

Sometime we will use the term the payoff for True is, say, 1-2, or the term True is paying 1-2. The payoff and is paying are also equivalent to the payoff odds figure, but unfortunately, we do not interpret them consistently from the point of view of True. We also say, for example, that the payoff for False is 1-2 or that False is paying 1-2. So these terms should not be thought of exactly as a payoff odds. For example, payoff odds of 2-1 mean that True is paying 2-1 while False is paying 1-2).

(Note also: The term "odds" itself is confusing because people use it to refer to two very different concepts. One is the controversial, perhaps metaphysical, concept of actual odds or actual probability. The other is a mechanical, concrete concept of payoff odds. What is even more confusing is that the payoff odds can be interpreted to indicate what a bettor thinks the actual odds are. That, in fact, is a key object of the invention, to allow people to express through the payoff odds what they think about the actual odds. We do not really clear up this confusion but note that for the CSUB the odds are a mechanical concept. How we interpret them is metaphysical).

An Example of a Bet

| Bet Statement: | The consumer price index will rise ar over 2% in 1995, according to the U.S. Commerce Department. |
| --- | --- |
| Odds: | 3-1, 25% |
| Side Picked: | True |
| Stake: | $100 |

The Result

The Result of a bet is what each party determines about the truth or falsity of the bet statement. A party can report one of the following results:

a. True: The statement is found true.

b. False: The statement is found false.

c. Undecided: The statement is found neither true nor false. (For convenience, we take undecided to mean both undecided and undecidable).

Disputed Result

A disputed result means that one party finds that the statement is true or false or undecided and the other party disagrees.

Place a Bet

To place a bet means to offer a bet agreement. The party that does this is called the Placer.

Accept a Bet

To accept a bet means to accept the offer of a bet agreement. The party that does this is called the Acceptor.

Section 1

The Basic CSUB

Introduction

Form of the Invention

The CSUB is a computer system—including input/output means, memory means, processing means, and a program— that enables users to place, find, accept, change, settle, and record bets.

The system is a network of terminals connected to a central data-base unit. The terminals can be of various types such as PC's, telephones and textphones. Users enter data and requests through the terminals and receive responses from the central data-base unit. Users might also call human operators who use terminals to mediate between callers and the central data-base. By central data-base unit we mean that users communicate with the same body of data. The data may actually be located in multiple servers rather than in a single machine in a single location.

1A. Selecting a Transaction

Figure 1B:
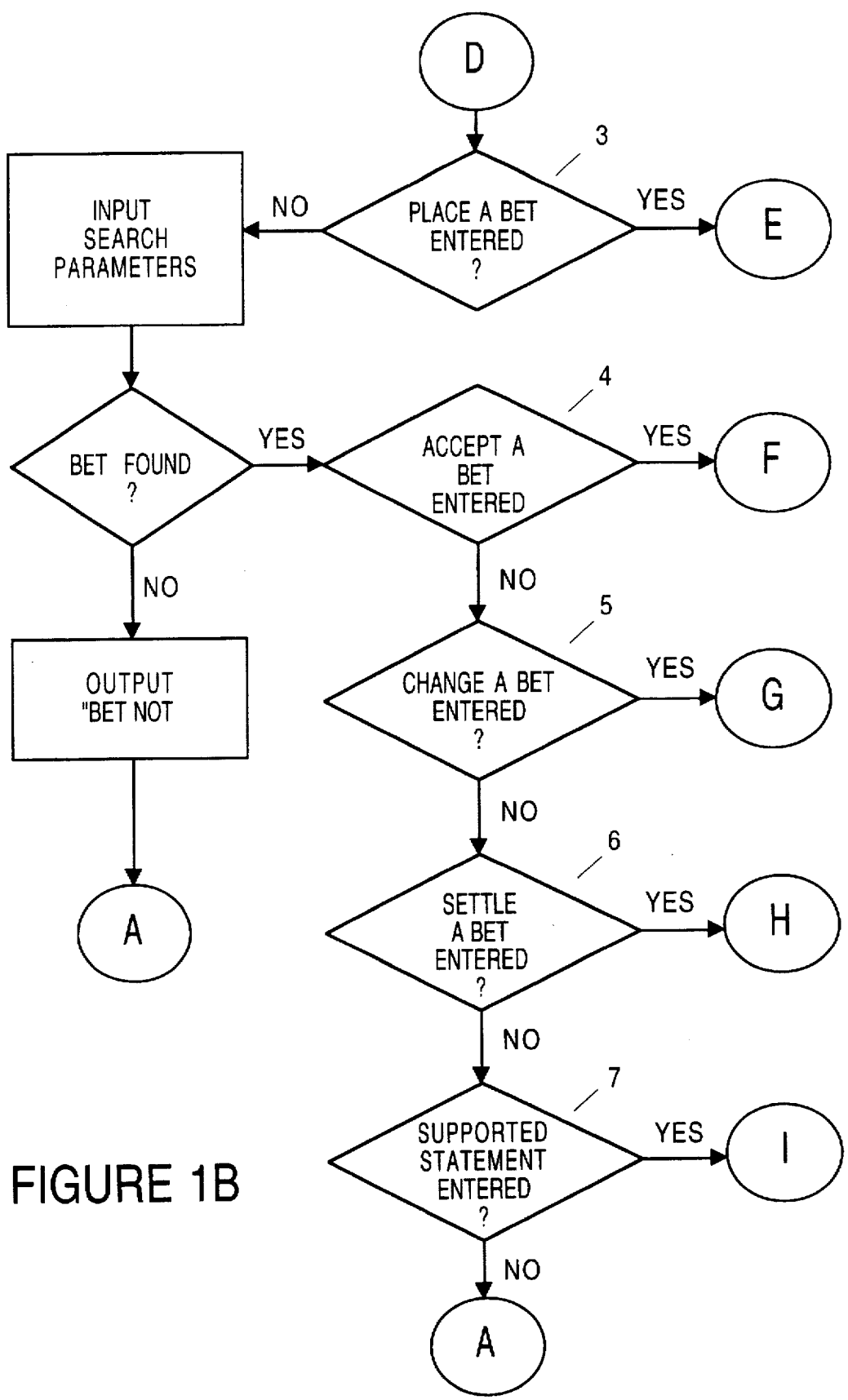

As shown in FIGS. 1a and 1b, the CSUB program includes steps for allowing users to select from several requests. We will call the list of requests the "main menu." It includes the following request options which we will also call modes (the term mode is not meant to have special technical meaning ): user account 1, searching 2, placing a bet 3, accepting a bet 4, changing a bet 5, and settling a bet 6. FIG. 1b also shows an option to enter a supported statement 7.

1B. Establishing and Accessing a User Account

The CSUB is a system to be used by a community of people. With it people can, as mentioned, place, accept, change and settle bets. For these transactions, and certain others, the system needs to identify users. And the identity of users needs to be verified. Therefore, the CSUB creates a record, also called an account, for new users. The system also issues user passcodes to correspond to these accounts.

(In a given CSUB, passcodes can be whatever user authentication information is most suitable, such as passwords, voice prints, or other known means. We will use the term PIN to represent all passcodes).

The CSUB can store various pieces of useful information in the users record. A list of useful information follows. A given implementation of the CSUB may or may not store all the information in this list. (Also note, the list below is not exhaustive and the user's record could include other information).

A User's Name can be Stored

A user's contact data (such as E-mail address, regular mail address, voice number, fax number) can be stored. This information enables the CSUB to send the user a message when necessary, especially a message alerting a user as to the status of her bet(s). Without this alerting step, which is described later, a user would have to keep checking the system to learn the status of her bets. Indeed, the CSUB can include an E-mailbox or voicebox for each user to which the system sends information updating the status of bets. Users can then check their personal boxes periodically rather than checking all their bets.

A user's billing data (such as a credit card number) can be stored. This information obviously enables the CSUB to bill users.

A user's credit/debit data for bets can be stored. This information allows the CSUB to credit winners and debit losers when bets are settled and tell users how much money or other commodity they have in their account.

A user's bets and bet results can be stored. This information enables the CSUB to compile a history of a user's bets and statistics on the user's performance.

Figure 2:
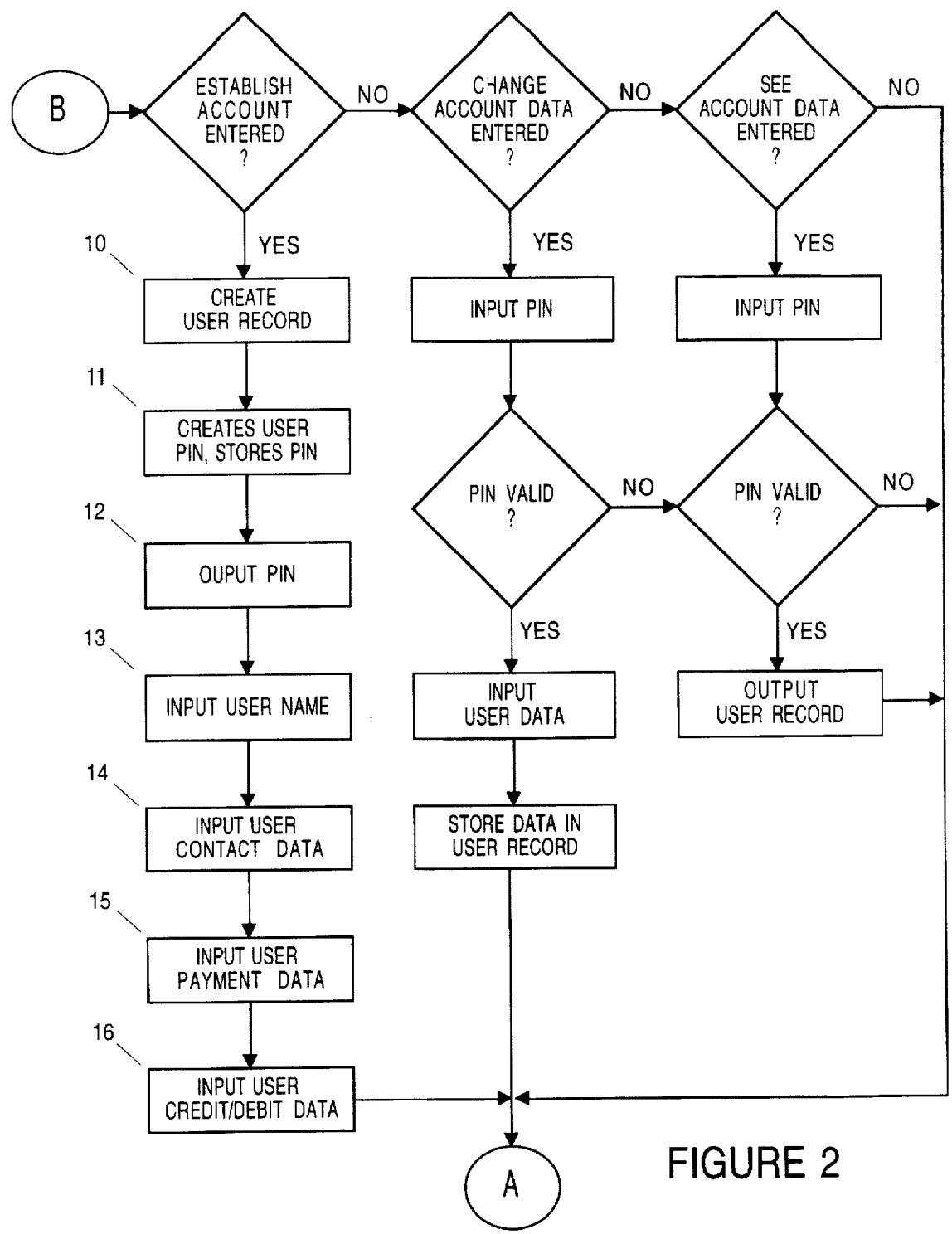
FIG. 2 shows a flowchart of the User Account mode.

Thus, as shown in FIG. 2, the CSUB program includes the following steps, for storing user data:

creates a user record 10 for identification data, contact data, billing data, credit/debit data, bet data, and bet result data, creates a user PIN and stores it 11 in user's record, outputs PIN 12 to user, inputs and stores user's name 13, contact 14, billing 15, and credit/debit 16 data.

There is no sense in compiling a user record if no one is going to access it. Naturally then, a CSUB includes means for enabling user's to access their records and change certain data in them if necessary. For example, a user might want to change his contact number or might want to deposit money in his account.

Depending on the rules of the particular CSUB, the system can restrict access to a user's account by PIN or can allow unrestricted searches of people's records. In a CSUB, it is very useful to allow others to see one's records in bets so that people can judge one's performance. Hence, a user might be able to authorize others to search her record and call up statistics created from her record. The authorization could be by a different passcode that could be valid for a given period of time. The point though is not to describe various possible ways that a user's records can be accessed. These are well known. The point is just to note that the CSUB would include steps for allowing a user to:

a. change certain data in her record, b. output her record, and c. allow others to output parts of her record and statistics created from her record.

1C. Searching

Figure 3:
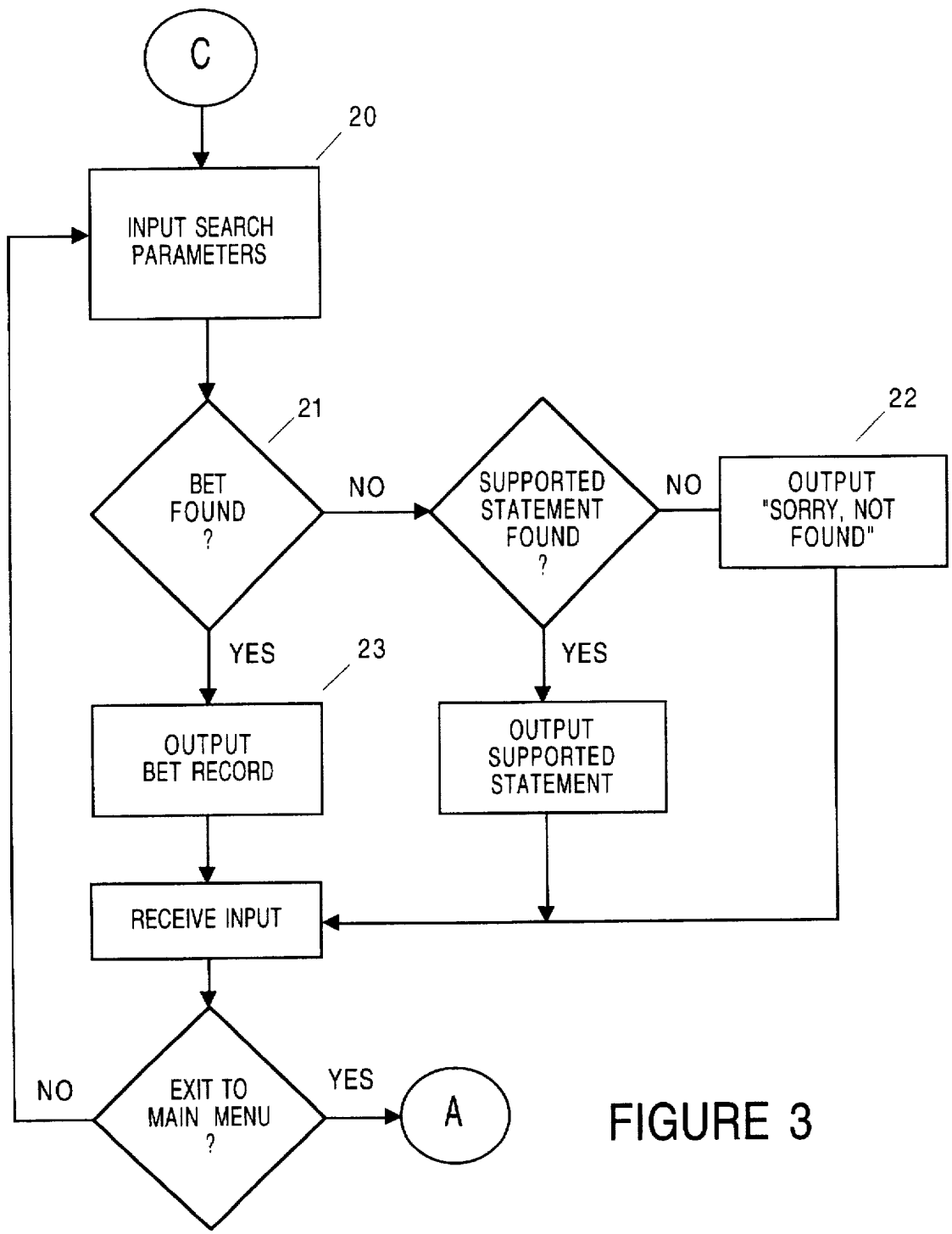
FIG. 3 shows a flowchart of the Search mode.

The CSUB is both a transaction processing system that enables users to execute bets and a data-base system that enables users to record and see bets. As a data-base system, it naturally includes search functions. In FIG. 3 we see that users can search both bets and supported statements.

Depending on the particular CSUB, users may be able to search without having an account. Having two classes of users, those with accounts and those without, lets a larger community use the CSUB as a data-base. We assume the system allows users to search without entering a PIN.

(It is possible for a CSUB to allow users to go from the search mode directly into the transaction mode. Thus a user might find a bet while searching and then enter a request to do a transaction. The user would then enter his PIN and execute the transaction on the bet. This path is not shown but is easily implemented).

Thus, as shown in FIG. 3, the CSUB program includes the following steps for enabling users to search the system's data-base of bet records:

inputs 20 search parameters for a bet, checks 21 to see if bet is in memory, if bet is not found, outputs 22 message saying that no such bet is found, if bet is found, outputs 23 the bet.

1D. Placing a Bet

When a user places a bet, it means that he makes a bet statement, sets the payoff odds, commits to picking a side, True or False (though he may not specify which side), and puts a stake at risk.

As will be seen later, there are a variety of different bets and they are distinguished by how the odds are set and how the sides are picked. The basic system being described in this section enables the user to place the most familiar type of bet, which we will call a straight bet. In a straight bet, the Placer supplies a single payoff odds figure and picks the side of the bet.

As mentioned, in conventional betting, payoff odds are supplied in X–Y form. However, as befitting a medium that is made for expressing of probability estimates, the CSUB also converts odds in X–Y form into percentage form. And the system allows odds to be entered in percentage form instead of X–Y form, if a user so desires. For example, a person might place the following bet:

| Bet Statement: | The Knicks will win tonight. |
|---|---|
| Stake: | $100 |
| Side Picked: | True |
| Payoff Odds: | 40% |

The CSUB would then convert these odds into X–Y form (3–2).

In everyday life, people usually express probability figures in percentage form. For example, people usually say, "there is a 25% chance of rain" rather than, "the odds are 3–1 against rain." In fact, most people are unfamiliar with how probability expressions in X–Y form correspond to those in percentage form. So it is quite useful for a CSUB to enable people to set payoff odds and actual odds using percentages (or fractions). Therefore, with every type of bet the CSUB enables users to transact, the CSUB allows users to input probability figures in X–Y form or percentage form.

When the user places a bet, the CSUB creates a record for that bet where the bet information is stored. Initially, this information includes the bet terms (for a straight bet: the bet statement, the Placer's stake, the payoff odds, and the side picked). In addition, the user's PIN is stored to verify the user. The type of bet can be stored as well, or can be understood from the bet data.

Any additions or changes to the bet information, such as the bet being accepted, are stored in the bet record as well. The record can also be linked to a supported statement and to other bets, as will be described later.

Figure 4A:
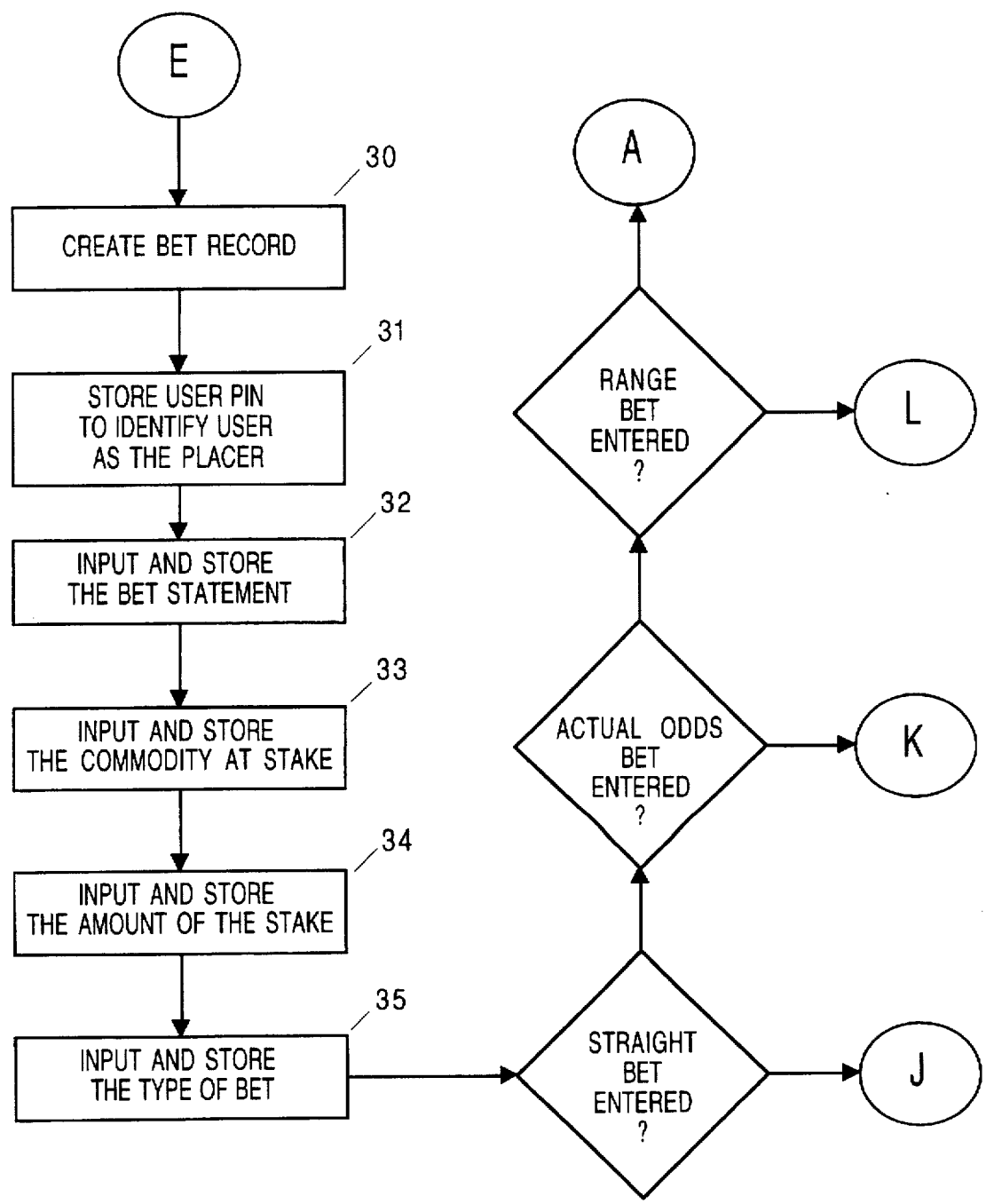
FIGS. 4a and 4b show a flowchart of the Placing a Bet and Straight Bet modes.
Figure 4B:
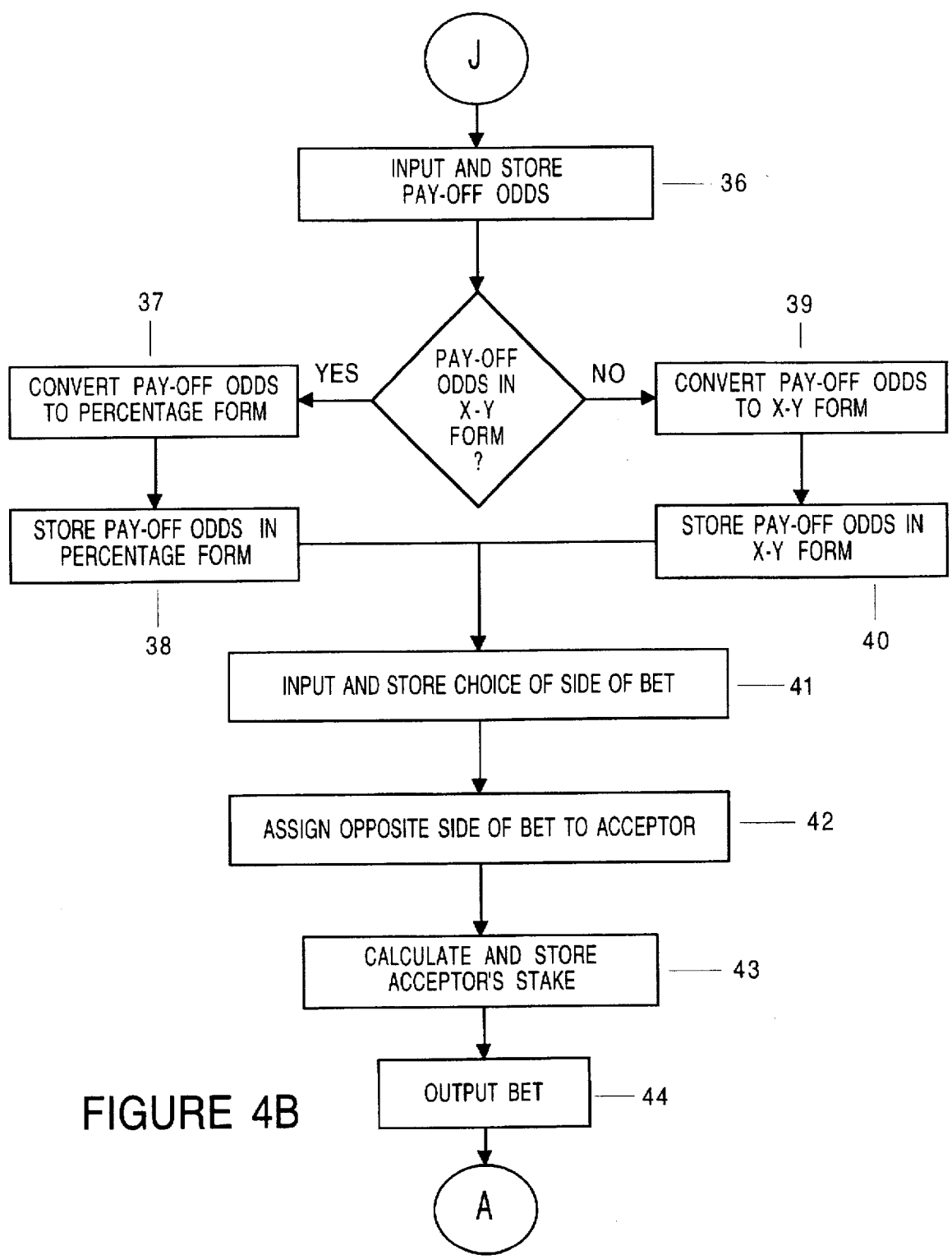

Thus, as shown in FIGS. 4a and 4b, the CSUB program includes the following steps for enabling users to place a bet:

creates 30 a record to store the bet data in, stores 31 the user's PIN in the record to identify the user as the Placer of the bet, inputs and stores 32 the bet statement, inputs and stores 33 the type of commodity being bet (we assume users can bet one of two types of commodities, money and points, and that the system prompts the user to enter one or the other), inputs and stores 34 the amount at stake, inputs and stores 35 the type of bet (we assume the user enters "Straight Bet")

inputs and stores 36 the payoff odds,
    if the odds are in X-Y form,
        converts 37 them to percentage form,
        stores 38 them in percentage form as well,
    if the payoff odds are in percentage form,
        converts 39 them to X-Y form,
        stores 40 them in X-Y form as well, inputs and stores 41 the side of the bet that the user is taking, assigns 42 the opposite side to the Acceptor (who at this point does not exist), calculates and stores 43 the Acceptor's stake required to cover the bet, outputs 44 the information stored in the bet record (also called outputting the bet).

1E. Accepting a Bet

We saw in the main menu, figures 1a and 1b, that when a user wants to accept, settle or change a bet, he first enters his PIN along with information to identify the bet. The system finds the bet and then the user is able to do the transaction.

When a user accepts a bet, the bet has already been placed by another user. Thus the main task of the Acceptor in a straight bet is to enter an acceptance of the bet terms. (In a straight bet, the Placer has already picked one side of the bet. As mentioned, there are other types of bets where the Acceptor picks the side).

Figure 5:
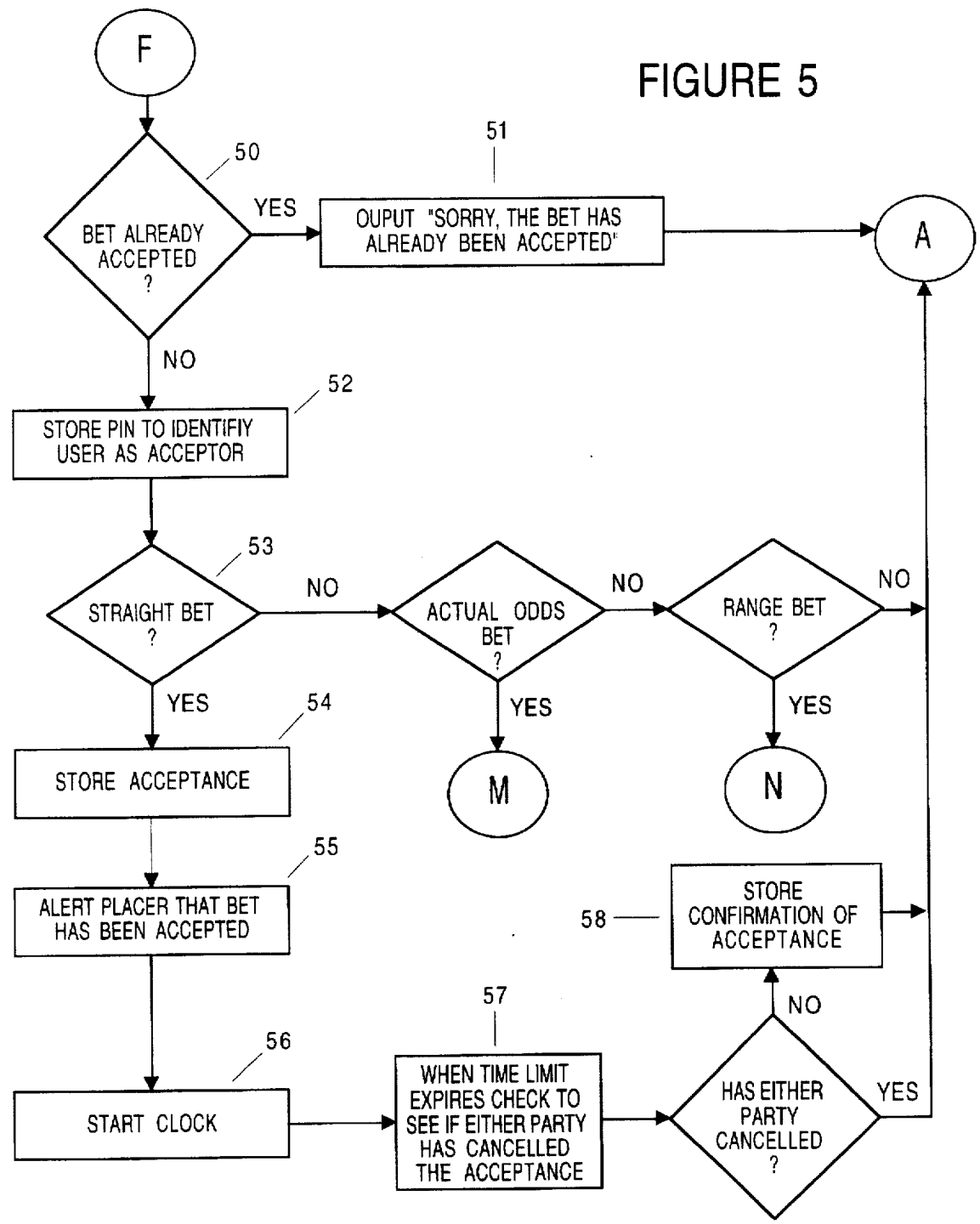
FIG. 5 shows a flowchart of the Accepting a Bet mode.

Thus, as shown in FIG. 5, the CSUB program includes the following steps for enabling users to accept bets:

checks 50 to see if the bet has already been accepted,
    if yes, outputs 51 a message, "bet has already been accepted."
    if no, stores 52 user's PIN to identify the Acceptor of the bet,
        checks 53 whether the type of bet is a Straight Bet,
        if no, goes to steps for accepting other bets,
        if yes, stores 54 the acceptance and alerts 55 the Placer of the acceptance.

The system can use two basic ways to alert the Placer that the bet has been accepted. The system can include a message box for users and send the alert to that box. Or the system can send the alert to the user's contact number.

The acceptance procedure above works fine in situations where the Placer is satisfied with the bet terms, at the exact time the bet is accepted. Leaving the CSUB aside for a moment, imagine two people are making a bet. One person proposes the bet and the other accepts. The two shake hands and the bet is set. The handshake signifies that the two parties have agreed on the terms at the exact same time.

This simultaneity is part of most bet agreements but it is implicit and not usually brought out into the open. Without simultaneous agreement, the Placer of a bet may have to constantly monitor the terms of the bet. For example, bookie shops that give odds on horse races must constantly monitor those odds. Or, the Placer may have to arrange to be alerted immediately after the bet has been accepted and reserve the right to change the terms. For example, bookie shops often post odds that are subject to confirmation by shop managers.

The reason that the terms need to be agreed to by both parties at the same time is that the conditions that a bet is about might change. Thus, a party can be at a disadvantage if he leaves a bet "on the table," while the other party has risk-free time to think. And that poses a problem concerning the CSUB.

The CSUB is not designed for professional bettors, but for ordinary people who want to express probability estimates through bets. These people do not want to spend their time constantly monitoring the terms of their bets.

Hence, the CSUB needs to have a way for both parties to agree while giving neither party an advantage. Ideally, the bet agreement would be simultaneous, but we have established that is often impractical. To solve this problem, the CSUB can employ a time limit method. In this method, once an Acceptor has accepted a bet, a time clock is started with a given time limit. Before the time expires, either party can back out of the bet. After the time has expired, neither party can back out. So, if the time expires with neither party having backed out, the bet acceptance is confirmed.

Thus, as shown in FIG. 5, the CSUB program can include the following steps for enabling people to accept bets:

after storing acceptance, starts clock 56 with a pre-set time limit (we assume here that the time limit is set by the system operator), when the time expires, checks 57 to see if either Placer or Acceptor has canceled the acceptance,
    if yes, does nothing to the bet record (the record will already have been changed in the Change Bet mode)
    if no, stores 58 confirmation of acceptance.

Now it is important to point out that the acceptance procedures outlined are not the only ones possible. For example, rather than the time limit being pre-set by the system operator, it is possible to allow the Placer to set the limit. The Placer might not even care to set a limit but might be confident enough to leave a bet on the table for anyone to accept (in other words, the Placer sets the clock to 0).

Acceptance and retraction rules are crucial parts of bet agreements and the rules can vary widely. Here we have just tried to give a useful and novel feature that a CSUB can include; we have not tried to say it the only good procedure for accepting bets. Different rules can coexist within a single CSUB, as long as they are applied to different bets. These rules can be determined by users or system operators. There can be fees assessed (deposits forfeited)) for backing out of a bet once the bet has been accepted. Such fees can be paid to the opposing party. Such fees might be standard or might be set by the Placer.

Now it is also important to point out that the system can enable multiple users to accept a bet. The users would each put up a fraction of the Acceptors stake. There are many possible ways to determine what fraction each Acceptor would get. For example, two users might want to accept a bet. The rules for deciding how much each would get are important and can vary widely. For now, for simplicity's sake, we will not illustrate the option of allowing multiple users to accept a bet, but we note that the option is easily implemented by those skilled in the art.

1F. Changing a Bet

As previously mentioned, an important part of bet agreements are the rules for changing the bets. One common rule on changing bets is that a bet can be changed or canceled if it has not yet been accepted. The CSUB includes steps that implement this rule. The CSUB can include steps that also implement the time limit method outlined above. These steps will be described below. In this set of steps, the Placer can change the terms of the bet, if the bet has not been accepted. Once the bet has been accepted, neither party can change the terms unilaterally, but both can back out of the bet before the time limit expires.

Figure 6:
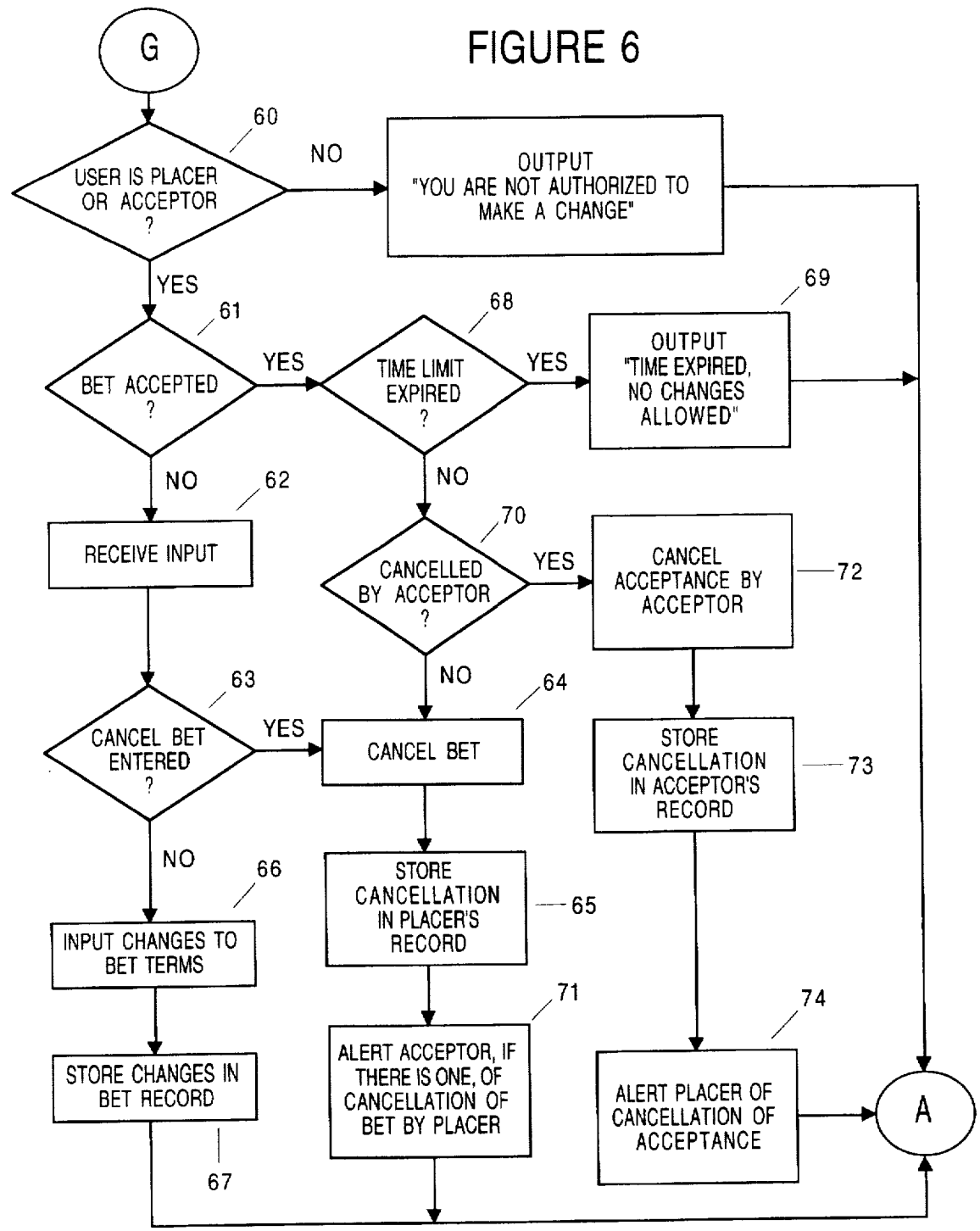
FIG. 6 shows a flowchart of the Changing a Bet mode.

Thus, as shown in FIG. 6, the CSUB program can include the following steps for enabling users to make changes in a bet:

verifies 60 that user is the Placer or Acceptor, checks 61 if the bet has been accepted, if the bet has not been accepted, receives input 62 from the Placer, checks 63 if input is to cancel or change the bet.

if input is to cancel the bet, cancels the bet 64.

stores 65 the cancellation in the Placer's record, if input is to change the bet, inputs 66 and stores 67 the changes, if the bet has been accepted, checks 68 whether acceptance is confirmed (time limit has expired), if yes, outputs message 69, "No changes allowed now,"

if no, checks 70 whether the user is the Placer or Acceptor if the user is the Placer, cancels the bet, stores the cancellation in the Placer's record, alerts the Acceptor 71 of the cancellation, if the user is the Acceptor, cancels 72 the acceptance, stores 73 the cancellation in the Acceptor's record, alerts 74 the Placer of the cancellation.

We assume in the procedure above that when the Placer cancels the acceptance that the whole bet is canceled but that when the Acceptor cancels the acceptance, the bet is still open for others to accept. That was why we distinguished between a request to cancel the bet and a request to cancel the acceptance of the bet. However, it is equally possible to include steps whereby the bet is kept open after the Placer has backed out. In this case, the Placer's side can be taken by some other user.

Another typical rule of bet agreements is that once a bet has been accepted, changes can be made by common consent. The CSUB can include steps that implement this rule whereby a certain input would signify that a party wanted to make a change. The party would enter the change. The system would alert the other party that a change was requested and tentatively entered into the record. Another input would signify whether the other party agreed to the change or not. The change would be made part of the bet only if the other party entered this confirming input.

1G. Settling a Bet

The basic CSUB procedure for settling a bet is simple. When both sides enter the same result, the bet is settled. The parties can enter a result of true or false or undecided. Each reported result is considered verified by the user's PIN and so the settlement is considered verified in the same way. If a matching result is reported, the result is stored as the settle result in the bet record and in each user's record.

Once the bet is settled, the system completes the transaction by crediting the winner by the loser's stake and debiting the loser that same amount. If both sides report "undecided," this result means the bet is a push; the system gives neither party the other's stake. If a particular CSUB executes funds or point transfers, it transfers the loser's stake into the winner's account.

All the above presumes that the bet is settled. Of course, the parties can disagree. They can disagree by reporting different results. Or one party can enter a result while the other reports nothing. In these cases, the bet is not settled. Therefore, the CSUB needs a step where a human judge can be called by one or both of the parties in a bet. (The CSUB could include a rule whereby a party could only call a judge after a given period of time after having reported a result). Rules for dispute resolution vary widely and are not a matter of concern here. What is important is that the CSUB includes means for enabling the parties to call a judge if either so desires. And further, the CSUB needs to include means for enabling the judge settle the bet and enter the result into the bet record and into the users' records (these steps are not shown but are easily implemented).

Figure 7:
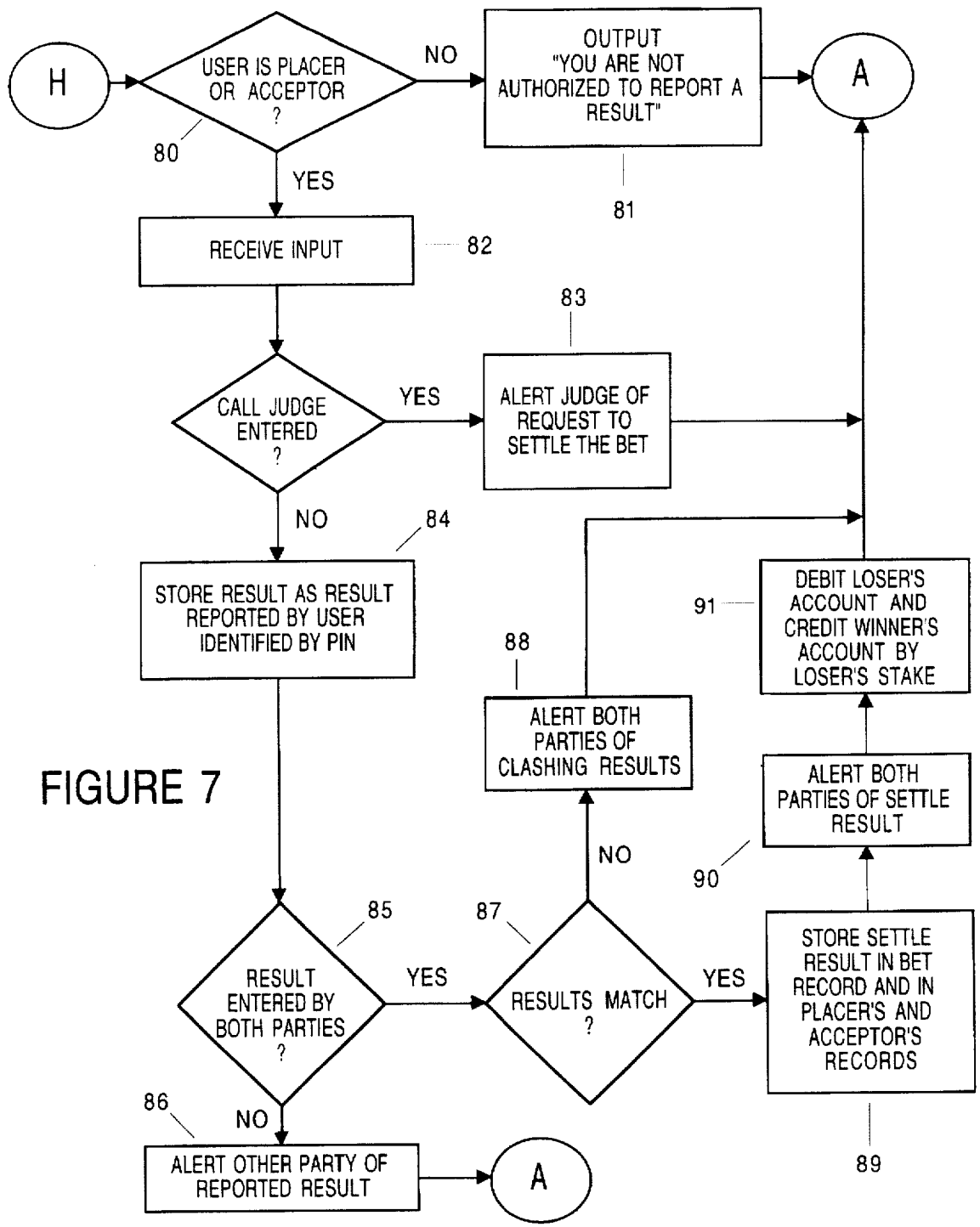
FIG. 7 shows a flowchart of the Settling a Bet mode.

Thus, as shown in FIG. 7, the CSUB program includes the following steps for enabling users to settle bets:

checks 80 user PIN to see if user is either Placer or Acceptor if no, outputs message 81, "You are not authorized to report a result,"

if yes, receives an input 82 (a call for a judge or a bet result), if the input is a call for a judge, sends a message 83 to a CSUB judge, if the input is a bet result, stores 84 the result in the bet record under the user identified by the PIN, checks 85 to see if results have been entered by both parties, if no, alerts 86 the other party of the result reported, if yes, checks 87 to see if results match, if the results do not match, alerts 88 both parties of the clashing results, if the results match, stores 89 the settle result in the bet and users' records, alerts 90 users that bet is settled, credits 91 the winner's account and debit's the loser's account by the loser's stake.

Section 2

Actual Odds Bets

The previous section described the basic system for transacting bets. The system described was limited though to transacting straight bets. We now describe additional means by which the system enables users to transact what we will call actual odds bets.

In an actual odds bet, the Placer sets the bet statement, the stake, and the payoff odds but lets the Acceptor pick the side.

(Note for reference in Part II, we will call this type of bet a flip bet because a user is willing to flip to either side depending on what side the opposing party picks).

When the Placer lets the Acceptor pick the side, the Placer must strive to make the payoff odds fair, presuming the Placer does not want to make an unfavorable bet. Fair payoff odds equal the actual odds. Therefore, the theory is that the Placer will strive, in the payoff odds, to express his best estimate of the actual odds. Hence the name of the bet.

For example, if the bet statement is: "This coin will land on heads," and the actual odds are 1–1, the Placer should set the payoff odds at 1–1. If he sets them at anything else, he lets Acceptor bet on the favorable side. Say the Placer sets the payoff odds in this case at 1–2 that the statement is True (Heads), which means that False (Tails) is paying 2–1. The Acceptor would presumably pick False, leaving the Placer with a very poor bet on True at 1–2.

Since a key object of the invention is to enable people to express their best probability estimates in a convincing way, the actual odds bet is a useful type of bet for a CSUB to include.

(Note, we presume that the controversial concept of actual odds, also called actual probability, has some kind of meaning outside of coin and casino type examples. We do not go into the philosophy involved).

Figure 8:
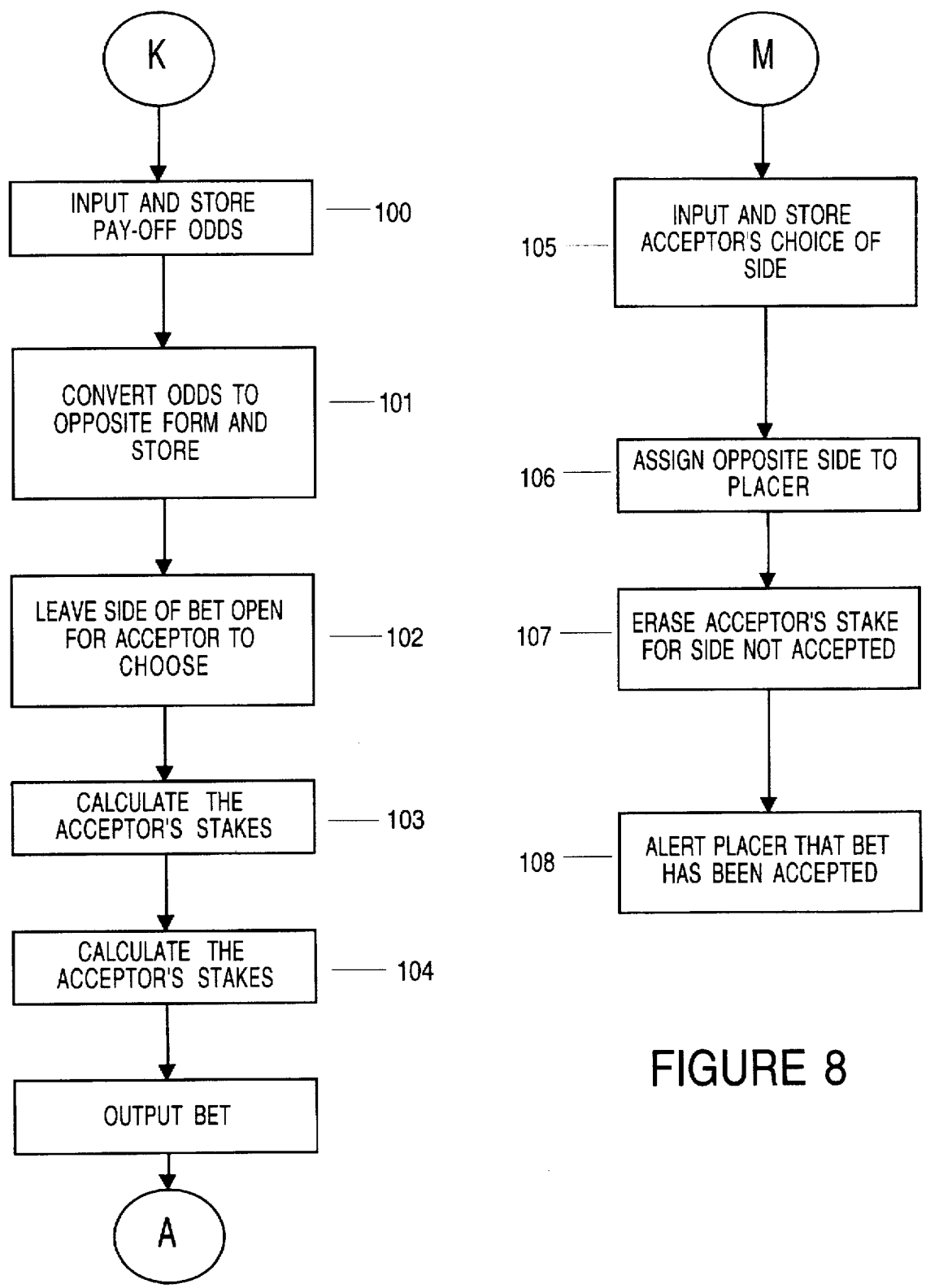
FIG. 8 shows a flowchart of the Actual Odds Bet mode.

Thus, as shown in FIG. 8, the CSUB program includes the following steps for enabling users to transact actual odds bets:

(As mentioned in the Overview, we add to the basic description rather than repeat steps previously mentioned).

In Placing a Bet Mode inputs and stores 100 the payoff odds, converts 101 the odds into opposite form and stores them in that form as well, leaves 102 the side of the bet uncommitted and left for the Acceptor to choose, calculates 103 the Acceptor's stakes, one for each side the Acceptor can take, stores 104 the Acceptor's stakes, outputs the bet record.

In Accepting a Bet Mode inputs and stores 105 the Acceptor's choice of side, assigns 106 the opposite side to the Placer, erases 107 the Acceptor's stake corresponding to the side not chosen, alerts 108 the Placer that the bet has been accepted and tells which side the Acceptor has chosen.

The system can also include steps whereby the Placer can specify two different stakes, depending on which side the Acceptor takes. These steps can enable the Placer to specify one amount to be risked on True and another amount to be risked on False. We will not illustrate this option but it is easily implemented.

Section 3

Range Bets

We now introduce a third kind of bet, which we will call a range bet. A range bet is based on the fact that people often state probability estimates in terms of ranges. For example, a person might say that the chance of rain is 10% to 20%. Since people often express probability this way, it is useful to have a bet that reflects this kind of estimate.

People can, of course, express a range in terms of odds in X-Y form, for example, the odds of rain are from 9-1 to 8-2.

For the sake of simplicity we assume right now that the probability estimates are expressed in a range of percentages from p1 to p2 inclusive, where p1<p2. In other words, we take the range estimate to mean that a person thinks that p(True), the probability that the bet statement is true, is:

$$p1 \leq p(True) \leq p2.$$

This means equivalently that the person thinks that p(False) is:

$$1-p2 \leq P(False) \leq 1-p1.$$

For example, if the probability of rain is 10%–20% then the chance of no rain is 80%–90%.

In a range bet, the Placer states a range of probabilities from p1 to p2, that the bet statement is true and offers to bet on True with payoff odds corresponding to p1, and offers to bet on False with odds corresponding to p2 (by that we mean payoff odds corresponding to the probability of true being p2 and false being 1–p2). In other words, the person offers to bet on True at the highest payoff odds for True in the range and offers to bet on False at the highest payoff odds for False in the range.

(In the parent and the grandparent, we said that the Placer offered to bet on False at payoff odds corresponding to 1–p2. If one is thinking in terms of the probability of false, which is natural, then that is the way to look at it. But, in this application we try to consistently think in terms of the probability of true. This means though that one must do a conversion and realize that a payoff odds of p does not mean that the person taking False gets a payoff corresponding to the probability p, but one that corresponds to the probability of 1–p. For example, if p is 20% then the person taking False does not get a 4–1 payoff but a 1–4 payoff (which correspond to the probability of false being 80%). The confusing thing is that p can be thought of as a probability figure and a payoff odds offer. These are different, though convertible, concepts. The writer could have done a better job distinguishing the two, but those skilled in the art should understand by the context).

The system also enables a user to express the range of probabilities in X-Y form. If we say the range is (X+Z)-Y to (X-Z)-Y then the Placer is willing to bet on True at (X+Z)-Y and on False at (X-Z)-Y. People would usually not keep the same Y but would state a range more naturally. For example, the actual odds might be 17–3, corresponding to p(True)=15%. A range of 5% both ways would then mean a range of 9–1 (10%) to 8–2 (20%).

And so, in a range bet the Placer creates two straight bets with the same bet statement but with different payoff odds, one set for betting on True and one for betting on False.

An Acceptor picks one of the two bets. The other bet is then canceled.

Figure 9:
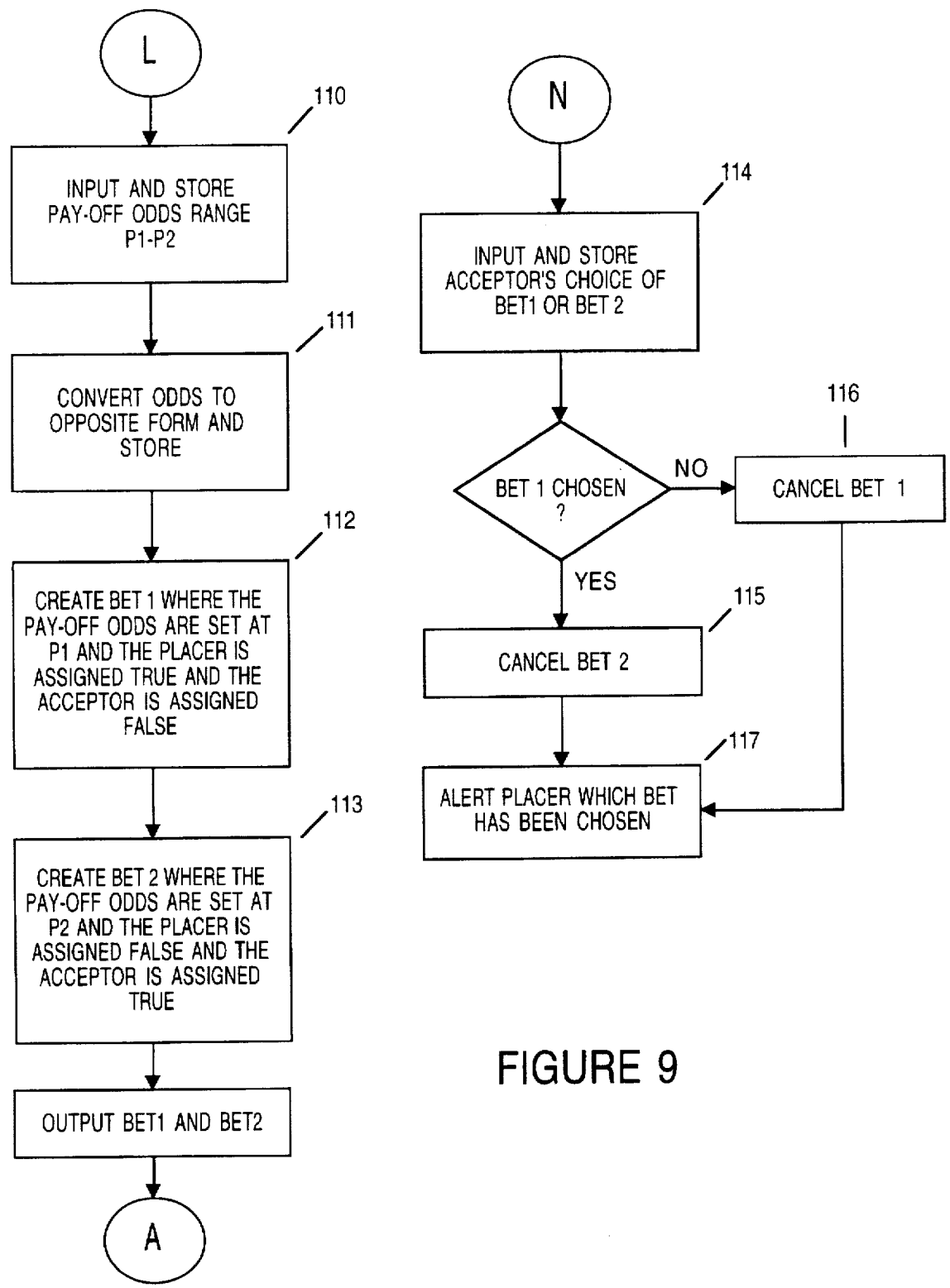
FIG. 9 shows a flowchart of the Range Bet mode.

Thus, as shown in FIG. 9, the CSUB program includes the following steps for enabling users to transact range bets:

In Placing a Bet Mode inputs and stores 110 payoff odds range if range is entered in percentage form (p1–p2), converts 111 it to X-Y form, if the range is entered in X-Y form, converts it to percentage form, creates 112, 113 two bets in the bet record for the Placer by using the same bet statement and stake, one bet where the system assigns True to the Placer at payoff odds corresponding to p1 and one where the system assigns False to the Placer at payoff odds corresponding to p2 (where p2 is in terms of true), outputs the bet record.

In Accepting a Bet Mode inputs and stores 114 which of the two bets the Acceptor chooses, if bet 1 is chosen, cancels 115 bet 2, if bet 2 is chosen, cancels 116 bet 1, alerts 117 the Placer which bet has been accepted.

As with an actual odds bet, the system can include steps for enabling the Placer to specify an amount to be risked on True and a different amount to be risked on False. We do not illustrate this option but note that it is easy to implement.

Now you might notice that a person could, as a bookmaker does, try to make a profit by betting both ways at different payoff odds. In order to stop such attempts, the second bet in a range bet is canceled. This step cannot really stop a bettor who wants to hedge his position, or create a profitable spread in a double bet. Yet, by showing a user's record, the system can reveal the user's strategy and the meaning of his bets. People can see then that a Placer who makes a double bet is really saying nothing about his opinion of probability, only that he smells a profit in creating a spread, as a bookmaker does. Section 6 (under lock-in procedures) discusses this issue further.

Let's also note that another type of range bet is possible. In this bet, a Placer states a range of probability and then offers to make a bet on either True or False, at any payoff odds within that range. This type of bet is mentioned because it is another viable way to enable a person to express that he believes a probability to be anywhere within a certain range. We will not discuss this bet further. We simply note that it is a potentially useful bet that is easily implemented within the CSUB.

Section 4

Bets With Explicit Profit Margins

We have described three types of bets: straight bets, actual odds bets, and range bets. In both a straight bet and a range bet, the Placer will often try to set the payoff odds favorably for himself. But in an actual odds bet the Placer intends the bet to be fair, to be a break-even bet. This can be a problem because the Placer may want to express an actual odds estimate in the payoff odds and at the same time build a profit margin into those odds.

A variation of the actual odds bet can allow a Placer to state actual odds and a profit margin and combine those two figures into the payoff odds. Because we are dealing with a bet, the profit margin is not certain; it is an expected profit margin (EPM).

The general formula for calculating an EPM in a bet is well known:

If the actual odds are X1–Y1, then for betting on True:

$$Y1/(X1+Y1) \times (X2+Y2) = Y2(1+EPM)$$

X2–Y2 are the payoff odds corresponding to the desired EPM. In English this equation means that for the bettor who picks True, the actual probability of winning ($Y1/(X1+Y1)$) is multiplied by what is in the pot (represented by X2+Y2) yielding the expected winnings. These equal the bettor's stake (represented by Y2) multiplied by 1+the EPM.

We recall that in an actual odds bet that a Placer lets the opponent, the Acceptor, pick the side. Thus, if a Placer builds an EPM into the payoff odds, he must create two bets, like a range bet. In one bet he picks True and in the other he picks False. The two bets have different payoff odds, each set to yield the desired EPM for the Placer. (This principle is well known and is often relied upon by bookmakers, though bookmakers usually estimate how the public will bet rather than estimate the actual odds).

One might ask what then is the difference between an actual odds bet with an EPM built in and a range bet? The difference is one of identifying how the payoff odds were arrived at, which is important if one wants to express a probability estimate through the payoff odds.

The Placer of a range bet is in effect saying, "I think the probability that the bet statement is true is a range from this percent to that percent." The Placer of an actual odds bet with an EPM is in effect saying, "I think the probability that the bet statement is true is this percent and I would like this profit margin built into my bet." For example, if a person is placing a bet on whether a coin will land on heads or not, he might say that the actual probability is 50% and that he wants a profit margin of 10% built into his bet. This is different than saying he thinks the actual probability is between 45% and 55% that the coin will land on heads (though the payoff odds in these two bets are nearly identical).

It is useful then for the system to enable Placers to specify and explicitly display figures for the actual odds and an EPM.

And so, in an actual odds bet with an EPM, the Placer sets the actual odds and sets an EPM, which means that the Placer offers to bet on True at the actual odds modified to give the Placer the desired EPM, and to bet on False at the actual odds modified to give the Placer the desired the EPM.

Figure 10:
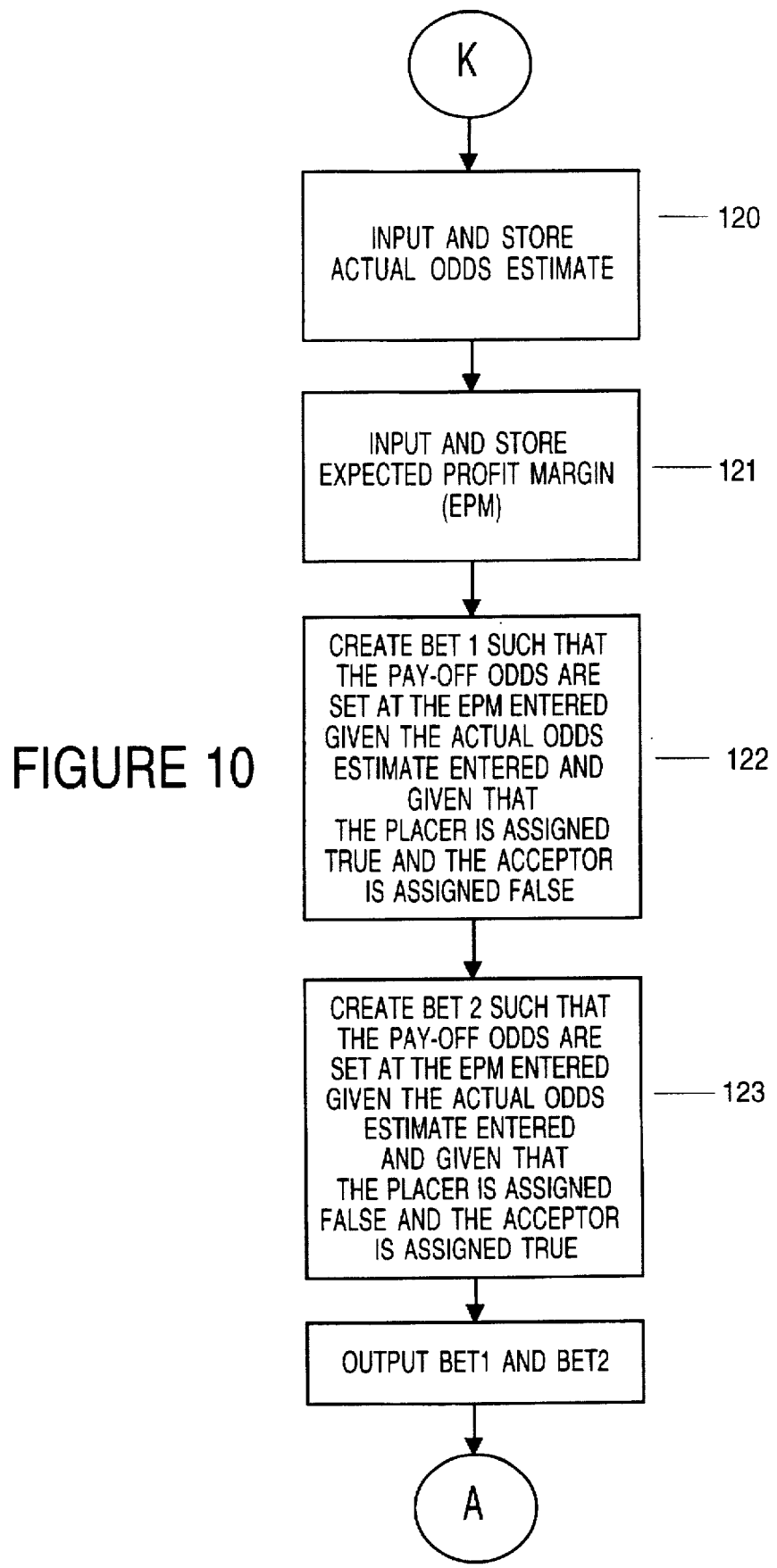
FIG. 10 shows a flowchart of an expected profit margin function.
Figure 11:
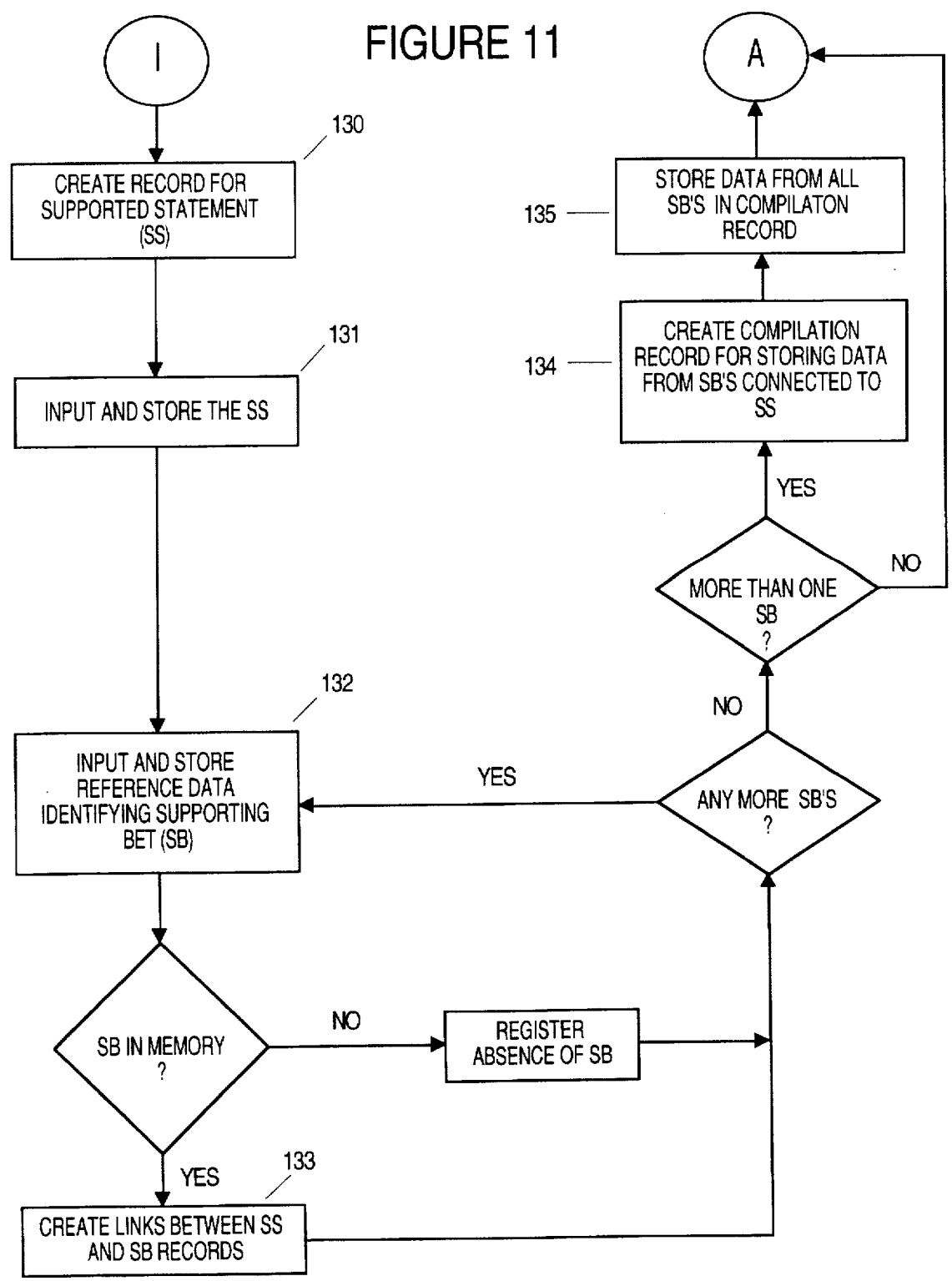
FIG. 11 shows a flowchart of the Supported Statement mode.

Thus, as shown in FIG. 10, the CSUB program includes the following steps for enabling users to place actual odds bets with an EPM built into the payoff odds:

In Placing a Bet Mode inputs and stores 120 the actual odds estimate.

inputs and stores 121 the desired expected profit margin (EPM).

creates 122, 123 two bets in the bet record for the Placer by using the same bet statement and stake, one bet where the system assigns True to the Placer at payoff odds set to yield the Placer the EPM entered, given the actual odds entered, and one bet where the system assigns False to Placer with payoff odds set to yield the Placer the EPM entered, given the actual odds entered.

outputs the bet record.

In Accepting a Bet Mode the steps are the same essentially as for accepting a range bet.

Now it may be that a Placer of a straight bet might also want to build a profit margin into the payoff odds. But in a straight bet there is no actual odds estimate and thus no EPM. But we can interpret a straight bet so that we can build in a minimum EPM. This term means, of course, that the Placer thinks the EPM is greater than or equal to the minimum EPM specified.

We assume that in a straight bet, that the Placer thinks that the actual odds are greater than or equal to the payoff odds. We then pretend that the payoff odds are equal to the actual odds. We then build in the desired EPM at these pretend actual odds, but only for the side, True or False, that the Placer has picked. These payoff odds then have a minimum EPM built into them.

For example, say a person offers to bet, at 3–2, on True, that a coin will land on heads, and that the person wants a minimum EPM of 20%. We then pretend that the actual odds are 3–2 and then we build in the EPM for those actual odds. But, we only build them in for a bet on True. In this case, the modified payoff odds become 2–1. The Placer is willing to bet on True at 2–1.

The Placer can also build a minimum EPM into a range bet. Recall that the range bet creates two straight bets with different payoff odds. We add the minimum EPM to each odds figure, just as we did with a single straight bet.

Thus the CSUB includes the following steps for enabling users to Place range bets with minimum profit margins built into the payoff odds:

In Placing a Bet Mode inputs and stores the odds range from p1–p2, where p1<p2, inputs and stores the desired minimum EPM, creates two bets in the Placer's record with the same bet statement and stake such that the Placer has a minimum EPM for betting on True, given actual odds at p1, and a minimum EPM for betting on False, given actual odds at p2 (where p2 is in terms of true), outputs the bet.

Some people might call an EPM and a minimum EPM a "margin of safety." The CSUB can enable people to build a margin of safety into the payoff odds in the same way as an EPM. Though the math is identical, it is better to label these two things differently because the interpretation can be different. A person could, for example, build an EPM and a margin of safety into the payoff odds.

Section 5

Linking Bets to Supported Statements

As discussed, the purpose of the invention is to provide a system that enables people to express probability estimates in the form of bets. Hence, a person can use the CSUB to place a bet that stands alone as a probability estimate.

Ordinarily though, when people give probability estimates, the conventional kind that is, the estimates are part of longer statements. For example, person might state reasons why it will probably rain and then say, "the chance of rain is 75% tonight." This estimate can stand alone or can be made part of the longer statement about why it will probably rain.

Bets too can be made part of ordinary statements. When a bet is made part of an ordinary statement, we will call that statement a Supported Statement (SS) because the bet is used to support some point or points made in the statement. And so, an SS is an ordinary statement that contains a bet—all of the bet, part of the bet, a summary of the bet, or a reference to the bet—that backs up some point made in the SS. We will call a Supporting Bet an SB for short.

An SS can be entered into the CSUB and stored along with the SB, or the SS can be entered and stored separately in its own record. We will assume, for simplicity's sake, that the SS is stored in its own record distinct from the SB.

As shown in the Search mode, the CSUB includes search means for finding SS's in the system data-base. The CSUB would also include means for modifying the SS.

While a conventional probability estimate is usually quite short, a bet (the bet statement part) can be short or long. Therefore, a bet can be longer or shorter than the SS it supports. For example, the SS can be a statement like, "It looks like rain tonight." The SB can be longer, defining what rain means, who will measure whether it has rained, and so on. On the other hand, the SS can be longer than the SB. The SS might be several pages about weather theory which may include a bet such as, "Based on the theory just explained, I'll bet $100, on True, at 1-2, that it will rain tonight."

An SS can be supported by multiple bets. For example, an SS about weather theory might include numerous facts and numerous predictions. Some or all of these assertions can be bet on.

An SS can include SB's made by anyone, not just the writer of the SS.

As mentioned above, an SS can contain all of an SB, part of an SB, a summary of an SB or reference to an SB. Vice versa, an SB record can contain all or part of the SS. The references can be two way. A reference to the SB in the SS might be in the text of the SS. Usually, the reference in the SB record would not be in the text of the bet statement.

More useful than simple references are active links between the SS and SB records. Means for linking bets to ordinary statements are a novel and very useful feature of the invention. Means for linking two records in a data-base are well known and need no elaboration here. For illustration's sake, we will discuss three basic types of links, though they are not meant to be exhaustive.

First, the SS can contain reference data that is linked to the SB record such that a user can open the SB record directly from the SS record, and vice versa. An example of this is having an icon appear in the display of the SS. By "clicking" on the icon, a user can open the SB record. Another example is a hypertext link, which allows the user to open the SB file directly from some word or phrase in the SS.

Second, the SS can contain data from the SB record such that when a change is made in the SB record, a corresponding change is made in the SS.

Third, if an SS has multiple SB's, a compilation file can be created where data from all the individual SB's are stored such that any change in an individual record causes a corresponding change to be made in the compilation file. We may call this file an SS-SB record.

A passage from a newspaper article is given as a small illustration of a few ways that an SS can actively reference SB's:

The Labor Department reported yesterday that producer prices rose more in July than they have in 15 months (99.9, NA), rekindling the market's smoldering fears of inflation and heightening expectations that the Federal Reserve will raise interest rates next week . . . Analysts said the report made higher interest rates more likely (55, Analyst) . . .

"What I think we are going to see is that U.S. economic growth will slow (Sohn-Z9), as a result of high interest rates and dampening demand in the current quarter," Sohn said.

(For full data on all bets, see SS-SB file: Glater, August 17).

In this passage we have put SB reference information in parentheses. In the first case, "(99.9, NA)" might signify that the reporter has placed a bet supporting his claim that the Labor Department statistic is correct. The 99.9 can signify that he has 99.9% confidence and has placed a bet to that effect, at those payoff odds. The "NA" can signify that the bet has not been accepted.

In the second case, the reporter might be referencing a bet that a source has placed where the payoff odds are set at 55%, signified here by (55, Analyst). The SB record could presumably be found under the article name and the name Analyst. Likewise, in the third case, we pretend that a source named Sohn has placed a bet that can be found under reference data Sohn-Z9. We do not however see any of the bet data, as in the two other cases. We pretend also that a compilation file is created that can be found under the reporter's name (Glater) and the date.

In all these cases, the SB's could be found by entering the reference data displayed. Further, any changes made in the individual SB records could cause a corresponding changes in the SS. For example, if the first bet was accepted, the NA might change to an A. Or if the payoff odds on some bet changed, the corresponding figures, such as 55, could change. If a bet was settled, the result (True, False, or Undecided) could be given, and so forth.

Thus, as shown in drawing 11, the CSUB can include the following steps for enabling users to link bets with supported statements:

(For simplicity, we assume the SB is entered first).

creates 130 a record for the SS, inputs and stores 131 the SS, inputs and stores 132 reference data for identifying a bet that supports the SS, checks the memory to see if a record exists for the supporting bet (SB), if no, registers the absence of the SB, if yes, links 133 the SB record and SS record such that, a. the SB record can be opened by entering reference data in the SS record, b. the SS record can be opened by entering reference data in the SB record.
c. data from the SB record is copied into the SS record.
d. data in the SS record corresponding to data in the SB record changes when that SB data changes.

checks if there is more than one SB identified in the SS.
if yes, for each SB, repeats the steps above for linking the SS to the SB.
creates 134 a record for storing the multiple SB's.
stores 135 data from all the SB's entered for the SS. such that any change in the individual SB records is reflected in the corresponding data in the multiple SB record.

Section 6

Extra Features

The previous sections described a system that enables people to transact three types of bets and to link those bets to ordinary statements. However, it should be remembered that the system is a novel communications medium and as such it can include many more novel features than those described. This section will briefly describe some extra features that can be useful in a CSUB but the section is not comprehensive.

Counter Bets and Counter Statements

It is useful for a communications system to allow people to respond to the statements of others. Therefore, the CSUB can enable people to respond to the bets and supported statements of others. The system can enable people to make "counter-bets" and "counter-statements" which are responses to bets and supported statements that are already in the system data-base. A counter bet is the same as other bets but it is also labeled as a counter-bet and linked to the bet and/or SS that it is a response to. (As mentioned, techniques for linking two records need no elaboration). The counter-statement is like an ordinary SS except that it is labeled as a counter-statement and is linked to the bet and/or SS it is a response to.

Guarantees

We have defined a bet as a certain type of agreement where a Placer and Acceptor both put something at risk. However, we can have a different kind of bet agreement whereby the Placer puts up a stake, pledging that the bet statement is true. If the bet statement is false, the Placer pays the stake to the Acceptor. Such an agreement can be called a guarantee (G-bet). The CSUB could enable users to transact guarantees in the same fashion as bets except no payoff odds would be entered, the bet statement would be identified as a guarantee, and the Acceptor would not have anything at stake. (The system might charge the Acceptor a fee, but this is not a bet stake).

The system can enable the Placer to convert a guarantee into a probability based bet, by enabling him to change the payoff odds figure from nothing to an odds figure. Thus the payoff terms then change and the G-bet becomes a probability based bet.

Note that bets can be set up that are virtually equivalent to guarantees from the point of view of how much is staked by both parties. A Placer can make a bet with high payoff odds where the Acceptor's stake is, say, one penny. The Placer's stake can be any amount, depending on the payoff odds. However, from a psychological point of view, a guarantee might not be equivalent to a probability based bet at all. A person might offer a guarantee not thinking that the odds are 99+% in his favor. The guarantee might just be an easier kind of agreement to offer than a probability based bet. There are advantages in not having to be explicit about an odds figure. And so guarantees are a kind of bet agreement distinct from probability based bets.

Entering a Probability Estimate Independent of the Payoff Odds

In an actual odds bet the Placer strives in the payoff odds to state what he thinks the actual odds are. At least the theory is that he usually does. With all other bets the Placer's honest probability estimate is unknown. Moreover, the Acceptor's probability estimate is not known in any of the three bets described. Therefore, a useful feature of the invention is means for enabling users, both Placer's and Acceptor's, to enter an independent estimate of the actual probability that the bet statement is true. Thus the CSUB can enable users to enter a probability estimate in addition to the payoff odds figure. We call this estimate an independent probability estimate (IPE) because it has nothing to do with payoffs.

The CSUB can enable users to state an IPE in three ways. We might say that there are three types of IPE's: a straight IPE, a flip IPE and a range IPE. A straight IPE means that the user thinks that the actual probability is greater or less than the figure entered. Thus a user entering a straight IPE also states whether the probability is greater or less than the figure entered. For example, a user may enter>75%. A flip IPE means that the user thinks that the IPE is his best single figure estimate of the probability. Thus a user entering a flip IPE only enters a single figure, say, 75%. A range IPE means that the user thinks that the probability is within the range given. Thus a user entering a range IPE enters two figures defining a range, say, 65%–75%.

A user does not have to enter a straight IPE along with a straight bet, or a flip IPE along with a flip bet, or a range IPE along with a range bet. The user can choose any type of IPE to enter along with a bet.

(Note: For simplicity's sake in subsequent discussions, when we refer to an IPE we will usually be thinking of a flip IPE, a single figure).

Now if a bet is not settled, a user might or might not want show the IPE that goes along with the bet. He might want to show it after the settlement. He might show it before the settlement to designated people. It depends on the situation. The CSUB can enable him to hide an IPE and show it to designated people.

A user's IPE's can be very useful for compiling statistics in the user's record. The IPE's can be subjected to various statistical tests to see how accurate the estimates were compared to the actual record of bet results. For example, all the bets with IPE's of a given percentage, say 50%, can be put in a group. The results from these bets can then be compared to the 50% estimate entered along with each bet. Let us say, for instance, that a user has 10 bets in which he has given an IPE of 50% True. The results in those bets could be anywhere from zero Trues to ten Trues. The system can show what the actual results are. For example, if the results are 5 Trues and 5 Falses then the user has estimated extremely well. If they are 0 Trues and 10 Falses then the user has estimated poorly.

Bet Statistics

The CSUB can apply various well known statistical tests to the data in a user's record. This data can include all the data entered for making individual bets, the results of the bets, as well as IPE's and other information such as dates of the bets. The main idea is to see how well the user judges probability. These tests can thus be very useful because a key object of the invention is to show people how well users estimate probability.

While well known tests can be applied, it should be noted that new statistical tests need to be developed. The CSUB is a novel system for registering uncertainty, and requires novel methods for evaluating the information registered.

Credibility Points

Credibility points (CP's) were mentioned in the preface as an alternative to betting money. The CSUB can enable users to make both cash bets and CP bets. It can include means for keeping track of both cash and CP credit/debit balances. It is useful to have both types of accounts in a public system where people's credibility is judged from results in bets.

Copying Bets

It can be very convenient for the CSUB to enable users to copy bets or copy parts of existing bets. If a user copies only part of a bet, the CSUB can also enable users to then add to the copied part to place a complete bet. In fact, means for copying bets are perhaps essential to a convenient CSUB. People may want to copy a bet or part of a bet for various reasons. For example, a person might want to copy all of a bet except for the side picked. In such a case, the person would be placing a bet on the opposite side of the bet that was originally placed. For another example, a person might want to respond to a bet by making minor modifications in the original. In a communications system, bets can be looked at as documents and as such, it is clear that it would be useful to be able to copy them or copy parts of them. Means for copying records and parts of records are well known and need no elaboration. Let us just note that the CSUB can include means enabling users to copy bets and parts of bets and to modify those bets.

Non-public Bets

The CSUB can include means for enabling a user to make a non-public bet meaning that only the parties to the bet, or other designated people, can see the bet. Access to the bet record would be restricted by PIN. The main reason for this feature is that with certain bets public display can affect the outcome.

Targeting a Bet, Restricting Acceptors

The CSUB can include means for enabling a Placer to restrict who can accept a bet. The Placer would specify who can accept the bet and this information would be stored in the bet record. If someone else tried to accept the bet, the Placer could request that the acceptance be canceled. The system could also recognize an authorized Acceptor and reject any non-authorized Acceptor. This feature can be useful because often a bet will be issued as a challenge to some particular person or group. Also, a Placer might want to restrict the expertise of his potential opponents.

Confirmation Steps

It should go without saying, but we will mention it anyway, that the system can include confirmation steps where a user verifies the information he has entered.

Secondary Market

Once a bet is accepted, it can be valued by buyers and sellers based on the payoff odds and the conditions the bet is about. A secondary market can be created then within the CSUB enabling users to buy and sell bets. This feature is very useful for it shows the changing perceptions users have of the payoff odds. The prices for bets can be quoted both in cash (or points) and as changes in the odds. All transactions can be recorded in users' records.

Hedging

Selling a bet in a secondary market is one way a user can profit from a good bet or protect against loss in a bad bet. Another way is hedging, in which a bettor makes a bet statement that is identical to one made in a previous bet. The bettor then takes the opposite side of the bet than was taken in the original bet. The bettor may also change the original odds. Rather than placing a new bet, the user may also hedge by accepting the same bet but taking the opposite side from the side he originally took. Hedging is a well known and useful technique and thus the CSUB can include means for enabling users to automatically hedge a bet.

Lock-in Functions

As mentioned, it is useful to allow bettors to hedge their bets or sell their bets. That way the users can show that their opinions have changed and can allow users to realize profits or stem losses. On the other hand, when a user hedges a bet or sells a bet, the user's original expression of probability can lose force. The Placer shows himself not to be risking as much as in the original bet. Thus, the CSUB can include means for enabling a Placer or Acceptor to announce that he will not retract a bet, or will not sell the bet, or will not hedge the bet. Thus the user leaves himself more exposed but can give his bet more force as an expression of probability. The CSUB can include steps for specifying whether the bet is locked-in, and what kind of lock-in is specified: non-hedge, non-sale and/or non-retract. And, the system can include means for allowing other users to challenge (called a system judge about) a hedge or a sale or a retraction of a bet that has been locked in.

Infinite Variety of Bets

We have limited our discussion to probability based bets with payoff odds, X-Y. However, there are many other types of useful bets, theoretically an infinite number. For example, a useful bet is what we will call a quantity bet. For example, two people can estimate a quantity, say the number of gumballs in a jar. The person who guesses closer wins. The payoff rules can be quite varied for quantity bets. The point is not to discuss such bets but to say that a CSUB can include many other types of bets. The applicant hopes to discuss some of these in a future application.

Betting Versus the System by Random Number Generator

Another useful feature the CSUB can include is allowing user's to bet against the system using a random number generator. Here a user would make an actual odds bet and let the system pick the side by random number. The advantage of such a bet is that a person can bet without having anyone interested in a bet. Also, a person who fears he will be betting against more knowledgeable people can, of course, keep those opponents from betting against him. The drawbacks are several though, including that the system must appoint someone to monitor the bet and that the bet may have no meaning past the fact that the user is willing to bet on what is essentially the flip of a coin. Nevertheless, in certain cases, such a bet may be useful.

The system could also include the feature of having a user bet against a random user where the side the random user takes is determined by random number generator.

7. Overview to Part II

The main purpose of Part II, of course, is to add new features to the system of Part I. Hence, new features will be described throughout Part II. Part II also elaborates on the importance of some of the features disclosed in Part I, especially those in section 6. In these cases, Part II does not disclose new subject matter but just better explains the role of given features.

Part II describes the system somewhat differently than Part I did. This is only a change in the manner of description so that all the new features and their roles can be explained as forming a larger system than the system of Part I, and yet a system that builds on the system of Part I. All the features of Part I remain and are the basis for understanding Part II.

We do not redescribe procedures from Part I, except in certain cases for clarity's sake.

In Part I, the description was organized around the procedures that the system includes. In Part II, the description, in a sense, is organized around what we call a User's Bet Statement Record (UBSR). This is the record that is created when a user enters a bet statement. All the information that a user enters about the bet statement is registered in this record. And all the other information about the bet statement that the system processes, and that concerns the user, is regsitered in this record. So we refer to this record regularly.

A second generic record is the Bet Statement's Market Record (MR). To oversimplify, it is made up of all the UBSR's for a given bet statement.

(Note: the bet record of Part 1 is something that, depending on the context, referred to both a UBSR and an MR. Here we explicitly differentiate between the two).

(Note also: the term record is not meant in any special computer science sense. It is meant in the sense of a medical record in that the information in it refers to a common subject, not a patient of course, but the bet statement and the user who has made the statement. Together they make up the subject. By contrast the MR is about the bet statement generically, which multiple users might have entered information about. The MR is made up of information registered in individual UBSR's).

A third key record is the User Record (UR). This was described in Part I. In this record, the CSUB stores the user's identification data and of all the UBSR's (or pointers to all the UBSR's) for a given user.

These three records are described in section 8 before any new options and procedures are described. Distinct from these records are the transaction options and procedures that the system includes. These options and procedures enable a user to transact bets, to see bets, to see the results of bets, and to enter and see non-bet statements that are associated with bets. Therefore, after describing the key records, Part II describes numerous options and procedures that the system can include for enabling people to use bets as a communication tools. Rather than summarize these options here, we give a table of contents at the end of this section.

Aside from new transaction procedures for bets, the main new things Part II describes are new bet agreements that can be implemented in the system. We call these quantity bets (they were mentioned very briefly in section 6). And so we have three distinct kinds of bet agreements:

1. Probability based bets (P-bets),

2. Quantity based bets (Q-bets) and,

3. Guarantees (G-bets).

These kinds of bets differ mainly in their payoff rules, but not in most of the procedures for using the bets—for example, procedures for entering a bet, settling a bet, entering a supported statement, and so on. Just as there are three types of P-bets, there are three types of Q-bets: straight bets, flip bets, and range bets.

Now not all the options and procedures described apply to all the bets. For example, G-bets do not come in three types. Still, most options apply to all three kinds of bets.

In addition to elaborating on bet agreements, Part II elaborates on the CSUB's means for enabling users to enter independent probability estimates. In Part I, these were described as going along with bet offers. Part II (section 8) shows how they can be entered and used even without a bet offer. Further, the system also enables users to enter independent quantity estimates (IQE's) that are directly analogous to IPE's. We will call both of them together independent estimates (IE's).

A question arises as to how to present the material. Which should we describe first, procedures just for implementing Q-bets, or general transaction procedures that apply to all bets? Neither way seems much better than the other so, for the sake of continuity from Part I, we will describe the common procedures first, applying them mainly to P-bets and G-bets. (In describing the three key records as well, we will also illustrate with P-bets and G-bets, while realizing that the same entities and ideas apply to Q-bets).

After discussing new procedures for P-bets and G-bets, we will describe how the system can enable people to transact Q-bets. And then we will discuss how the common procedures apply to Q-bets.

After section 15 on Q-bets, we describe the group records, the MR and the UR. Then we elaborate on how the CSUB can be a general purpose communications system. And finally we describe some important "extras."

Some Notes on Terminology

Option means a procedure as it is presented to user. For example, an Enter Bet option or an Accept Bet option. When we say procedure, we mean a set of steps that the system takes to execute a given option. As in Part I, when we recite steps that the CSUB executes we usually do not mention that the CSUB includes forms for enabling users to enter the requisite information, taking this fact to be implied.

Enables means includes means for enabling.

Instead of saying a user we will use the names Jim and Beth. Jim will usually take the lead role with Beth responding to Jim. For example, where Jim is the Placer, Beth would be the Acceptor.

| Table of Contents for Part II | |
|---|---|
| Section 7 | Overview to Part II |
| Section 8 | Three Records |
| Section 9 | Market Options |
| Section 10 | Additional Acceptance Procedures |
| Section 11 | Change Procedures Revisited |
| Section 12 | Settling Procedures Revisited |
| Section 13 | Secondary Market for Bets |
| Section 14 | Sum Over Histories Bets |
| Section 15 | Quantity Bets |
| Section 16 | The Spectrum (The Market Record) |
| Section 17 | User Statistics |
| Section 18 | Communications Options and Aspects |
| Section 19 | Paying for Attention |
| Section 20 | Miscellaneous |
| Appendix | Venture Capital Bets |

8. Three Records

The CSUB is a data base system for storing, displaying and transacting bets so, obviously, it needs to create bet records. We divide bet records into two generic kinds called a User's Bet Statement Record (UBSR) and a Bet Statement's Market Record (MR). And we will see that each of these is actually a series of records.

The MR is made up of all the UBSR's for a given bet statement, and so we discuss UBSR's first. Then we discuss how an MR is made up of UBSR's.

As noted in the overview, a third key record is the User Record (UR) which includes all the UBSR's of a given user. We discuss the UR last.

(How bet records are constituted exactly is not the point. We are not concerned at all with coding efficiency. We are concerned with describing the kinds of bet information that are registered and how they are identified. The method presented here for splitting the records is not the only possible way, but it seems to be a good one for explaining the kinds of information the system registers and how that information is identified, displayed and used).

8.1 The User's Bet Statement Record

A UBSR is the record that the CSUB creates to store a bet statement and information that a given user enters about the bet statement. The UBSR is defined by three essential fields:

a. a field for a bet statement,
b. a field for the user's ID data,
c. a field for the time the user enters the bet statement and/or information about the bet statement.

Figure 12:
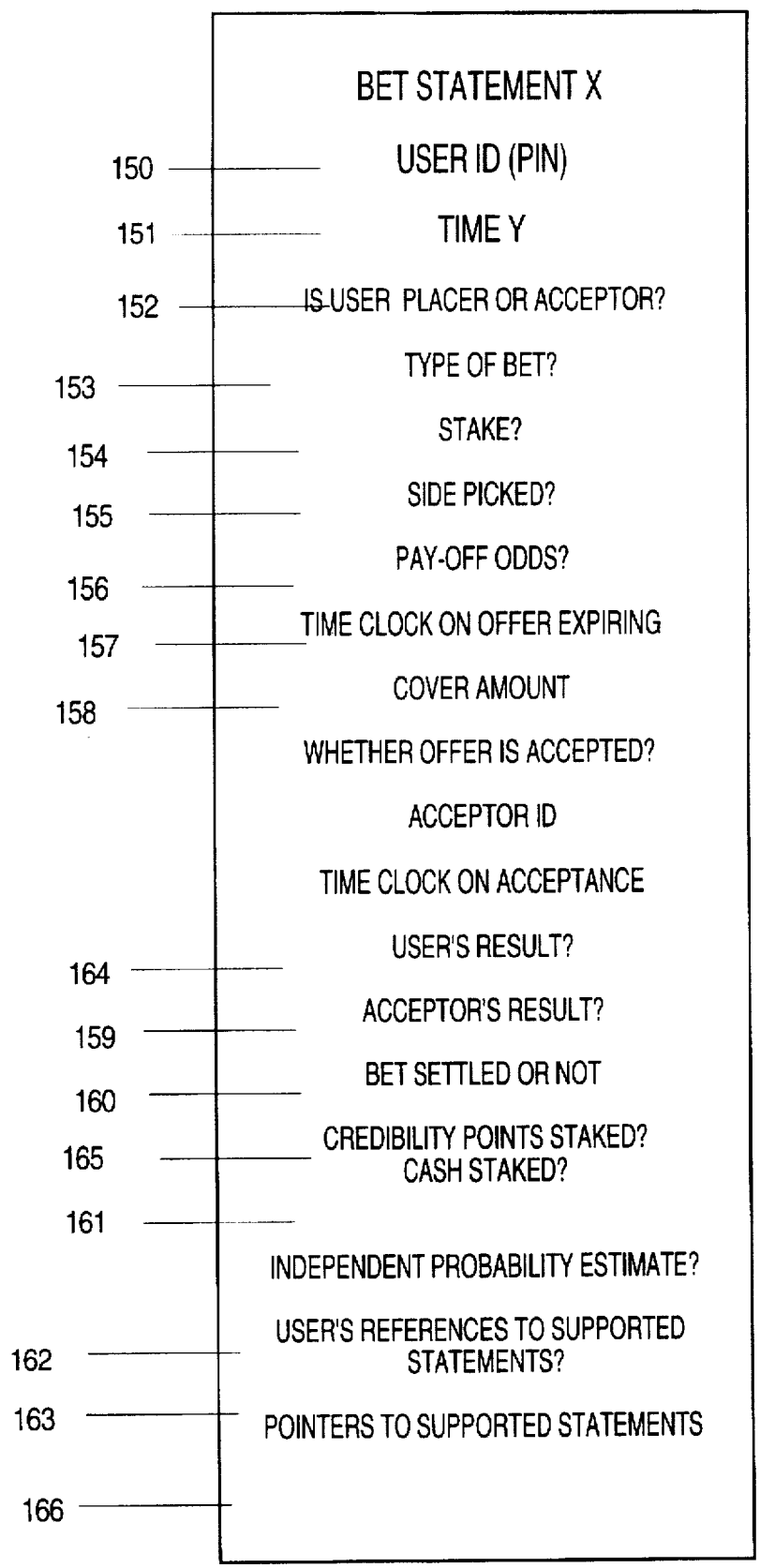
FIG. 12 shows a partial user bet statement record.

As shown in FIG. 12, we picture the UBSR as a long column of fields that can be filled with various kinds of information. The bet statement 150 is pictured at the top, followed by the user's ID data 151, followed by a time stamp 152.

For the sake of concreteness, we will use the following bet statement as our illustrative example:

The Dream Team will win the election. (Normally, a bet statement is not so short, but we use this for illustration's purpose. We sometimes abbreviate it as Dream team will win).

All the information in the UBSR is about the bet statement. In other words, all the information that a user enters into the system about a bet refers to the bet statement. The system can register more than just a single user's information in the user's UBSR. For example, if the user is involved in a bet with another user, the system registers who the other user is, and registers other information about the bet agreement (such as when the bet was accepted, and whether the bet has settled).

A UBSR does not hold information about a bet statement in general but information that concerns an individual user. And so the CSUB creates a UBSR for each user who has entered information about the given bet statement. For example, if Jim and Beth are in a bet with each other, the CSUB has created a UBSR for both parties.

Finding an Existing Bet Statement

The first time that any user enters a given bet statement the CSUB not only creates a UBSR for it, but also creates an MR for that bet statement and puts the UBSR in the MR. We call the first person who enters a given bet statement the starter of the market. After the starter has established a market, other users can find the bet statement for that market.

(Note on terminology: when we say that Jim enters a bet statement that means that he is either the starter or that he has found and selected an existing bet statement to enter information about. In other words, once a bet statement is entered for the first time, other people find it; they do not have to re-key it in. They still enter it though in the sense of selecting it when making a bet offer, or when entering other information about it).

Once another user, called her Beth, has identified a bet statement, she can respond to it in many ways, including of course, making a payoff offer about it. If she decides to explicitly respond to an existing bet statement in any way the CSUB creates a new UBSR for her. For example, if she finds, Dream Team will win, she may enter an offer that is different from any existing offer. Her offer is grouped in the MR along with the other offers.

A User Bet Statement Record Without a Bet Offer

The UBSR has only three essential fields that must be filled in, and so a UBSR might not even store a bet offer.

There are several instances where Jim may want to enter information about a bet statement but not make an offer. An example from Part I is a Challenge, where Jim enters a bet statement and challenges another user or users to make a bet offer, to put odds on the statement that is. There are other instances, which we will discuss as we go along.

What we see, to repeat, is that the bet statements are the kernels of the system; all the other information, including bet offers, is built around them. Seen this way, bet offers are only one kind of information that applies to bet statements. Of course, they are essential to transacting bets. Yet, it is not necessary in the CSUB that users always make bet offers concerning a bet statement.

Recap and Illustrations

To show how information is fed into the UBSR and how the information in each UBSR is the "raw material" of the system, let us recap the main options and procedures of Part I for placing, accepting and settling a straight bet.

When Jim selects the Place a Bet option, and the Straight Bet sub-option, the CSUB presents him with a form for entering the:

Bet Statement:
Stake:
Payoff odds:
Side:

The CSUB creates a UBSR for him for that bet statement, and it stores the type of bet, stake, payoff odds, and side in the UBSR.

In addition to registering what Jim enters, there are many things that the CSUB registers based upon Jim's information. For example, the CSUB registers whether or not Jim is the first to enter a bet statement. As another example, the CSUB registers when the bet is entered. In FIG. 12, we use question marks to signify information that Jim enters, and we leave off the question marks where the information is registered by the CSUB in response to, and in addition to, Jim's entries.

User Entries

Bet statement 150, the user's ID 151, whether the user is placing or accepting a bet 153, the type of bet 154, the stake 155, the side picked 156, the payoff odds 157, the deadline after which the offer expires 158, the Placer's result 159, the Acceptor's result 160, the type of commodity at stake 161, an independent probability estimate 162, references for finding the supported statement(s) in another data base 163.

(Note: We assume in this example that a bet is executed as was discussed in Part 1, and so we use the names, Placer and Acceptor for the two parties in a bet. In general, how the parties are named depends on the market option chosen. We do not show fields about market options, as we have not described them yet).

CSUB Entries

Time the of the users' entries 152, the time left after which neither party can back out of the bet unilaterally 164, whether the bet is settled 165, system pointers to the supported statement(s) 166.

Now, let us assume that Beth wants to accept Jim's bet. Beth chooses the Accept Bet option. The CSUB then creates a UBSR for her and registers the necessary information, as described in section 1E, in both Jim's and Beth's UBSR's. The CSUB, for example, registers Beth's identity in Jim's UBSR, and vice versa.

Much of the information in both records is the same, for the two parties are involved in the same bet. But much can be different. For example, Beth may enter a greater stake than the cover amount, the amount necessary accept Jim's offer. The two parties may enter different supported statements and different IE's. Moreover, one party or the other might back out of the bet. The point is that, while many of the facts about the bet agreement are common to both parties to a bet, there are also facts about the bet statement that are independent of an opponent in a bet. Both kinds of facts are registered in a user's UBSR.

Now let us consider IPE's and G-bets to illustrate a little more.

Let's say that Beth wants to respond to a bet statement but does not want to make an offer. Let's say she finds Dream Team will win, and selects the option of entering an IPE. Say she enters an IPE of 75%, which is registered in her UBSR. Thus she is on record as saying, at a given time, that she thinks the chances of the dream team winning are 75%. In section 6, we pointed out that an IPE could be entered along with a payoff offer. However, here we point out that an IPE or IQE can be entered without the user making any payoff offer. This is, obviously, an example of how a user can enter information into a UBSR without making any bet offer.

Another case that shows how information is registered in the UBSR is the case of a G-bet, which was discussed in section 6. This is a kind of bet offer but it has no payoff odds. It is a guarantee to pay a given amount of money or CP's, if a given bet statement is false (or true, depending on which side the Placer has picked). For example, Jim might enter, Dream Team will win, and enter the side: True, and enter the kind of bet: G-bet, and enter the stake: $1,000. Now later Jim might have a change of heart, and may retract the offer, changing it to a P-bet (if the G-bet concerns a quantity, he has the choice of changing the G-bet to a Q-bet). For example, he would find the bet statement in the system and select the Change option. He would then enter, say:

| Kind of Bet: | P-bet |
| Type of bet: | Straight bet |
| Payoff odds: | 90% |

The CSUB time stamps the new information and, in effect, creates a new UBSR with it, the current UBSR. The previous UBSR remains in memory (as noted, we are not concerned with coding efficiency, only in the kind of information that is registered by the system). In this case we assume that the side chosen and the stakes remain the same, though Jim could change them as well, depending on the change rules that apply.

Supported Statements

It may seem that Supported Statements are the exception to the rule, for they are not necessarily entered into a UBSR, but can be kept in their own records. However, a supported statement still refers to a bet statement and vice versa. Thus, the CSUB stores a pointer 166 in the UBSR to any supported statement, and/or stores reference information 163 that a user enters. As will be seen in section 18, a supported statement may not be stored within the CSUB but in another data base not connected to the CSUB. In this case, Jim must enter reference data telling where the SS is stored. In any case, there is no such thing as an SS without a UBSR.

Time Considerations

The time aspect of bets is critical because bet offers and bet agreements are evolving things. Even when a bet offer is not accepted, the UBSR is not a static record. For example, an important piece of information that is registered is how much time elapses during which the offer is on the table and not accepted.

Thus, the third UBSR field that must be filled is the time field. Here the system registers when a user enters information about a bet statement. Since a user will enter information at different times, we can think of a UBSR as an evolving set of records actually. For example, a bet on, Dream team will win the election, might have a payoff odds figure that changes over time, as the user changes his or her odds offer. As another example, the bet may be settled, thereby changing the result field. As another example, a user may retract a bet offer. There can be changes in most of the fields of a UBSR, all except the bet statement field and the user ID field. A user cannot change his or her own ID. And, if the user changes the bet statement, the CSUB creates a new UBSR.

Figure 13:
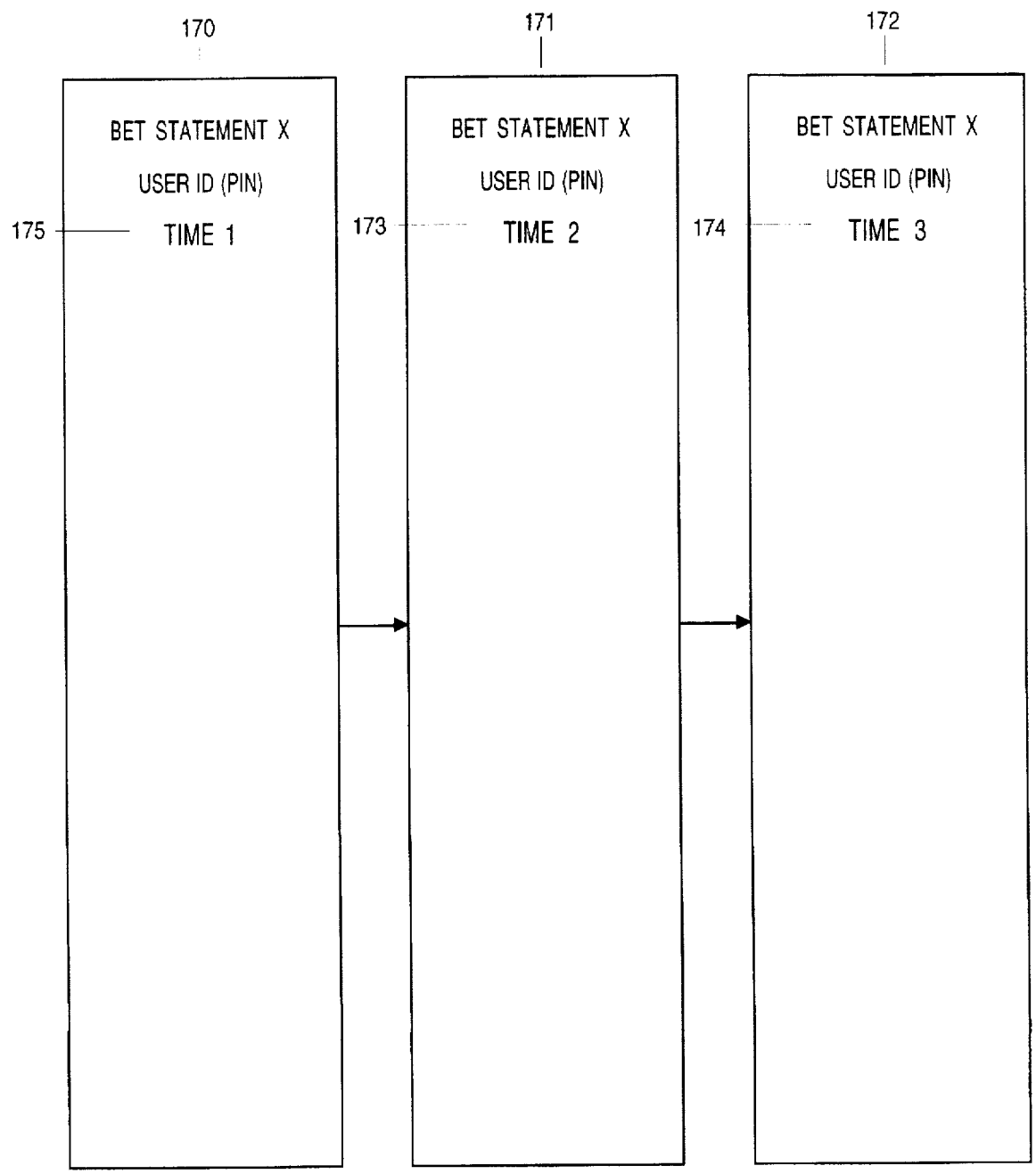
FIG. 13 shows an evolution of a user bet statement record.

We picture a UBSR as an evolving set of records in FIG. 13, where we show three columns 170, 171, 172 and assume that certain data in each column changes from times, $T_1$ 173, to $T_2$ 174, to $T_3$ 175. One can think of these records as distinct or as a single record that evolves. The CSUB stores not only the current UBSR but also the evolution of the record.

Kernels of the System

UBSR's are the individual repositories of information for bet statements. It is the bet statements that are the kernels of the whole system because almost all the actions of users and the system revolve around these statements, and almost all the information registered by the system refers to bet statements. This information is, of course, registered in UBSR's.

8.2 The Bet Statement's Market Record

Figure 14:
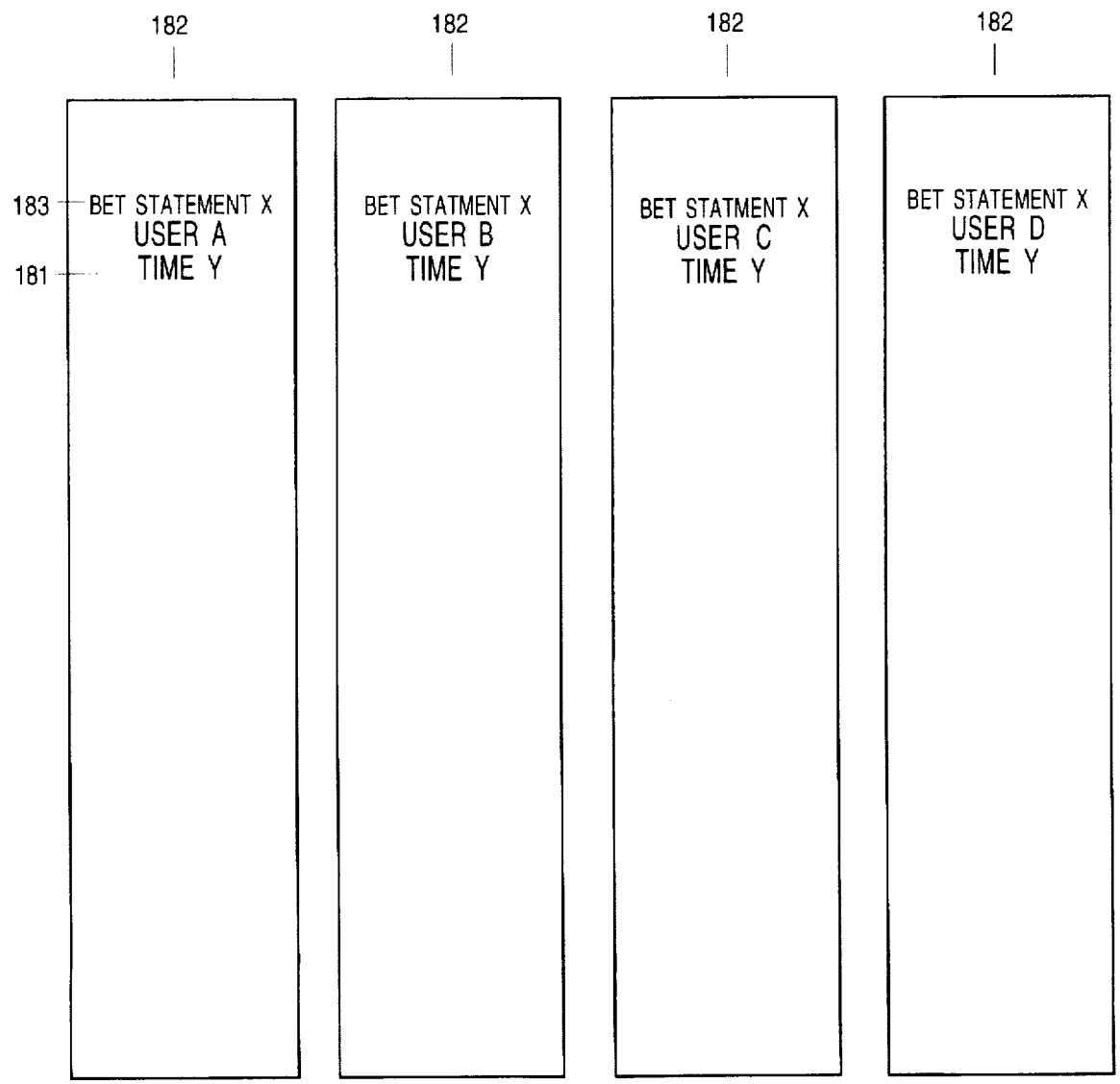
FIG. 14 shows a bet statement market record at a point in time.

The CSUB groups all the UBSR's for a given bet statement together. The name for this grouping is the bet statement market record, or market record (MR) for short. FIG. 14 shows the MR at a given time 180 as a set of UBSR's 181 which share a common bet statement 182. There may, however, be a single UBSR in an MR.

For example, all the people who are involved in bets about Dream Team will win the election will have individual UBSR's. All these records are grouped together to make a common record, the MR, that the CSUB compiles statistics about and displays information from.

The fact that two or more UBSR's are in an MR does not mean that a bet agreement is struck. The striking of bets depends on what offers are in the UBSR's, the times of those offers, and the striking rules that apply (see section 9).

As a consequence of the UBSR's varying over time, the MR varies over time. If it has more than one UBSR, it can vary more frequently than a single UBSR, of course. For example, assume that at a given time the MR for Dream Team will win shows some set of UBSR's. Now assume that a poll comes out about the election. Because of the poll, many people may change their bet offers (or other UBSR information) in some way. Hence the information in the MR may have multiple changes.

The current MR is the MR at the current point in time. So when we say that the CSUB shows the MR, we generally mean it shows the current MR. Since the CSUB stores the evolution of UBSR's, it also stores and display statistics about the evolution of the MR. This enables users to see how thinking about a bet statement has evolved in a community. For example, Jim can ask to see how odds about a bet statement evolved over time for all the people who were involved in bets about that statement.

Market Record Statistics Put in UBSR

It should be noted that the CSUB can use the MR to contribute to the UBSR's that make up the MR. In each UBSR in an MR, the CSUB can store market statistics compiled from that MR, such as the average payoff odds offered at a given time.

Market statistics allow comparisons of a user's bet with the collection of bets that share the same bet statement. Thus, the MR is not necessarily just made up of UBSR's; it can contribute information to them as well.

Two Purposes of the Market Record

The market record has two main purposes.

1. It enables users to see what all the other users of the system have said/offered about a given bet statement. That way, a person who is interested in DreamTeam will win can find out about multiple bets that have been made and offered. In other words, the CSUB can show the spectrum of bets that have been made and offered for a given bet statement. The CSUB can also show statistics that summarize the state of the market. Jim may just want to examine the spectrum or he may be looking to place or accept a bet. The CSUB can also include functions for helping him find a bet within an MR. For example, the CSUB can locate the bet with the most favorable odds for a given side. We discuss the MR more in section 16.

2. It enables the CSUB to strike bet offers. As discussed in the next section, the CSUB can include numerous procedures for striking offers. We can think of the MR, along with the CSUB procedures for striking offers, as market for a bet statement. But, we should not think of typical markets, like the stock market. The MR is different, as will be seen in section 16.

8.3 User Record

The user record (UR) was discussed in Part I. The only thing to mention here is that we might describe the UR in terms of UBSR's. The bet information in the UR comes from UBSR's. (We will discuss the uses of this group record in section 17).

9. Market Options

Part 1 described how users could place bet offers and accept bet offers, thereby making bet agreements, through the CSUB. Here we expand the notions of Part I in the sense that we do not simply use the terms placing and accepting (and Placer and Acceptor). We think in terms of presenting offers and coming to an agreement about the offers. In other words, new procedures are described by which the CSUB enables users to strike bet agreements.

In this section, we first discuss the notion of a bet offer in a larger context than was given in Part I. (Part I described an offer in terms of a Placer and an Acceptor because the simplest schema is the method of having, one party who first presents an offer and the other who then accepts it).

Next, we discuss the parties who present offers and strike agreements.

Then we get into a description of market options, procedures for presenting and agreeing to bet offers. Most of the discussion applies to P-bets and Q-bets, but we concentrate on P-bets, leaving the market option procedures that apply to Q-bets until after Q-bets are explained in section 15. After discussing market options for P-bets, we discuss those for G-bets.

Finally we discuss how the system can enable two parties to agree to a bet even though only a portion of one party's stake is covered.

9.1 Bet Offers Revisited

In Part I, the term bet was used to refer to both bet agreements and bet offers. The reader's common sense was relied upon to distinguish between the uses given the context. For example, the placing of a bet meant that a bet offer was presented, while the settling of a bet meant that a bet agreement was settled.

In this section we distinguish between three basic states of a bet: a bet offer, a struck bet, and a sealed bet. Depending on what information the CSUB registers, a bet can be in any of these states. While we will use these terms to distinguish between states of a bet, we will also often use just the term bet to refer to any one of these states. Bet is a convenient term and its meaning can usually be easily understood from the context.

(Note: We can further distinguish between innumerable other bet states—for example a retracted bet offer—but it is more convenient to think of these three basic ones, which can then be modified).

The three basic states of a bet are as follows:

1. A Bet Offer

A bet offer is defined by the information a user enters into the CSUB and the CSUB then registers in a UBSR. A bet offer is defined by terms spelled out in four fields of information which are for:

a. the bet statement, b. the payoff odds or payoff quantity or guarantee, c. the side taken, d. the stake risked.

These are terms that have been previously discussed. What makes an offer just an offer and not an agreement is, naturally, the agreement information. When no agreement is registered, we call the state of the bet a bet offer. We also use the following terms and phrases to refer to this state: an open bet, the bet is on the table, and the offer is on the table. All these mean that the bet can be agreed to by another party. The CSUB displays whether a bet offer is open or not.

Now there are kinds of information that the CSUB enables Jim to enter into the UBSR that prevent the CSUB from registering an agreement to a bet offer. For example, Jim might set a deadline on how long his offer is open for. At the end of this deadline, the offer is no longer on the table, even though the four fields of information above have been entered. Another entry that signifies that a bet is not open is the entering of a Suspend command (see section 11). Another such entry is a Retract command, which is somewhat different from the Suspend command, but has the same effect as far as stopping any agreement to the bet offer. We say that a bet offer is retracted, suspended or expired, when the corresponding commands have been entered.

What is most important to realize about a bet offer is that it is defined irrespective of calling the user a Placer or Acceptor, or any other name. To name a user who enters an offer we might use the term an Offeror (but that is an awkward word unfortunately). The point is that any time a user enters the information in the four fields above, the user is presenting a bet offer—unless the user has entered additional information for preventing agreement from taking place, such as a Retract command.

When the offer cannot be agreed to we say that the offer is off the table, and sometimes that the offer is closed. It can be off the table for various reasons, including that it has been agreed to.

If Beth is an Acceptor, as described in Part I, she agrees to an offer presented by a Placer, Jim, and at the same time, she enters her own offer. In other words, when an Acceptor accepts an offer she is also entering her own offer. Since she is agreeing to the Jim's offer, she is entering an offer and simultnaeously taking it off the table. Yet, if Jim backs out of the bet, Beth's offer remains; it becomes open, on the table.

2. A Struck Bet

A struck bet means that two users have agreed to the terms of a bet offer. In Part I, "agreed to" meant that one party accepted the offer that another party presented, which implied, of course, that both parties agreed to the offer. Still, here we have in mind the broader idea of an agreement process. The sequence of events is not the crucial thing. The crucial thing is that two parties have entered information that causes the CSUB to register that the two parties agree to a given offer.

Whether the CSUB allows the agreement to be registered depends on the striking procedures. Presuming an agreement is reached, given the market option chosen, the agreement is registered in the UBSR's of both parties to the struck bet. Also registered in each UBSR is who the opposing party is.

One important thing to realize, as we give a slightly different perspective on the process of striking a bet, is that there need to be two offers to strike a bet, one offer from each opponent. The offers may match exactly, except for the sides, or they may not. Even though there seems to be one ultimate offer that both parties agree on, actually each party is making that offer. So, if one party backs out, the other party's offer is still on the table. Anyway, the point is that there are two offers that are struck when "a" bet agreement is struck.

(Interestingly, the offer agreed upon may not be the original offer that either party entered in the first place. We discuss this possibility in the subsection 9.3 below).

3. A Sealed Bet

As discussed in Part I, the CSUB includes procedures for enabling a party to unilaterally back out of a struck bet. We call a bet agreement a sealed bet when the CSUB's rules no longer permit Jim or Beth to unilaterally retract the struck bet. This usually means that the deadline for making a unilateral retraction has passed, though the canceling rules can be more complicated, depending on what Jim and Beth have agreed to.

One thing Jim and Beth can agree to, for example, is that the time limit on the retraction clock is set to 0, which means that a bet that is struck is also automatically sealed.

(Note: We have also called the retraction clock by the names: confirmation clock, agreement clock, and time clock on the acceptance).

Names for the Parties to a Bet

In Part I, the terms Placer and Acceptor were used to refer to the two parties to a bet. These names usually are good in getting the idea across of an offer that is presented by a first party and accepted by a second party. Placer and Acceptor signify a sequence in other words. A first party does A and a second party then does B. Because this sequence is perhaps the simplest schema, we will use the terms Placer and Acceptor in later sections, for example, in describing procedures for Q-bets.

A Placer and Acceptor schema is not limited to just two parties. There may be more than one party that accepts a first person's offer. There may be a selection procedure, such as an auction, to select who will be the Acceptor. The point is that Placer and Acceptor are generic names for the idea of an offer that is first presented by one party and then accepted by another.

However, the terms Placer and Acceptor can be confusing for two important reasons. First, an Acceptor might accept a bet offer but put up a stake that more than covers the Placer's stake. This overage means that the Acceptor then has an open offer with a stake equal to the overage. In other words, the Acceptor becomes a Placer relative to future users who might accept the new open offer.

The second reason, and the more important one from our point of view here, is that the sequence may not be so simple. There are various ways, discussed below, that an offer can be presented, or that two offers can be presented and struck. In some of these there is no good reason to call one party the Placer and the other the Acceptor. For example, if Jim and Beth each put a price offer in a sealed envelope and then exchange envelopes, and then open the envelopes, and then strike a deal based on the price offers that are revealed, we cannot say that one party is the Placer and the other the Acceptor.

Still an essential aspect of the striking of bets is that there is a sequence of steps that takes place, leading to the striking of the bet (or the nonstriking). It is these basic sequences that will be described in this section.

In addition to the sequences there must be players, the two or more parties who present bet offers, offers that may or may not be struck.

Instead of giving names to the players now, we describe the basic sequences separately and then in each case give names to the players. Some names are repeated where sequences are similar.

In the discussion above and below, we assume that a user who wants to agree to a given offer has identified that offer so that the system knows which offer to register information about. Therefore, we omit the identification step, taking it to be understood. So, when we say that Jim enters, for example, an agreement command, the command refers to the offer that has been identified.

The following discussion includes market options whereby a user does not necessarily identify a single offer but instead identifies (responds to) a given bet statement by making an offer about that bet statement. The user's offer is then possibly matched (struck) with another offer about that same bet statement. We still omit the step of identifying the bet statement, taking it to be understood. We point out though where a user is making an offer that is not necessarily a response to an existing offer.

The character names for our two parties will usually remain Jim and Beth.

9.2 Price Offers

A bet offer is a kind of deal that a person offers to others. Part I described a system that enabled Jim to present an offer which Beth saw and could accept. But there are different ways of presenting an offer that allow Jim to try to improve his position, to get a better deal that is. Further, there are better ways for revealing a group of people's payoff odds offers (also called payoff offers).

In this section, we look at a bet offer as a deal with a price attached. In order to strike a bet, we need prices that "match" as defined by the striking rules. Since two bet offers that can be struck must have the same bet statement, what we have left is the payoff offer, the side, and the stakes. We ignore the stakes though until the end of this section, for the key is the payoff odds and the side which, together, make up the price offer.

Both P-bets and Q-bets have prices. As noted, in this section we discuss P-bets in particular, leaving the discussion of Q-bet prices until after we describe Q-bets in section 15. Still, most of the procedures for P-bets are directly analogous to those for Q-bets, and so will apply to the later discussion. In fact, most of the procedures apply to price offers in general. So when we say market options, what we mean is procedures for enabling Jim to enter an offer and have it struck, as determined by its price. How it can be struck depends on the market option selected.

Before discussing market options and their corresponding procedures, we define what we mean by price offer in a CSUB P-bet.

The Definition of Price and Price Offer in a P-bet

When people think of a price, whether for a TV or betting proposition, they normally think of a single figure, such as $199 or 3–1 against. In a P-bet a price is the payoff figure.

However we need to keep in mind that, for the purposes of coming to an agreement, a price is actually a price offer and, as such, it involves a side. A person offers to buy at a given price or sell at a given price. Or person offers to take True at a given price, or take False at a given price.

So, in the CSUB, when we are thinking about the striking of bet offers, a price is actually a price offer. It is a payoff odds figure and the side of the bet that is taken. For example, 3–1 is not a price offer, but 3–1 on True is a price offer. 3–1 on True is a different price offer than 3–1 on False.

This can be confusing because a price offer implies a price for both sides of a bet. For example, when Jim offers to take True at 3–1 he is obviously offering Beth the opportunity to take False at 3–1. So Jim's price offer does imply that Beth is being offered a price, but only for the side opposite Jim's.

In other words, in a P-bet, a price is a payoff figure that specifies the payoffs for True and False. A price offer not only specifies the payoffs for True and False, but also specifies which sides the two parties are to take.

The Definition of Better Price in P-bets

In a P-bet, a price is compared to another price from the point of view of a given side. A better price is one that has a higher payoff for that side.

Taking odds form X–Y then, a first price is better than a second when: the side taken is True and X1/Y1>X2/Y2. For example, when taking True, 9–1 is better than 8–1.

Conversely, a first price is better then a second when: the side taken is False and Y1/X1>Y2/X2 (or X1/Y1<X2/Y2). For example, when taking False, 8–1 is better than 9–1.

A worse price is one that has a lower payoff for a given side. Of course, when a price gets better for True then it gets worse for False.

In this application then, when we say "better price" or "best price" we mean from the point of view of a given side.

Note: Usually, the term price alone will mean a payoff figure. Sometimes though we will use the term price alone and mean that a side is taken. In these cases, price means price offer. The context will dictate the meaning.

Basic Striking Procedure in P-bets

The basic striking procedure in P-bets is simple and is the universal method for striking two price offers. (However, as with conventional price offers, there can be important variations, and these are the subject of this section). There are two essentials to a striking a bet:

a. The two parties presenting offers must have chosen opposite sides.

b. The two parties must offer each other equal or better prices than the parties offered themselves. In other words, when Jim offers a price, his offer specifies a payoff for both Beth and himself. Likewise, when Beth offers a price, she specifies a payoff for Jim and herself. The two offers are struck when Jim offers Beth an equal or better price than she specified for herself. Vice versa, the offers strike when Beth offers Jim an equal or better price than he specified for himself.

For example, if Jim offers 9–1 on True, and Beth offers 8–1 on False, then the bet will not be struck because neither party gets an equal or better deal than he/she originally offered. But, if one offer is 8–1 on True and one is 9–1 on False, then the bet will strike because both parties are getting equal or better deals than they originally offered. What the actual strike price will be—8–1, 9–1 or somewhere in between—depends on the striking rules in effect for the given market option. There may actually be three total prices: Jim's original price, Beth's original price, and the actual price where the two offers are struck (this third price is somewhere in between their original price offers).

In practice, this basic procedure can vary depending on how the price offers are presented, and whether there is more than one person offering Jim a higher price.

Aside: Another Way of Expressing Price in P-bets

Where P-bets are concerned, there is a second way that the system can display prices, in addition to payoff odds figures. It can display them in terms of expected values: cash or points, whichever is being staked in the given bet offer.

The payoff odds can be multiplied by $1 or 1 point to yield an expected value figure. For example, if Jim takes True, and sets odds of 50%, then he is making an offer to buy True at $0.5. That means that he will buy True at a lower price as well. A lower price in terms of expected values means that he has to pay less and he will get more from the person betting on False. Thus the payoff for True is higher when the price to buy is lower.

Again, as with expressing odds in X-Y form, we can have different conventions. The CSUB can display separate expected prices for True and False. We do not delve into this subject because the theory is well known. We just point out that the CSUB can display payoff offers not only in terms of odds but also in terms of expected values.

(Note: Expected cash and expected point prices can be important where the secondary market is concerned. In that milieu, we use the term price in a slightly different sense. That's because we are concerned with the selling of Jim's or Beth's position before a bet settles.)

9.3 Market Options

Now we describe procedures for presenting and striking bet offers. We call these procedures by the name market options because they are standard options that Jim can choose for presenting and striking his offer. The CSUB thus can include a menu of options for of enabling Jim to present a bet offer to other users.

(Note: All bet offers with the same bet statement are grouped by the CSUB in the same market record (MR), regardless of what different market options might apply to the offers. The CSUB can include means for enabling people to view the MR according to type market option chosen.)

In describing market options, we make three simplifying assumptions:

a. We assume that Jim and Beth are making straight bet offers. Why? Because, flip and range bets are actually double bet offers-where two bet offers are made and not just one. Each bet of a double bet is a straight bet. In other words, when Jim makes a double bet, he is making two straightr bet offers whereby he takes a different side in each of the two bets. Normally, the same striking procedures apply to each straight bet of the double bet. The only difference is that Jim might have a choice as to which bet of a double bet to strike. That is a detail though and not the main point. Arbitrary rules can be made up in that case.

b. As was done in Part 1, we assume that Jim and Beth have entered stakes that cover each other exactly, given the payoff odds in the bet offer. In practice, it will be more likely that Beth will only cover part of Jim's stake, or vice versa that Jim will only cover part of Beth's stake. There are simple procedures for enabling a user to cover part of the opponent's stake, and we will discuss them at the end of this section. Meanwhile, the essential steps have to do with price offers, not with the stakes involved.

c. We assume that sealing procedures are simple and rely on an agreement clock (the confirmation clock of Part 1 is an example of an agreement clock). The agreement clock, also called the retraction clock, will not always work as described in Part 1, as will be seen. Still it is assumed that a clock method is the key method of sealing bets. There can, of course, be innumerable variations.

Market options can be divided into three categories:
1. The first-come-first-serve method.
2. Auction methods.
3. The split the difference method.

We take these each at a time.

9.3a The First-Come-First-Serve Method

We abbreviate the first-come-first-serve method as the first serve method. The first serve method is the simplest striking procedure. The first serve method means that Jim enters a bet offer and the bet is struck with the first person, call her Beth, to agree to the offer.

Beth can agree to Jim's offer by entering a single command. Despite the fact that she enters only a single command, when she agrees to Jim's offer, she is making her own offer. For convenience, the CSUB enables her to do this with a single Accept command. What this command signifies is that she is entering all the same terms of the bet as Jim except with a different side chosen, and with an appropriately adjusted stake, so that both stakes are covered, as dictated by the odds.

Since Beth has her own offer, registered in her UBSR, even if Jim retracts his offer. Beth's offer stands-it remains on the table, unless she designates that it be canceled if Jim retracts his offer. Beth can, of course, add information to her offer, for example she can enter an IPE and an SS. She might even choose a different market option to be applied to her offer should Jim back out of the bet and her offer be left on the table.

The sealing procedure can be the agreement clock method of Part 1.

The CSUB can create a queue of potential Acceptors so that if the current Acceptor (Beth) backs out of the struck bet then the first potential Acceptor in the queue takes Beth's place. The potential Acceptors are not simply trying to accept Jim's bet offer; their offers are on the table for anyone else to accept. Thus, the CSUB creates a queue only in the sense of giving priority based on who entered a strikeable offer first.

One the other hand, the CSUB may only strike Jim's offer with the first person to accept it, while giving no special priority to subsequent strikeable offers. Sometimes it can be useful not to create a queue because more people are thereby encouraged try to accept Jim's bet and thus express their opinions. Should Beth back out of the bet, the offers that can strike with Jim's offer may be struck randomly or by some other method.

Thus, the CSUB program includes the following steps for enabling a user to select a first serve option, and for enabling another user to agree to the bet offer that is presented via a first serve procedure:

input designation of the first serve method,
input a first bet offer from a first user,
store the bet offer in the user's UBSR,
display the bet offer, along with the first serve designation,
input an agreement command from a second user,
create a second bet offer for the second user identical to the first offer except that the second user is assigned the side opposite the first user's, and with the stake set so that the ratio of the second user's stake to the first user's stake is equal to the ratio set by the payoff odds,
store the second bet offer in a second UBSR,
register in both UBSR's that the bet is struck and cannot be agreed to by any other user,
display that the bet is struck.

9.3b Auction Methods

As the name implies, an auction method means that Jim auctions his offer to the highest bidder. The bet is struck with the highest bidder, that is. (There can be arbitrary rules for breaking tie bids.)

When he chooses an auction method, Jim enters an offer in which he sets a minimum price he will agree to and in which he sets a deadline for bids.

(Technically, it is possible to do an auction without Jim entering a minimum bid. But, we will assume that Jim must enter a minimum bid because this will likely be the more prevalent way that auctions are done.)

There are two basic kinds of auctions: open and silent. In an open auction the bidders' price offers are displayed, while in a silent auction the bids are not displayed until the deadline closes. The CSUB enables Jim to choose either kind of auction. The CSUB also enables Jim to choose whether or not to keep his minimum price secret until the deadline closes. This option of a secret minimum by Jim doubles the auction possibilities:

| Jim's Minimum Price | Bidders' Bids |
| --- | --- |
| 1. Displayed | Displayed |
| 2. Displayed | Hidden |
| 3. Hidden | Displayed |
| 4. Hidden | Hidden. |

For example, Jim might enter:

| | |
| --- | --- |
| Bet Statement: | It will rain tomorrow in London. |
| Stake: | $100 |
| Side: | True |
| Market Option: | Open auction |
| Minimum Bid: | 1–1 |
| Minimum Bid Displayed?: | Yes |
| Deadline: | 4:00 PM today, Greenwich time. |

Bidders, if there are any, submit price bids and take the side opposite Jim's. When the deadline closes the CSUB checks which bid is highest, from Jim's point of view, and strikes the bet between Jim and the highest bidder.

We presume that the bet seals at the same time it is struck, at the close of the bidding deadline. Up until that time anyone may change a price offer. Thus we see that an agreement clock is used and that it is the same clock that is used for the submission of bids. There are innumerable different ways of sealing of bets, but in the case of auctions, a single deadline that applies to all bidders seems to be one of the simplest and fairest.

By registering and displaying the various bids, the CSUB provides another way of showing a spectrum of offers about a given bet statement.

(Note: Most Change options and Special Acceptance options, which are discussed in sections 10 and 11, can be applied, regardless of the market option chosen for a bet offer. For example, the CSUB enables Jim to lock in his minimum price offer so that he commits to sealing the bet at that price or at a higher price.)

So the CSUB includes options for selecting any of four auction methods by which Jim can present an offer to the community and by which that offer can be struck. Below we give steps for an open auction method where all price offers are displayed. The main difference between this method and the others is just the steps for the displaying or hiding of prices.

Open Auction Method Where No Prices Are Hidden

The CSUB includes the following steps for enabling a user to auction his bet offer using an open auction where all price offers are displayed:

input and store a first user's designation of an open auction offer where all prices are displayed, input the first user's bet statement, choice of side, stake, minimum bid, and deadline for submission of bids, store the bet offer in the user's UBSR, display the bet offer, including the auction designation, the minimum bid requirement and the deadline, check if the deadline has expired, if the deadline has not expired, check if a user (a bidder) has entered a Bid command since the last time the deadline was checked, if no Bid command has been entered, return to step of checking if deadline has expired, if a Bid command has been entered, input the bidder's bid (price offer), create a bet offer for the bidder using the bidder's bid, and assigning the bidder the side opposite the first user's side, and setting the bidder's stake such that the bidder's stake and first user's stake are in a ratio equal to that set by the payoff odds of the bidder's bid, store the bet offer in a UBSR for the bidder, display the bidder's bid, return to step of checking if deadline has expired, if the deadline has expired, stop inputting bids, check if any bids have been entered, if no bids have been entered, register in the UBSR of the first user that no bids have been entered, if no bids have been entered that are equal to or better than the first user's minimum price, register in the first user's UBSR that no strikeable bid has been entered, if one or more bids has/have been entered that is/are equal to or better than the first user's minimum price, select the best price offered to the first user, register, in the UBSR of the first user and in the UBSR of the bidder who offered the best price, that the bet is struck and sealed at that price and, display that the bet is struck and sealed at that best price.

Auction Options for Bidders

Now the CSUB can allow a bidder to choose the market option of an auction as well. In other words, Beth can enter a bid for Jim's offer but at the same time designate that she will take the best offer she can get before the deadline passes. (We assume, for simplicity's sake that the same deadline applies to Jim's and Beth's auction offers.)

However, when there are multiple bidders on each side choosing the auction option, problems can crop up in deciding which offers are to be struck and at what price. That's because there is no single reference price being bid at.

Say that all the offers below are silent and are minimum prices offers and are designated to be auctioned off to the highest bidder. How then are the offers to be struck and at what price?

| True | | False | |
| --- | --- | --- | --- |
| Jim | 1–1 | Beth | 3–1 |
| Angel | 2–1 | Denise | 4–1. |

Arbitrary rules can be set. For example, the system can strike strikeable offers randomly. (Another fair method is described in the next sub-section.) There is a great variety of possible procedures for deciding whose offer to strike with whose. The variety is too great to describe. All we can say is that some procedures are necessary because users will often enter the auction option in order to possibly get a better deal.

(Note: All four auction options will not be available to a bidder because by bidding for Jim's offer she will have already chosen to display or hide her price. But the point remains that the CSUB can enable her to designate the auction option.)

In the next market option described, we also see the problem of which offers to strike and at what price.

9.3c The Split the Difference Method

The split the difference (split-it) method for presenting a bet offer works in the following way:

1. Jim enters all the terms for a bet offer. The system registers the terms and displays them all except the price offer, which it hides.

2. Jim also enters a deadline which the system displays.

3. Beth takes the opposite side of the bet and enters her own price, which the system also hides.

Jim and Beth can change their offers up until the deadline expires.

4. When the deadline expires, the CSUB reveals the price offers and strikes or does not strike the bet according to the basic striking procedure with a split-it variation (to be described).

Regarding whether a bet is struck or not, there can be three situations:

a. Jim and Beth do not get offered better prices than they entered for themselves. (For example, if Jim offers 4-1 taking True and Beth offers 3-1 taking False, then neither person has received better than he/she entered.) So the bet is not struck.

b. Jim and Beth enter identical price offers except for the sides taken and the stakes. (For example, Jim offers 3-1 taking True and Beth offers 3-1 taking False.) So the bet is struck at the price entered.

c. Jim and Beth get offered better prices than they entered for themselves. (For example, Jim offers 3-1 taking True and Beth offers 4-1 taking False.) So the bet is struck. But at what price?

The solution of the split-it method is to split the difference of the overlap. By overlap we mean that Beth offers Jim a better price than he offered for himself, and Jim offers Beth a better price than she offered for herself. The prices "overlap." We can think of this as a conventional price offer situation, say, for the purchase of a bike. Assume that a buyer and seller enter offers silently (say that Jim and Beth each put a price offer in an envelope and that they then exchange envelopes) if the seller offers to sell a bike at $50 and the buyer offers to buy at $70, there is an overlap. Splitting the difference means that the sale goes through at $60.

But where P-bets are concerned, what is the middle? How do we split the difference? We do it in terms of probability. 3-1 corresponds to 25% and 4-1 corresponds to 20% so, in this case, the bet would be struck at 22.5% or 31-9. In other words, the bet is struck at (p1+p2)/2.

If the bet is struck at a price that is better than Jim and Beth entered, then their stakes are both reduced compared to what they originally expected to put up. The CSUB automatically adjusts the stakes so that they are in a ratio equal to the odds that the bet is struck at.

Thus the CSUB includes the following steps for enabling a user to present his bet offer using a silent bid method where any overlap in prices is split between the two parties to the bet:

input and store a first user's designation of the split-it option, input the first user's bet statement, choice of side, stake, secret price offer, and deadline for submission of an offer on the opposite side, store the bet offer in the user's UBSR, display the bet offer, including the split-it designation and deadline, and hide the user's price offer, input an Opposing Offer command, input and store a second user's bet terms, display that an opposing offer has been entered and, hide the second user's price offer, if the deadline has expired, reveal and display the prices, if the first user has presented the second user with a worse price than the second user entered for herself, register in both users' UBSR's that the bet is not struck, if the first user has presented the second user with the same price that the second user entered for herself, register in both users' UBSR's that the bet is struck at that price, if the first user has presented the second user with a better price than the second user entered for herself, register in both users' UBSR's that the bet is struck, register that the price of the struck bet is equal, in decimal form, to (p1+p2)/2, where p1 is the price offer of the first user, and where p2 is the price offer of the second user, subtract from the each user's stake such that the users' stakes are in a ratio equal to the payoff odds that the bet is struck at.

Multiple Parties Using the Split-it Method

The CSUB can enable multiple people, call them Jim, Beth, Denise and Angel, to use the split-it method. By that we mean that multiple people enter price offers on the same bet statement. The offers are all hidden until the deadline, which is set by the person, say it is Jim, who first enters the bet statement and chooses the split-it option. The CSUB can enable Jim to designate a group split-it option, which signifies that multiple people can enter offers to be potentially struck. This designation is displayed along with the bet statement and Jim's terms (except his price offer). Other people can then respond to the bet statement and enter their own hidden prices. Note then that Beth, Angel and Denise are not responding just to Jim's initial bet offer. They are responding to Jim's bet statement and the split-it option that applies. In other words, they have all chosen to enter a kind of silent bid process, which is not a conventional auction.

When the deadline hits, everyone's prices are revealed, and bet offers are struck or not struck according to the basic striking procedure with the split-it variation.

But when multiple parties are involved, how are the bets to be struck, if there are overlapping offers? For example, take the following case:

| True | | False | |
|---|---|---|---|
| Jim | 1-1 | Beth | 3-1 |
| Angel | 2-1 | Denise | 4-1. |

If we have just two parties, Jim and Beth, we can easily decide how to split the overlap. But with Denise and Angel in the picture, there can be various strikeable bets with different overlaps. For example, Angel's and Beth's offer can strike, but so can Angel's and Denise's. So which offers should strike? There is no ideal rule. Presuming there are different ways to strike the bets, one rule is to randomly strike bet offers that can be struck.

Another way is to first strike the two offers that together have the greatest overlap, and then strike the two that together have the next greatest overlap, and so on, until all the bet offers that can be struck under this method are stuck (there may be more than one remaining offer that does not get struck as a result). In the case above, Jim's offer and Denise's offer would strike at 13-7 (7/20, 35%), while Angel's and Beth's offer would strike at 17-7 (7/24, about 29%).

One advantage of having multiple people enter silent offers is that when prices are revealed, the system can show another kind of spectrum of prices that reflects peoples' probability estimates, a spectrum that results from this kind of silent bid process.

Note, in the illustration above, we imagine that two offers are made on True and two are made on False. However, the distribution of offers need not be equal on both sides. There can be any number of people taking one side or the other. In practice, the proportions usually will not be equal. Thus, there will usually be many unstruck offers.

9.4 Market Options for G-bets

We discuss here market options for G-bets. For the sake of concreteness, let's pretend that Jim is an executive of a water fountain company and that he has entered the following G-bet:

| | |
|---|---|
| Bet Statement: | The water in the fountain at the Tenley Library is lead free as defined by the District of Columbia safe drinking water act, and as measured by Water Testers, Inc. |
| Kind of Bet: | Guarantee |
| Side: | True |
| Stake: | $10,000 |

Recall, in a G-bet, Jim puts up a stake and he forfeits his stake if his bet statement is false (if the side he picked is wrong; we assume he picks True).

Let's call the potentially opposing party Beth. The question is, what are the selection procedures by which Beth gets to be the Acceptor of Jim's G-bet? By Acceptor we mean the person who has the right to collect Jim's stake if the bet statement is shown to be false.

9.4a Fees for Acceptance

If the cost for accepting a G-bet is zero then we have a problem. Why? Because, Beth's of all kinds would simply automatically accept G-bets in the hopes of winning, without intending to do any work to test the G-bet statements. So it seems that the CSUB must in most cases register a cost for accepting a G-bet. This cost might be an upfront fee, or a fee payable only if Beth is wrong and Jim is right. There can also be both fees: an upfront fee, and a penalty fee for being wrong. The CSUB displays any fee.

The CSUB can register a standard fee determined by CSUB rules, or it can enable Jim to set the fee, or it can enable Jim to designate an auction where the Beth with the highest fee bid gets to be the Acceptor. The CSUB can also enable Jim to designate when the fee, if any is owed, is to be paid.

If CSUB rules determine the fee and the fee goes to Jim then we can think of it as a fee to discourage Beth's from frivolously accepting the bet, and we can interpret Jim's G-bet as a guarantee. (These matters of interpretation are personal and one might think that any fee that goes to Jim is actually a stake, and that Jim's G-bet is a P-bet.)

However, if Jim sets the fee or holds an auction, and the fee goes to him, then the fee really seems like a stake, which makes the G-bet really a P-bet. We will assume then that if Jim sets the fee, or if he chooses an auction option, that he can also direct that the fee is to go to a neutral third party, (subject perhaps to Beth's approval). Thus the CSUB can include the feature of enabling Jim to designate a directed fee, and to state, in a field in the UBSR, where the fee is to go. The CSUB can then send the fee there or hold it in escrow to be collected by the designated third party.

The CSUB can also enable Jim to designate whether the fee is to be returned to Beth should she turn out to be right.

Whether or not the fee is returned is important for judging the meaning of the fee in terms of a probability statement. The CSUB can convert Beth's fee into a probability statement by comparing the fee to Jim's stake. In other words, while the fee is not a stake, it can be interpreted as a stake in order to look at it as a probability statement. If Beth can get her fee back then the fee can be treated exactly as a stake in a straight P-bet. If Beth cannot get her fee back then fee must be subtracted from Jim's stake to yield Beth's potential profit in the bet. This subtraction, of course, changes these pseudo-odds.

Thus, the CSUB can display a probability figure of: (Acceptor's fee)/(Acceptor's fee+Placer's Stake) in cases where Beth can get her fee back. The CSUB can also display a probability figure of: (Acceptor's fee)/(Placer's Stake) in cases where Beth cannot get her fee back. The probability figures can, of course, be converted into odds of X-Y form. For example, if Beth is willing to pay $2,000 for the right to be the Acceptor where Jim's stake is $10,000, then she believes—if she is using the logic of expected values-that there is at least a 16.66 . . . % chance that Jim's bet statement is false (presuming in this case that Beth gets her fee back if she is correct). The CSUB can show her fee in terms of payoff odds of 5-1 in a straight bet in which she takes False.

Thus the CSUB program can include the following steps for enabling users to designate and pay fees for a G-bet acceptance:

Placing Mode input a G-bet offer from a first user, called the Placer, input the fee required for accepting the offer, input when the fee is due, input the identity of the user, called the Recipient, to whom the fee is directed, input whether the fee is to be returned if the Acceptor is correct, store the offer including the fee information in a UBSR for the Placer, display the G-bet offer and fee requirements.

Accepting Mode input an acceptance command from a second user, called the Acceptor.

if the fee is due immediately upon the acceptance, deduct the fee from the

Acceptor's account, if the fee is to be returned if the Acceptor is correct, hold the fee for the Recipient, if the fee is not to be returned, send the fee to the Recipient, if the fee is not due immediately upon the acceptance, register, in the Acceptor's UBSR, the obligation to pay the fee to the Recipient, upon the settling of the bet, and depending on whether or not the fee is to be returned in the event that the Acceptor is correct.

Settling Mode if the Acceptor is correct, register the result in the UBSR's of the Placer and Acceptor, add the Placer's stake to the Acceptor's account, if the fee is to be returned to the Acceptor, and if the fee has been paid, return the fee to the Acceptor, if the fee is not to be returned, and if the fee is owed, send the fee to the Recipient, if the Acceptor is not correct, register the result in the UBSR's of the Placer and Acceptor, if the fee has been held for the Recipient, send the fee to the Recipient, if the fee is owed and has not been deducted from the Acceptor's account, deduct the fee and pay the fee to the Recipient.

9.4b Time Limits on the Acceptance of G-bets

It can be useful in many cases to set a time limit on the duration of the acceptance of a G-bet. By that we mean that the acceptance is rescinded if the Acceptor does not enter a bet result within the time limit. The rule holds even if the bet is sealed.

One reason a time limit can be useful is that it can give more than one person the chance to accept and collect on the G-bet. If there is no time limit, and if the fee for accepting is low, then a single person, possibly Jim's confederate, can accept Jim's G-bet and never try to settle the bet. Thus, Jim's guarantee may seem to be valid even though it might not be. For example, say that Beth decides to accept the G-bet above not because she intends to do any work to find out if the statement is false, but just in case it is proved by someone else in the future that the water in all District of Columbia library water fountains is full of lead. Beth is thereby blocking other potential Acceptors who might want to test the statement in the hopes of collecting Jim's stake.

Blocking potential Acceptors is a problem because a key object of the invention is to make G-bets a meaningful way to express that one is sure of a statement. An excellent way to make a G-bet meaningful is to let anyone possibly collect on the it. That way if the G-bet is not collected on it means that no one has been able to prove the bet statement wrong (of course, just because no one has proved it wrong does not mean that it is right; the costs of proving may be impractically high).

Yet while we want to let anyone collect on a G-bet, we often need to protect the Acceptor, Beth. That is because she may have made an investment in proving the G-bet statement false. For example, she might hire Water Testers, Inc. to do the necessary tests. At the end of the tests she wants to be assured that if she has shown the statement to be false that she will collect. She has no incentive to test the statement if someone else can collect the reward.

Thus a time limit serves two important purposes. It can enable more than one person to potentially collect on a G-bet statement, and at the same time, it can give an individual Acceptor the right to collect if she has done the work necessary to collect.

So, the CSUB can enable Jim to set a time limit for the duration of an acceptance. The CSUB stores and displays that limit. If Beth accepts the G-bet, and if she has not entered a bet result by the end of that limit, the CSUB cancels her acceptance and enables someone else to accept the bet.

(Note: The CSUB can also enable Jim to designate a time limit on the duration of an acceptance of a P-bet or Q-bet. We do not go into this possibility at any length because the basic principles are the same as those above, and because the feature is generally more important in G-bets.)

With the designation of a time limit on the duration of an acceptance and with the specification of fee requirements, a G-bet offer would normally include more than the four fields described in the beginnig of this subsection. For example, a G-bet offer might include the following:

| 1. Bet Statement: | The water in the fountain at the Tenly Library is lead free as defined by the District of Columbia safe drinking water act, and as measured by Water Testers, Inc. |
|---|---|
| 2. Kind of Bet: | Guarantee |
| 3. Side: | True |
| 4. Stake: | $10,000 |
| 5. Acceptance fee: | $100 |
| 6. Fee Due: | Upon Acceptance |
| 7. Fee Due to: | Blessed Sacrament Church |
| 8. Duration of Acceptance: | One month |
| 9. Fee returnable?: | No. |

Digression on the Option to Retract a G-bet

G-bets are different than P-bets and Q-bets in that Acceptors do not put up stakes to be risked. Therefore, certain market options for G-bets are different from those for P-bets and Q-bets. As noted though, most of the non-market options that apply to P-bets and Q-bets also apply to G-bets. For this sub-section, let us digress a moment and repeat that the CSUB enables Jim to retract his G-bet in the same ways he can retract any other bet. These ways usually involve an agreement clock (also called a retraction or confirmation clock). We repeat this point because, in the CSUB, the option to retract is a fundamental aspect of a G-bet offer, just as it is of a P-bet offer and a Q-bet offer.

(Note: if an acceptance fee has been paid in advance of the settle result, then the CSUB returns the fee when the Placer retracts the G-bet. The Placer may also owe a retraction fee, depending on the terms of the bet.)

4 Basic Market Options for G-bets

There are 4 basic market options that the CSUB can include for enabling Jim to present a G-bet offer and for selecting an Acceptor or Acceptors:

1. The first serve method,
2. The auction method,
3. The divide the pot method,
4. The first-to-file method.

We discuss these below.

1. The First Serve Method

The CSUB can enable Jim to designate a first serve option whereby the first person who accepts his G-bet offer is obligated to pay the designated fee and is registered as the Acceptor. The fee may go to Jim or it may go to the CSUB or to some other third party. We'll call this first Acceptor Beth.

The CSUB can create a queue of people who are interested in accepting the bet. Each person who enters an acceptance after Beth is put in the queue. Assuming that there is a time limit applied to the acceptance, the first person in the queue becomes the Acceptor, if Beth does not enter a bet result within the given time limit. The queue is also useful because Beth may retract her Acceptance, or she may fail to provide adequate evidence to support her bet result. The CSUB displays how many people are in the queue and when they joined the queue.

As is evident, the first serve method is essentially the same as that for P-bets, with certain modifications where fees and stakes are concerned.

2. The Auction Method for G-Bets

Many people may want to be the Acceptor of Jim's G-bet for there can be value in the right to get Jim's stake. It all depends on how likely people think it is that Jim's bet statement is false. Since more than one person may be interested in being the Acceptor, the CSUB can enable Jim to auction off the right to his stake.

The auction method for G-bets is directly analogous to that of P-bets. As with an auction of a P-bet offer, Jim sets a deadline for submitting bids. The person who submits the highest fee bid becomes the Acceptor. (As noted, the fee goes to a third party.) The CSUB can also create a queue of potential Acceptor's who are listed in order of their bid amounts.

An auction can have several advantages over other acceptance methods. Assuming that the auction is an open one, it allows Jim and other people to see the community's reaction to his bet offer better than other acceptance methods do. That's because if only one person can be the Acceptor then other people will often not bother to respond to the offer. But an auction gives numerous people the chance to respond and lets the CSUB show what these people would be willing to pay for the right to possibly get Jim's stake. Depending on the interest in the auction, the competition of bidders can force people to submit fee bids that tell more about the value of accepting the G-bet than a standard fee would. Further, as noted, the CSUB can convert the fee bids into probability figures and display these.

3. The Divide the Pot Method

The divide the pot method allows multiple people to accept Jim's G-bet. The Acceptors split the acceptance fee, and the CSUB automatically deducts the necessary shares from each Acceptor's account. As noted, there may be a time limit during which people can accept the G-bet, and the CSUB can enable Jim to set such a time limit.

When multiple Acceptors are involved in the same bet agreement, there can be various rules for settling the bet. For simplicity, we will assume that all Acceptors enter the same result.

If the bet is settled in favor of the Acceptors, they get to split Jim's stake. The CSUB divides the stake evenly between the Acceptors or assigns the stake randomly to one of the Acceptors.

Further, if Jim backs out of the bet and has to pay a retraction fee, the fee can be split among the Acceptors as well.

The main point of the divide the pot method is that it gives multiple people the incentive to accept a G-bet. The CSUB shows all the people who have accepted it. Thus the CSUB program can include the following steps:

Placing Mode
input a G-bet offer from a first party, called the Placer,
input a designation of the divide the pot method,
input the fee required to accept the bet, input a deadline for acceptances, store the bet offer in the Placer's UBSR, display the bet offer, including the designation, the fee and the deadline.

Accepting Mode input acceptances, if any, create a UBSR for each user who has entered an acceptance, display each acceptance and the identity of each Acceptor, display how many Acceptors there are, if the deadline has expired, stop input ting acceptances, divide the acceptance fee by the number of Acceptors to yield each Acceptor's Share of the Fee, deduct the Share of the Fee from each Acceptor's account.

Settling Mode if the bet settles in favor of the Placer, register the result in the Placer's and in each Acceptor's UBSR's, if the bet settles in favor of the Acceptors, divide the Placer's stake by the number of Acceptors to yield a Share of the Stake, deduct the stake from the Placer's account and add the Share of the Stake to each Acceptor's account, register the result in the Placer's and each Acceptor's UBSR's.

4. The First to File Method

The methods above for selecting who gets to be an Acceptor are not always satisfactory. An example will illustrate. Let's assume that Beth has accepted the G-bet above, and further, that she does not have the time or money to fund the lab tests necessary to find out the lead content of the fountain water. Now let's assume that another user, Denise, has found out the lead values. How can Denise accept the G-bet and get her fair share of Jim's stake, given the work she has done?

Well, another option that the CSUB can include is an option for enabling Jim to specify that the first person to find that Jim is wrong can collect Jim's stake. We call this method the first to file method because the first person to file evidence for the bet result is registered as the Acceptor. We presume that the result is that Jim is wrong. (In order for the Acceptor to collect, the evidence must be satisfactory. Whether or not it is satisfactory is judged by Jim and possibly-if there is a dispute between Jim and Denise—by a system judge.)

A G-bet can be a more powerful guarantee if anyone who finds out that the bet statement is false can collect on it. That is why the CSUB can enable Jim to designate that his G-bet can be accepted by the first person to find that the bet statement is false (recall, we presume Jim has picked True).

Now Denise may have evidence that Jim is right. In this case, Denise would not get to be the Acceptor. We presume that in the first to file method that there is a rule that a user who has evidence that Jim is wrong gets to be an Acceptor over a user with evidence that Jim is right. The reason for the rule is to encourage people to find out if Jim is wrong. For the rest of this discussion, evidence will mean evidence that Jim is wrong, and bet result we will mean a result stating that Jim is wrong.

By first to find we actually mean first to file evidence in the CSUB. By that we mean that the CSUB enables Denise to enter a description of the evidence that she is using to back up her result. As will also be noted in section 12.4, the CSUB can include a field in the UBSR for entering a description of evidence for a bet result. When Denise accepts Jim's G-bet, the CSUB enables her to also enter her description of evidence into this field. Jim can then review the evidence and decide whether he agrees. The CSUB stores and time stamps Denise's description of her evidence.

The bet may seal automatically when Denise enters her acceptance and evidence. Or, Denise may enter her description of evidence before the bet seals. The CSUB can therefore also enable her to keep her evidence secret. The reason for keeping the evidence secret is that Denise may want to hide it from Jim until the bet seals. If he sees the evidence before the bet seals, he will probably want to back out of the bet.

Another reason for keeping her evidence secret is that she may want to keep it from other potential Acceptors in order to avoid disputes, even though she has established her priority claim through the CSUB time stamp. Normally the CSUB would reveal the fact that she has entered evidence, but it might not. There are various possibilities as to how much information is revealed.

The first to file method can be used in conjunction with the first serve or auction or divide the pot methods, if these methods have a time limit applied. In the case of a time limit, an existing Acceptor, Beth, can be displaced by a first to file Acceptor, Denise, only if Beth has not entered a bet result by the deadline. If Beth fails to enter a bet result by the deadline, Denise jumps to the head of the queue of people who want to accept the G-bet, presuming Denise is the first to file. In other words, under a first to file method, once an existing deadline runs out, the CSUB gives precedence to Acceptors with evidence over Acceptors who do not have evidence. The CSUB can also create a queue of users who have evidence of a bet result.

9.5 Addendum: Covering Only Part of the Opposing Side's Stake

Here we discuss how the CSUB can enable Beth to only agree to cover part of Jim's stake, or vice versa, enable Jim to only cover part of Beth's stake. The key idea here is the cover amount, which we will define. (Note: here we are referring to the cover amount in the context of P-bets.)

Definition of the Cover Amount

The cover amount is not a single figure. Like a stake figure, it depends on the side of the bet that a person is on. If a stake is set on one side, we say that the cover amount is on the opposite side. If Jim has offered a payoff odds figure and a stake, the cover amount is how much Beth needs to put up to set the stakes in a ratio equal to the ratio of the payoff odds. For example, say Jim takes True and puts up $100 at 2-1, then Beth's cover amount on False is $200.

Assuming payoff odds are expressed in X-Y form, the cover amounts are:

X(Stake on True)=(Cover Amount on False)Y.

X(Cover Amount on True)=(Stake on False)Y.

The cover amount is not the same as the stake that is offered by the opposite side. It is just the amount that is necessary to have the stakes be in the same ratio (proportion) as the payoff odds. Of course, the stakes may be in that proportion to begin with.

Steps for Enabling Users to Cover Stakes Partially

The way that the CSUB enables Jim and Beth to strike a bet, even though their stakes are not in the same proportion as the payoff odds, is to strike one bet where the stakes are in proportion to the odds, and then create a second bet offer that is left on the table using the remaining stake. For example, say Jim and Beth make the following offers:

| | |
|---|---|
| Bet Statement: | It will rain today in London. |
| Odds: | 2-1 |
| Jim's Side: | True |
| Jim's Stake: | 100 points |
| Beth's Side: | False |
| Beth's Stake: | 500 points. |

The CSUB strikes a bet with all the same terms except that the bet is struck with Jim's full stake and Beth's cover amount, 200 points. The CSUB then creates a second offer for Beth using her remaining 300 points, and keeping the rest of her terms the same. This second offer has a separate UBSR, for it is a separate bet offer.

So the CSUB includes the following steps for enabling bets offers to be struck where the stakes offered are not in proportion to the payoff odds (X-Y):

Take ((Original Stake on True) x X)—((Original Stake on False) x Y).

If the difference is zero then strike the bet at those stakes.

If the difference is negative then, change the bet offer for the party who took False setting a New Stake for that party set such that:

((Original Stake on True)×X)—((New Stake on False)× Y)=0, strike the bet at the those stakes, then, create a new bet offer, including a new UBSR, for the party taking False, such that all the terms of the original offer are the same except that the stake is set at: (Original Stake on False—New Stake on False).

If the difference is positive then, change the bet offer for the party who took True setting a New Stake for that party set such that:

((New Stake on True)×X)—((Original Stake on False)× Y)=0, strike the bet at the those stakes, then, create a new bet offer, including a new UBSR, for the party taking True, such that all the terms of the original offer are the same except that the stake is set at: (Original Stake on True—New Stake on True).

10. Additional Acceptance Procedures

When Jim puts a bet offer on the table, he can be very vulnerable to people who know more than he does, especially if he is the starter of a market.

A chief protection against this problem is that Jim can back out of a bet before the deadline passes for sealing the bet. The CSUB can enable Jim to set the time limit on the acceptance clock, the clock that determines how long user's have to retract a struck bet before the bet is sealed. While a time period for backing out can help Jim, so can the lack of any period in certain situations. If he wants, Jim can set the clock to 0, meaning that any acceptance is immediately sealed. The time period of the acceptance clock is shown as part of the bet offer (as is the time left once the bet is struck).

As another form of protection, the CSUB can enable Jim to set a time limit on when a bet offer expires. After the time limit passes, the offer is off the table, though the CSUB can still enable people to find and see what Jim had previously offered.

Certain market options, such as auction procedures, can also afford Jim protection from more knowledgeable people.

Additional, Standard Acceptance Conditions

In addition to these standard acceptance conditions above, the CSUB can enable Jim to enter additional, standard acceptance conditions for restricting who is eligible to accept his bet offer. When we say standard we mean it in the sense of options that the CSUB can enable Jim to automatically select, and that the CSUB can act upon, in the sense of following the instructions of the condition(s). For example, as mentioned in Part I, the CSUB can enable Jim to restrict who can accept a bet based the name of the user. The CSUB can then check the name of an Acceptor against the name(s) that have been authorized or unauthorized. The CSUB can then reject unauthorized Acceptors.

When Jim does not specify the names of who can accept a bet, it can be very useful for him to know who he is betting against. Yet Jim may have a large problem in facing an anonymous opponent who knows more than he does (as noted, the CSUB includes means for enabling users to bet anonymously). So a useful, standard condition that can be made part of Jim's offer is that Beth is required to reveal her identity. Another useful acceptance condition is that Beth must reveal her UR, her betting record that is. In other words, CSUB can enable Jim to enter conditions restricting Acceptors based on whether they will reveal their identities and based on whether they will reveal their UR's.

Thus, in addition to all the other bet offer information that the CSUB program enables the user to enter, the program can include the following steps for enabling a user to restrict who can accept the user's bet offer:

In Placing Mode a) input the identities of those users who are allowed to accept the bet offer.

b) input condition that any acceptor must reveal her identity.

c) input condition that any acceptor must reveal her UR.

d) display conditions entered along with the rest of the bet information.

In Accepting Mode (Each step below corresponds to the appropriate step above.)

a) if Acceptor's identity does not match that (or those) entered by the Placer, reject the acceptance and display message, "Sorry, you are not authorized to accept this bet."

b) if Acceptor selects the option of being anonymous, reject the acceptance and display message, "Sorry, if you want to accept this bet offer, you cannot remain anonymous."

c) authorize the Placer to access the Acceptor's UR (when seeing the bet offer, the Acceptor will have seen the display of the condition requiring that the UR is revealed. Hence, the accepting of the offer implies that the CSUB should make the Acceptor's UR accessible to the Placer).

Now another useful condition that Jim may want to impose is that Beth must make a flip or range type bet. In other words, Jim can insist that Beth make two bet offers, one on each side of the bet statement. That way Jim can see what Beth thinks of the side that Jim is tentatively on.

Jim may then decide to take the side opposite the one he took originally. In other words, Jim might end up taking Beth's bet offer for the opposite side. Or, Jim may back out entirely, seeing what Beth is willing to bet. The point actually is not Jim's options once Beth has made a flip or range bet, but simply that the CSUB can enable Jim to require that Beth make an offer on both sides of the bet statement. This condition can be an important protection for Jim.

Thus the CSUB program can include the following steps for enabling a Placer to restrict Acceptors to those who enter flip or range bet offers:

In Placing Mode input the condition that Acceptors must enter flip or range bet offers.

display the condition along with the rest of the bet information.

In Accepting Mode if Acceptor does not enter a flip or range bet offer, reject acceptance attempt, and inform Acceptor that she must enter a flip or range bet offer.

Entering Custom Acceptance Conditions

In contrast to standard acceptance conditions are custom acceptance conditions. By custom conditions we mean conditions that the CSUB cannot monitor or act upon, besides recording them. For example, Jim may enter a condition of: This offer can only be accepted by a Senator. The CSUB enables Jim to include any custom acceptance condition he wants in a bet offer.

Depending on convention, these terms may be part of the bet statement, but it is more convenient and appropriate to make them separate terms. Thus, as with a standard acceptance condition, a custom condition has its own field in the UBSR, and a corresponding option button for entering the condition. The condition (or set of conditions) is then displayed as a separate term of the bet offer.

Now when a user goes to accept an offer with a custom condition attached, the CSUB presumes the user is doing so in accordance with the condition—the CSUB cannot check, for example, whether Beth is a Senator. Therefore, it is up to Jim to complain if Beth is violating the condition. The CSUB enables Jim to call for a system judge who can cancel the Beth's acceptance, and possibly assess a fee against Beth, if she accepts a bet contrary to the custom acceptance conditions that Jim has set forth.

11. Changes

A key object of the invention is to enable people to explicitly change their minds, to change their opinions as expressed in bet offers (and in supported statements, IE's and other UBSR information). Simply put, it should be easy to retract or correct or strengthen statements in public, and the CSUB enables users to do that.

Consider a reporter who has just covered a concert and writes a supported statement describing the size of the crowd and then places a supporting bet about the attendance figure. Now imagine that twenty people, within a short period of time after the story is published, try to accept the bet (depending on the striking rules that apply for multiple Acceptors, only one person may succeed), and imagine that no one offers to take the reporter's side of the bet. Well, that is cause to think. The reporter may want to suspend the bet offer, or retract and possibly modify it. The CSUB enables him to do these things automatically.

Thus, in addition to the Retraction (Change) option discussed in Part 1, the CSUB can include a Suspend option which, when entered, suspends the bet offer, but does not retract it entirely. This option allows people to accept the offer for the sake of seeing community reaction to the offer, and for the sake of priority should the bet be reactivated, but any acceptances are not binding (they do not cause the CSUB to strike the bet offer). The CSUB would also include a Reactivate option for canceling the Suspension.

As noted, the CSUB enables people to see an evolution of changes that Jim has entered, as registered in the UBSR. Another useful feature the CSUB can include then is one that enables Jim to make what we will call a change statement. By this we mean that any time Jim makes a change in bet offer information (or other UBSR information), he can press a Change Statement option button and enter a comment giving reasons for the change. The system then links the comment to the change such that comment can be accessed from the changed data and vice versa. When we say that the system links the comment to the change, we mean it links the comment to both the bet information that was the current information before the change was made and to the new bet information that is current information after the change is made.

The CSUB can show that a change has occurred by displaying a notice of a change along with a given piece of UBSR information. The system can enable Beth to select the piece of information and then call up the previous information by pressing a Display Previous command. (Alternatively, the system might not explicitly show that there has been a change, and may leave it to Beth to select the information and then press Display Previous.)

For example, taking our reporter, he might enter the Retract option, and might then enter the Change Statement option, after which he might enter, I retract my bet about the size of the crowd because twenty people have wanted to accept it and no one has wanted to take my position. Some people have given good reasons for their acceptances (see their supported statements). I will investigate further. Anyone seeing the retraction, which the CSUB displays as part of the current bet information, can ask to see a change statement that is linked to the retraction.

Registering Secondary Market Sale Offers and Actual Sales

A fundamental way that the system can register changes is when a user decides to sell his bet in the CSUB's secondary market or any other secondary market. Offering to sell into a secondary market is like changing the payoff offer of a bet that has been struck (presuming the sale is at a different figure from the struck offer). The CSUB automatically registers a sale offer and/or an actual sale that is made in the CSUB secondary market. The CSUB can also include an option enabling users to register a sale offer and/or actual sale that has been made in a secondary market outside the CSUB. The CSUB can also enable Jim to explain a sale offer with a change statement.

Lock-in Option

The opposite of the change options above is a lock-in option, which was discussed in section 6 of Part I. To elaborate just a little, the CSUB can include an option which, when selected, locks the bet offer in for a period of time such that Jim commits to sealing the bet if the bet is accepted within a given period of time. The CSUB can enable Jim to specify the period of time that a lock-in clock is set for, and the CSUB can display how much time is left on the clock. Jim can further specify that an offer will not be hedged in the primary market or sold in the secondary market. Such lock-in commitments can give more force to the meaning of a bet offer.

The CSUB can include means for enforcing Jim's commitment(s) by blocking him from retracting his bet offer, from making any sales of his bet and from hedging the bet. But stopping Jim from selling or hedging is hard to impossible because he can sell outside the CSUB and can hedge by modifying the bet statement slightly.

Setting the Retraction Fee

As noted in Part I, while either Jim or Beth can retract a bet offer in a struck bet, they may also have to pay a retraction fee that goes to the opponent. The CSUB enables Jim to set the retraction fee, which is then part of the bet terms. The amount of the retraction fee can be important for the meaning of a bet offer, because the more costly it is to get out of a struck bet the more confidence, usually, a person needs to have in making the bet offer. Thus, Jim can enter a retraction fee into the UBSR. Then, presuming the bet is struck with Beth, if either party backs out of the bet, the CSUB automatically transfers the retraction fee from that party's account into the other party's account.

12. Bet Results and Settling Procedures Revisited

This section will be split into a few subsections, all of which share the same theme: procedures for registering bet results.

To recap, in Part I, we described the settling of bets in which two parties to a bet entered results into the system. If the results matched, the CSUB registered a settle result. (Alternatively, if there was a dispute, a judge could enter the settle result.) Thus, we had three results that were registered: the result from Jim, the result from Beth, and the settle result (if the bet was settled).

In this section we will expand on this basic scheme, giving some other ways that the CSUB can register bet results.

(It might be noted as an aside that most bets will not be settled because the cost of settling, the cost of finding the results, will be too high. The visible lack of settling helps expose the costs of finding things out, our basic barrier to knowledge.)

Section 12.1 Non-Acceptance of a Bet, a Very Important "Result"

A "result" (really more of a non-result) that is quite important, and that the CSUB registers, is whether a bet offer has been accepted. Why is this important? Well, the lack of acceptance can indicate many things.

If a bet is not accepted, that often means that people think it will not be profitable to accept it. In other words, the payoff odds state a lower probability that Jim's side is true than any bettor believes the actual odds to be. (For simplicity, we will assume from here on that Jim has picked True. And we will assume he has offered a straight bet.)

For example, say Jim enters the bet statement, It will rain today, and sets payoff odds of 25%. And say the bet is not accepted. Okay. We usually assume, though it is not always correct of course, that in a market there are many sharp people checking for good bets to accept, checking for overly optimistic payoff odds. Ignoring the philosophical problems of what actual odds are, the point is that if there is no acceptance then no one who has seen the bet—and that can include the most knowledgeable people on the subject of the bet—thinks that the payoff odds for the side picked are overly optimistic.

This point is also important where supported statements are concerned. Say that Jim makes a supported statement about the weather in which he says that the chance of rain is greater than 25%. And then say he places his supporting bet at payoff odds of 25%. Well, people seeing this bet and seeing that it is not accepted for a period of time may conclude that he is being conservative. They may assume this just from seeing the nonacceptance of the bet, and not by consulting some other weather report. That's because people who see that bet is not accepted know that there is a potential army of checkers checking to see if the payoff odds are more optimistic than the "actual odds." Thus the person's weather report is validated because his estimate, expressed in payoff odds, is not attacked—the bet is not accepted, that is.

The same principle applies to quantity bets where the non-acceptance of a bet can indicate that people think that the estimate expressed in the payoff offer is conservative.

To give another example, and one that is quite important, a user can offer a G-bet that a bet statement is true. Now, we will assume that there is a small fee for accepting a G-bet (see section 9) so that G-bets are not automatically accepted. If a guarantee is not accepted, that often means it is reliable, assuming that the cost of checking the bet statement is reasonably low. (This proviso is necessary because a person might offer a G-bet, for instance, guaranteeing that there is life on Jupiter. But the guarantee does not need to be reliable because the bet most probably will not be settled. The practicality of settling is crucial to the meaning of bets.)

Now if Jim has a record of having no c-bet accepted, that pretty much means that his guarantees are reliable. We leave aside those G-bets that are accepted and never paid off because the guarantor was correct. These too indicate reliability of course. We are talking about the lack of acceptance. That alone indicates that what Jim is guaranteeing is true. As the example demonstrates, the non-acceptance of a user's bet offer is an important fact that the CSUB registers in a UBSR and UR. In the UR, the non-acceptances are compiled and analyzed with other facts registered about a series of bets and bet offers made by the user.

Registering Information About the Non-Acceptance of a Bet

It can be useful to see how long a bet has been on the table, unaccepted. And so the system can register and show that fact to any user.

It can also be quite useful to know how many people have reviewed the bet. And so the system can register how many people have reviewed the bet and can display this fact to any user.

Finally, it can be very useful to see who has reviewed the bet. And so the system can also register who has asked to see the bet. Now, we get into isBeths of privacy. Therefore, it can be useful to enable users who review bets to designate whether they want others to know that they have reviewed the bets. We might call this the open or secret peer review option. The system can include means for registering whether a user wants others to know that she has reviewed a bet.

Thus, the CSUB program can include the following steps:

time stamp the placing of a user's bet offer, register whether the bet offer is accepted, display the acceptance or non-acceptance of the bet offer, if the offer is accepted, time stamp the acceptance, register and display how many people have asked to see the bet offer, register who has asked to see the bet offer, register whether a user wants others to know that she has seen the bet, display the identities of those users who have seen the bet and have designated that their identities as reviewers can be shown.

12.2 Having a Judge Enter the Bet Result

The CSUB can enable Jim and Beth who are involved in a bet against each other to designate a third party to enter the result of the bet. This neutral judge's result is then the settle result (which signifies the same thing to the CSUB as if the two parties had entered matching results). Upon the judge entering a result, the CSUB transfers the stakes, as dictated by the result.

The CSUB can enable the Placer, Jim, to specify a judge and enter the judge's identification information into the UBSR. Thus, the identity of the judge is made part of the bet offer. If Beth accepts Jim's offer, she is also accepting the neutral judge. The CSUB, of course, displays the identity of the proposed judge. Jim must also enter authentication information about the judge, so that the CSUB can authenticate the judge. The CSUB can also enable Jim to designate that the judge is to be mutually decided upon by him and Beth. In order for the bet to be struck then, Jim and Beth must enter matching designations for the identity of the judge.

Thus the CSUB program can include the following steps for designating a third party whose result the CSUB acts upon:

input Placer's designation of a third party who will enter the bet result, input authentication information for identifying the third party, input Acceptor's confirmation of the third party (the acceptance of the bet can be this confirmation), enter the settle result from the third party, upon authentication, transfer stakes, as dictated by the result.

12.3 Entering Bet Results Where Bets Have Not Been Struck

One of the main objects of the CSUB is to compare Jim's estimates to what actually is the case, to the bet results that is. In the case of probability estimates, we cannot measure the accuracy of an estimate in one trial. By contrast, with quantity bets, where an actual quantity is guessed at, we can measure the accuracy in a single trial.

Still, the CSUB keeps track of the accuracy of Jim's probability estimates in the sense that it registers payoff odds and independent probability estimate and the results of bets. Then it compiles statistics on a series of bets. These statistics may indicate the accuracy of Jim's probability estimates. Likewise with quantity bets, the results of a series of bets may indicate the accuracy of Jim's quantity estimates.

In order to compile a record of estimates and results, the results must be found out, of course. How then are they found out? How do we check what is actually the case? For example, if the bet statement is, It will rain tomorrow, how do we check whether it actually rains, and therefore check which side was right, True or False? Well, the solution of the CSUB is a controversy system where two parties enter into a bet agreement, commit to different sides of the bet, and check the actual case. The incentive to check is that one person gets money or points from the other depending on whose pick of sides is right. We call two people opponents when they are on opposite sides of a bet that has been struck. Thus opponents check actual conditions and report the results to the CSUB.

Entering a Result When There Is No Opponent

What happens though if Jim has no opponent in a bet, if he has an offer "on the table" that has not been accepted?

To digress a moment, a very important feature of the CSUB is that it can display all the offers and estimates made about a given bet statement. The CSUB displays offers that are not just around the price where agreements are being made. We call all the offers the market record, and also the spectrum, to get across the idea that the CSUB does not just create a "line" as is typical in conventional betting markets. That means that the majority of offers in a given bet market may not be accepted. Then too, there are those people who only enter independent probability estimates.

It is a main object of the CSUB to check the estimates of all people in a bet market, even if they are not involved in struck bets. But when Jim has no opponent, how can the CSUB check actual conditions and enter a result into the system? Of course, the CSUB can do no such thing; some person or persons has to or have to do the checking. We can't trust Jim to enter his own result. So Jim needs to designate at least one surrogate person to be the checker and whose reported result is entered into Jim's UBSR. Hopefully the surrogate has an incentive to be honest. There are three ways Jim can get an independent result registered in his UBSR:

1. He can designate a neutral judge.
2. He can designate a pseudo-opponent.
3a. He can designate a bet that has been struck, if there is one, in the same bet market, in order to use the results from that bet as surrogate results.
3b. He can let the CSUB designate a bet that has been struck, if there is one, in the same bet market in order to use the results from that bet as surrogate results.

We elaborate on each of these ways below. Before doing so, let's point out that such designations only apply as long as Jim's bet is unaccepted. Once Jim's bet is struck, the CSUB cancels the designation Jim has used.

1. Designating a Neutral Monitor

As with the two parties in a bet agreement, Jim can designate a neutral party to enter the settle result into his UBSR. There can be judges who are known to be neutral that Jim may hire. The CSUB however does not care about that. The key is that Jim can designate a judge to enter the result. The procedures for doing this are basically the same as when two opponents designate a judge. Where only Jim is involved though, where there is no controversy created between opponents that is, it is important that system register and show:

a. that the result is for an unaccepted bet offer, b. that a judge has been hired to enter the result and, c. the identity of the judge.

That way people have the opportunity to evaluate the result.

Thus, the CSUB can include the following steps for entering results into a user's UBSR:

input user's designation of a judge who is to enter bet result into the UBSR, display identity of judge, input authentication data for judge in the UBSR, check if the user's bet offer is struck, if the offer is struck, cancel the designation, if the offer is not struck, authenticate judge, store judge's result in the UBSR, label the result as entered by a judge in an unaccepted bet offer.

2. Designating a Pseudo-Opponent

The CSUB can enable Jim to designate a pseudo-opponent. A pseudo-opponent, call her Beth, is someone who has chosen the side of the bet statement that is opposite the side that Jim has chosen. She may or may not be in a bet that has been struck. For the moment, let us assume that she has an offer on the table that, like Jim's, is not struck.

The CSUB can enable Jim to post a message asking for a pseudo-opponent. The CSUB enables Beth to see this message and accept. When she does, the CSUB then enables Jim and Beth to then enter results as if they were in a bet agreement with each other. In other words, each person's result is entered not only in that person's UBSR but also in the opponent's UBSR. The main difference from bets that are struck is that the no stakes are transferred upon a settle result being reached. The CSUB also registers that the results came from a pseudo-opponent, which is important because the incentives on pseudo-opponents to purBeth a result may be less than on an actual opponents who have cash or points at risk.

The same basic method applies where the pseudo-opponent is in a struck bet. It may be better for Jim to pick such a pseudo-opponent because she may have to enter a result anyway (presuming she thinks there is a result). Thus Jim does not have to go fishing for someone who is willing to be his opponent. This pseuedo-opponent's result can be entered into Jim's UBSR whether or not she has agreed to be a pseudo-opponent.

Thus, the CSUB can include the following steps for entering results into a user's UBSR and into a pseudo-opponent's UBSR:

input the user's designation of a pseudo-opponent who has a bet offer in the same market as the user's bet offer, and who has chosen the opposite side of the bet from the user's choice of side, input acceptance by pseudo-opponent, check if the user's bet offer is struck, check if the pseudo-opponent's bet offer is struck, if neither offer is struck, when the user enters a result, store it in the user's UBSR and in the pseudo-opponent's UBSR and, when the pseudo-opponent enters a result, store it in the pseudo-opponent's UBSR and in the user's UBSR, if the user's bet offer is struck and the pseudo-opponent's is not, when the pseudo-opponent enters a result, store it in the pseudo-opponent's UBSR and, when the user enters a result, store it in the user's UBSR and in the pseudo-opponent's UBSR, if the pseudo-opponent's bet offer is struck and the user's is not, when the user enters a result, store it in the user's UBSR and, when the pseudo-opponent enters a result, store it in the pseudo-opponent's UBSR and in the user's UBSR.

3. Designating Surrogate Bet Results

The CSUB enables Jim to designate that the results from a struck bet are to be entered into his UBSR. Jim can identify a surrogate bet by it's reference number or by the parties who are in it, or he can let the bet be chosen by the system. Letting the CSUB decide may be useful because there may not even be any struck bets in the relevant MR at the time that Jim chooses the option of having surrogate results entered into his UBSR.

The existing bet that Jim picks may have results entered by the two parties or by a judge. That is beside the point. The point is that Jim can use the result(s) from a bet agreement that has been struck when his own bet offer has not been struck. In this way, the system can keep track of how his estimates have done compared to actual cases.

When each surrogate party enters a result, the results are copied into Jim's UBSR. The CSUB declares the bet settled if two matching results are entered. In other words, the CSUB copies all the results from the surrogate bet, include the settle result if any, or the disputed result, if any. Now, if a judge has been designated in the surrogate bet, then the CSUB copies the judge's result, or lack of result, in Jim's UBSR. When the CSUB enters the results into Jim's UBSR, it labels them as surrogate bet results.

(Note, when Jim designates that surrogate bet results are to be used, he can have recourse to a judge if he disagrees with them.)

Thus, the CSUB can include the following steps for entering results into a user's UBSR where the user has chosen the surrogate bet:

input user's designation of surrogate bet, the result(s) of which are to be entered into the user's UBSR, check if the user's bet offer is struck, if the offer is struck, cancel the designation, if the offer is not struck, copy result(s) from the surrogate bet into the user's UBSR.

Thus, the CSUB can include the following steps for entering results into a user's UBSR where the user has let the system choose the surrogate bet:

input user's designation of a system selected surrogate bet, the result(s) of which are to be entered into the user's UBSR, check if the user's bet offer is struck, if the offer is struck, cancel the designation, if the offer is not struck, select surrogate bet, copy result(s) from the surrogate bet into the user's UBSR.

Checking the Results of a User Who Has Entered Only an Independent Estimate

Now a user, call her Angel, may not even make a bet offer, but may only want to enter an IPE or IQE and have that checked against the actual case. It can be a valuable feature of the CSUB to enable users who just enter IE's to have those estimates and corresponding results registered.

Thus the CSUB can enable Angel to have results entered into her UBSR in the same ways that a user can whose bet offer is not accepted. Both kinds of users are in the same position of having no opponent. Therefore, the procedures for entering a result into the UBSR of someone who has only entered an IE are basically the same as those discussed above.

12.4 Description of Evidence for Bet Result

When Jim enters a bet result, he may also need, or want, to communicate the evidence for the result. In many situations a description of evidence for a result can be useful and even necessary.

Thus the CSUB can enable Jim to enter a description of the evidence. The CSUB stores the description in a distinct field that it includes in the UBSR. The CSUB then enables users to view the description. It can be reviewed by the opponent, by any interested user and, if necessary, by a system judge.

As with all UBSR information, the description of evidence is time stamped. Jim may also change the description if he changes his conclusions.

The CSUB can also enable Jim to keep the evidence secret for a period of time. This option is relevant where Jim needs to claim priority and yet does not want to tip his hand. As discussed sub-section 9.4, a priority claim may be necessary when a first-to-file method of accepting a G-bet applies.

13. Secondary Market

It is very useful for the CSUB to include a secondary market where users can sell their positions in bet agreements, especially positions in agreements that are sealed. Secondary markets are, of course, nothing new. Yet new aspects of secondary markets arise in the CSUB because the CSUB is a new system for transacting bets without middlemen (bookies) and because the CSUB is a new system designed for communication.

Now, in a secondary market it is possible to sell many parts of an agreement. We see this fact in the "derivatives" markets of the major, primary financial markets. In this section, when we say that a person sells a position we mean his whole position, both the obligation to pay and the right to be paid. (In G-bets there may only be an obligation to pay or a right to get paid.) And we further we mean that a person sells position in a bet agreement that has been sealed.

We will be referring to P-bets, but most of the discussion also applies to G-bets and Q-bets. The differences between P-bets and G-bets have to do with the fact that one party in a G-bet does not put up a stake. The differences between P-bets and Q-bets have to do with the meaning of prices in those bets. Prices of P-bet positions can be considered expected value guesses and can be converted into probability figures, which is not the case with prices of Q-bet positions. Despite such differences, the main steps are the same for all the kinds of bet: steps for transferring rights and obligations from one user to another.

13a The Mechanics of a Sale in the Secondary Market

Definitions Concerning the Secondary Market

A Position in a Bet

A position in a bet agreement means a person's rights and obligations under the terms of the agreement.

Seller

The party that gives up ownership of a position to another party, the buyer, in exchange for an amount of money or points from the buyer.

Buyer

The party that takes the ownership of a position from another party, the seller, in exchange for paying an amount of money or points the seller.

Sale Price

The amount of money or points that the buyer pays to the seller in exchange for ownership of the seller's position. The price can be negative. (When we say that the buyer pays a price to the seller, it can actually be the seller that owes money or points to the buyer. That's because the position may have negative value. An example later below will illustrate.)

Note, we use the term sale price to distinguish prices in the secondary market from those in primary markets. We have defined prices in the primary markets differently. We will often use price by itself though. In this section, price will mean sale price in the secondary market.

We will use three characters to illustrate the operation of the secondary market. Jim and Beth will be two parties who are involved in a sealed bet agreement with each other. Angel will be the third party who may buy Jim's position in the bet.

Simplifying Assumptions

There is a great variety of rules that can govern sales in a market. The CSUB's secondary market is no exception. We will try to keep the rules here to a minimum, giving the basic steps necessary for the operation of a secondary market in the CSUB.

We make the following simplifying assumptions, in describing the basic steps of a sale in the secondary market of the CSUB.

One, there is no confirmation clock involved in a sale in the secondary market. A sale is sealed when the sell offer is accepted by the buyer.

Two, the sale is a straight sale and not an auction. (Auctions can be useful, and we note that the CSUB can enable Jim to offer his position for sale in an auction. The CSUB can enable him to set a minimum bid figure and a deadline for bids. The CSUB can also enable him to simply post a "make best offer" message and wait for an offer he is satisfied with.)

Three, the whole position is bought by one person. It is possible for people to buy shares of a position but we do not go into that.

Four, there are only sell offers. Buy offers, of course, are possible but we do not go into them.

Five, the sale is not contingent on Beth's approval.

Six, Jim's stake is either 100% in escrow or not in escrow at all. Escrow considerations, which have not been emphasized previously, are discussed a little later below, for they figure prominently in the secondary market.

Offering to Sell a Position (Placing a Sell Order)

a. Jim identifies a sealed bet and enters a command signifying that he wants to sell his position in the bet.

b. The CSUB verifies that Jim is authorized to sell his position: checking that he is a party to the bet, checking what his position is (the side Jim has taken and the corresponding stake and payoff odds), and checking that he still owns the position.

c. The CSUB enables Jim to enter the price he seeks for his position.

d. The CSUB enables Jim to designate whether payment for the position is due immediately upon the acceptance of the price, or whether payment is due when the bet settles.

e. The CSUB registers Jim's sale offer in his UBSR for the bet.

f. The CSUB displays Jim's sale offer including all the terms of the position. The CSUB displays whether Jim's stake is in escrow or not. We discuss escrow after giving an illustration below. Escrow is also discussed in section 21.

| | |
|---|---|
| For Sale: | Position in Sealed Bet With Beth |
| Bet Statement: | Ross Perot will win the Presidential Election in 1996 |
| Payoff Odds: | 49–1, 2% |
| Side: | True |
| Stake: | $100 |
| Stake in Escrow: | Yes |
| Sale Price: | $500 |
| Payment Due: | Upon acceptance of the price. |

Here, Jim has taken True originally at longshot odds. We imagine that opinion has swung and now Perot looks like he has more than a 2% chance of winning. Thus Jim is willing to sell his position for, say, $500.

Escrow Considerations

If Jim's stake is in escrow that creates a different payoff situation for Angel than if Jim's stake is not in escrow. That's because if Jim's stake is in escrow then Angel takes ownership (but not possession) of the stake. If Angel loses the bet, Angel can pay for the loss from the stake in escrow. But, if there is no stake in escrow then, if Angel loses the bet, Angel has to pay for the loss from his own pocket.

For example, let's say that Jim has taken False in the bet agreement above. Now, if he has put the $4900 stake in escrow then that will be owned by Angel. Thus, Jim asks a sale price of $4500 which means that Jim is willing to lose $400 given his stake of $4900 in escrow.

But, if Jim has put nothing in escrow, then Angel merely assumes Jim's obligation but none of Jim's money. Therefore, Jim must pay $400 to Angel in order for Angel to be willing to take Jim's position. If Angel buys the position, Angel is obligated to pay the $4900 if he loses. Since he has $400 from Jim, Angel's total risk is $4500.

| | |
|---|---|
| Bet Statement: | Ross Perot will win the Presidential Election in 1996 |
| Payoff Odds: | 49–1, 2% |
| Side: | False |
| Stake: | $4900 |
| Stake in Escrow?: | Yes |
| Sale Price: | $4500 |
| Payment Due: | Upon acceptance of the price. |
| Bet Statement: | Ross Perot will win the Presidential Election in 1996 |
| Payoff Odds: | 49–1, 2% |
| Side: | False |
| Stake: | $4900 |
| Stake in Escrow?: | No |
| Sale Price: | –$400 |
| Payment Due: | When the bet settles. |

The Importance of When Payments Are Due

An idea that is similar to letting Jim and Beth pay the stake owed when the bet settles is the idea of letting Angel pay the sale price when the bet settles. It is often be more reasonable to delay payments until a bet settles because a bet may never settle and because the settle date may be indefinite.

Now, an important technicality is that if payments are made when the bet settles, then Jim still has an interest in the bet result. Therefore, Jim may have to enter a bet result as well, or he may have the right to complain about a result that has been entered. The reason that Jim has an interest is that his payment may be contingent upon the result if the result is Undecided. A bet that never settles, for example, is effectively Undecided. In this case, Jim normally would not get paid (and if the sale price was negative he would not have to pay anything to the buyer.) Thus, Jim has an interest in seeing the bet settled properly.

Buying a Position a. Angel finds Jim's bet offer and enters an acceptance command.

b. The CSUB creates a UBSR for Angel (storing the position Angel has agreed to buy, along with the price and other sale terms that Angel has agreed to).

c. The CSUB registers the sale in Jim's UBSR.

d1. If the sale price is due immediately, the CSUB subtracts the price amount from Angel's account and adds it to Jim's account.

e1. If the sale price is due immediately, the CSUB registers that:

a. Jim is not authorized to enter a bet result or complaint about a bet result.

b. Angel is authorized to enter a bet result and complaint about a bet result.

c. Angel has taken Jim' side in the bet.

d. Beth is to pay her stake to Angel if Angel wins the bet, and if Angel loses, Angel is to pay the amount of Jim's stake to Beth. (In Q-bets we can say that Angel gets the transfer amount from Beth if he wins and that she gets the transfer amount from him if he loses. In general we say that Angel gets from Beth what Jim had the right to get, and pays to Beth what Jim was obligated to pay.)

f1. Where settling is concerned, the procedure is the same as if Jim and Beth were in the bet, except that Angel has taken Jim's place.

d2. If the sale price is due when the bet is settled, the CSUB registers Angel's obligation to pay Jim when the bet settles.

e2. If the sale price is due when the bet is settled, the CSUB registers that:

a. Jim remains authorized to enter a bet result or complaint about a bet result. (He may only be authorized to enter a complaint, a call for a system judge that is.)

b. Angel is authorized to enter a bet result and complaint about a bet result.

c. Angel has taken Jim' side in the bet.

d. Beth is to pay her stake to Angel if Angel wins the bet, and if Angel loses, Angel is to pay the amount of Jim's stake to Beth. (In Q-bets we can say that Angel gets the transfer amount from Beth if he wins and that she gets the transfer amount from him if he loses. In general we say that Angel gets from Beth what Jim had the right to get, and pays to Beth what Jim was obligated to pay.)

f2. Where settling is concerned, the procedure is the same as if Jim and Beth were in the bet, except that Angel has taken Jim's position and except that Jim can enter a result in addition to Angel's and Beth's result (or, Jim can enter a complaint to a system judge about Angel's and/or Beth's result).

In order for the bet to settle, all three parties must enter matching results. Or, Angel and Beth need to enter matching results and Jim must not complain within a pre-set period of time.

Thus, in addition to previous steps that have been discussed for settling a bet:

a. When Angel, Beth or Jim enters a result, the CSUB alerts the other two parties that the result has been entered.

b. If all three parties enter matching results then the bet settles and the stakes are transferred as dictated by the results and the payoff odds.

c. If all three parties do not enter matching results any party can call a system judge to arbitrate. (For simplicity we assume that Jim must enter a result. Depending on the rules, an absence of a result or complaint by Jim can be a default result signifying that he agrees with Angel and Beth.)

d. If a settle result of True or False is reached, the system subtracts the price amount from Angel's account and adds it to Jim's account. (A settle result of Undecided can mean no one owes anything to anyone.)

Settling a Bet Where a Position Has Been Sold to the Opponent

Angel, a third party, is not the only one who might be interested in buying Jim's position. Beth might want to buy it. In this case, when she buys it, the system can allow her to "clear the bet," by which we mean that it realizes the profit or loss for her. The result is not entered into either Jim or Beth's UBSR because Beth is then in a bet with herself. (If she or Jim still want bet results to be registered in their UBSR's, they can use procedures described in section 12.)

An example of Beth buying Jim's position can be seen in the example above.

| | |
|---|---|
| Bet Statement: | Ross Perot will win the Presidential Election in 1996 |
| Payoff Odds: | 49–1, 2% |

| | |
|---|---|
| Jim's Side: | False |
| Stake: | $4900 |
| Stake in Escrow?: | Yes |
| Sale Price: | $4500 |
| Payment Due: | Upon acceptance of the price. |

Now in this example, Beth has taken True. She pays $4500 for Jim';s position and then can settle the bet saying that she has won. Her profit is $400 because she gets Jim's stake that is in escrow. Of course it is not appropriate to enter a result that is wrong. So, we say that the bet does not settle. She is allowed simply to take her profit. The sale is registered in Beth's and Jim's UBSR.

13b Registering and Displaying the Sale Information

Whether a sale goes through or not, if Jim offers his position for sale, the system shows the offer. As noted in section 6, a sale offer is a fundamental way of expressing a change of opinion. It is not the same as making a bet offer, but it nevertheless can indicate what one feels about the probability that a bet statement is true or not. Thus, a progression that the CSUB can show is:

Bet offer→striking of the bet→sealing of the bet→sale offer→sale made→settle result.

Of course, not all these things may happen to a person's bet offer.

It is hard to know what a sale offer means because Jim may be selling simply in order lock in a profit or to stem a loss. Thus the sale price may not indicate what his estimate of probability is. In order to explain his best guess, he can enter an IPE. As noted, he can keep this estimate hidden until after the sale or until after bet has settled. Also as noted, when Jim makes a sale offer, the system can enable him to enter a change statement.

For the buyer of a position, buying the position is tantamount to making a bet offer at that price and having the offer automatically struck and sealed. The exception to this case is where Beth buys Jim's position. In this case Beth's may be just to take a profit or stem a loss.

Sale offers do not have to be made only around a given market price. There may be a spectrum of offers posted, the majority of which do not transact. This principle is discussed in section 16.

Converting Prices into Probability Figures and Vice Versa

The CSUB can convert a price into a probability figure. The figure will be based on the price and on what the buyer can win for that price. What the buyer can win is either the opponent's stake, or the opponent' stake plus the seller's stake. IT depends on what has been put in escrow. The principle remains that prices can be thought of as expected values that can be converted into probability figures. The CSUB can display these probability figures as pseudo-odds to help people evaluate the meaning of a price. For example:

| | |
|---|---|
| Bet Statement: | Ross Perot will win the Presidential Election in 1992 |
| Payoff Odds: | 49–1, 2% |
| Side: | True |
| Stake: | $100 |
| Sale Price: | $500 |
| Pseudo-odds: | 9–1, 10% |
| Payment Due: | Upon acceptance of price. |

The CSUB can also enable Jim to create a price by entering an probability estimate and having that estimate converted into an expected value which is the price. Thus, Jim might say in the bet above that the probability of Perot winning is 10% and the CSUB can convert that into a price of $500.

14. Sum Over Histories Bets

A sum over histories (SOH) bet is a bet in which Jim expresses multiple probabilities about the multiple events that can happen in a given situation. For example, if Jim is asked to guess what percentage of the popular the vote a Dream Team will get, he may say, "Well, I think the chances are:

| | |
|---|---|
| .1 that it will get | 0%–40% |
| .2 that it will get | 40+%–50% |
| .7 that it will get | 50+%–100%." |

As another example, say Jim is asked to guess when a baby will be born. Here he can give multiple probabilities for different ranges of days. Or, say Jim is asked to estimate what interest rates will be. Here he can give a series of estimates based on different ranges of rates.

An SOH bet is not always one where the events are quantity ranges. For example, Jim can be asked to give the chances of each horse in a race winning, and thus, he can supply separate estimates of each horse's chance of winning. The key to an SOH bet is that in a situation one can identify various alternatives to put probability estimates (odds offers) on, the estimates adding up to one. An individual bet is created with each odds offer. While each bet is a different one about a different event happening, altogether the bet is a different way of expressing the probability of something happening in a situation where there are multiple events that can happen, for example multiple possible horses winning a race.

To enable users to transact SOH bets, the CSUB includes an SOH option button. When Jim selects this, the CSUB presents him with a form in which he can state a series of probabilities (payoff odds). After each probability he enters a distinct bet statement describing a distinct event, as below:

| | |
|---|---|
| Payoff odds$_1$ | Event A |
| Payoff odds$_2$ | Event B |
| Payoff odds$_3$ | Event C . . . |

For most people, it is easier to make these bets if one uses payoff odds stated in decimal or percentage form because these forms make it easier to make the combined probability total one. When Jim enters the probabilities, payoff odds that is, and confirms them, the CSUB checks if the probabilities add up to one. If not the CSUB informs Jim and asks him to adjust them to add up to one.

The CSUB can include an option for transacting an SOH bet where the events are a set of ranges that a quantity might fall in-for example, the percentage ranges in the voting example above. In this case, the CSUB can enable the user to enter a common bet statement, and then just enter ranges of numbers for each distinct event. The common bet statement defines how the quantity events are measured. For example:

Common Bet Statement: The Dream Team will win by _% of the popular vote, as defined by the Federal Election Commission.

This statement then applies to all the quantity statements that are supplied as events. Each quantity statement when combined with the common statement makes up individual bet statements.

Since each SOH bet is a separate bet, the system can enable the user to designate different bet types for the individual bets. These types-straight bet, actual odds bet, and range bet-have been discussed in the previous sections. Absent the user explicitly choosing a given bet type and side, the CSUB can default to assuming that each bet is a straight bet in which the Placer chooses True. Each bet can have a different stake, for each bet is an individual bet.

Thus, the CSUB includes the following steps for enabling a user to place an SOH bet (as before, we ignore steps previously shown):

inputs a series of payoff odds offers in percentage form, inputs a bet statement associated with each payoff odds offer, inputs a stake associated with each bet statement, defaults to assigning True to the Placer, checks that the probabilities in the payoff odds add up to 1.0.

if they do not, tells the user to adjust probabilities to add up to 1.0, if they do, displays the bet offers thus created together and labels the group as an "SOH bet."

15. Quantity Bets

In this section we describe a some new bet procedures that the CSUB can include to enable users to transact bets that demonstrate estimates of quantities—How much will it cost?, How many are there?, When will it happen?, and so on. Now probability based bets (P-bets) can be made about quantities, but special bets tailored for quantity estimates can be more convenient and natural for people. We call such bets quantity bets (Q-bets) because the payoffs are based upon a guess of a quantity and upon the actual quantity found.

Virtually all the features previously described about P-bets apply also to Q-bets. We run through an abbreviated list from the previous sections. Both kinds of bets have: bet statements, stakes, change procedures, settling procedures, supported statements, and market options. They both have UBSR's and MR's. Where there are actual odds P-bets, there are actual quantity Q-bets. Where there are odds range P-bets, there are quantity range Q-bets. Where there are independent probability estimates, there are independent quantity estimates. The point is that Q-bets are still bets, with almost all the procedures previously described applying (though perhaps with minor modifications).

In this section, we do not dwell on the features that P-bets and Q-bets have in common, usually taking them to be understood. We are trying to describe the differences in the bet offer information that is registered and in the procedures for transacting the bets. Thus we leave out what has already been said, referring to it in a cursory manner.

The main differences between P-bets and Q-bets concern the following:

1. In Q-bets, the payoff offer information is a quantity not a probability.

2. In Q-bets, the result is a quantity or Undetermined rather than True, False or Undecided.

3. In Q-bets, the payoffs are calculated differently than in P-bets.

We should note that the requirements for a Q-bet statement are more restrictive than those for a P-bet statement.

The statement of a P-bet must describe a state of affairs, a situation, that can be found true or false. While a Q-bet statement can be found true or false, it must also describe a situation such that people can agree upon the measurement of a quantity. In other words, it must describe how to measure a quantity. A P-bet may or may not concern a quantity.

An example of a Q-bet statement is the following:

Unemployment will be at 8% this year. Unemployment is defined as what the Bureau of Labor Statistics (BLS) says it is. The percentages are rounded to integer values according to BLS methodology.

The measurement process may, of course, be understood. For example, The Redskins will beat the Cowboys by 12 points. In this case, the measurement process is implicit in the bet statement.

It is possible in Q-bets to have the bet statement leave the quantity blank, while defining how it will be measured. For example, The Redskins will beat the Cowboys by__points. The quantity estimate is then filled in, in effect, by the payoff offer.

In defining how a quantity is to be measured, the Q-bet statement also must define, or imply, the units on which the payoffs are to be based. This is critical, for payoffs in Q-bets depend on the units being measured. For example, a bet statement may be:

The distance from Washington DC to Chicago, as listed in the World Almanac, is__miles to the nearest ten miles. Now the Almanac may list the distance in mile increments but the bet payoffs are decided in ten mile units.

Four Basic Q-bets

There are 4 basic Q-bets which we discuss in the subsections below. What distinguishes them from each other is the payoff rules, which are implemented as procedures within the CSUB. The names below are not very descriptive, but we will use them anyway to differentiate between the kinds of bets. The bets to be described are:

1. Delta Bets
2. Hybrid Bets
3. 3D (for triple delta) Bets
4. Winner Take All Bets Note on terminology: In each of the Q-bets below at least one user enters a quantity that is the basis of the payoff. We call this quantity the Q-guess or the payoff offer, or the payoff quantity, and in some cases, the price. The exact meanings of Q-guess, payoff offer and price depend on the particular Q-bet because different payoff rules apply to each bet. Likewise, payoff offer and price in Q-bets are not the same as in P-bets because different payoff rules apply.

Note also about the terms Placer and Acceptor: As before in the description of P-bets, we use these terms to denote a sequence that is one of the simplest for executing bets. Other sequences are possible and were discussed in section 9 on market options. We will be discussing market options for Q-bets later in this current section. As discussed in section 8, an Acceptor does not just accept the Placer's offer, but also makes an offer of her own when she accepts the Placer's offer. When an Acceptor agrees to take a given side of the bet, she is also agreeing to the Q-guess that the Placer has entered. This Q-guess, the payoff offer, is part of her offer. Thus if the Placer's offer is retracted, the Acceptor's offer still stands. We do not explicitly describe this process, taking it to be understood from the discussion in section 8.

15a. Delta Bets

In a delta bet, one party creates an obligation to be sold to another party. We call one party the seller and the other the buyer. This is how a delta bet agreement works:

a) The buyer and seller agree to a bet statement that defines how a quantity is to be measured. (This is just the bet statement of a Q-bet.)

b) The seller agrees to pay the buyer the actual quantity that is found multiplied by some amount of a commodity, which we call the stakes.

c) The buyer agrees to pay the seller for the right to be paid the actual quantity multiplied by the stakes. The buyer agrees to pay an amount called the Q-guess multiplied by the stakes.

Another way of putting all this is that the seller agrees to pay the buyer (the Actual Quantity—the Q-guess) x (the Stakes). If the Actual Quantity is greater than the Q-guess, the seller loses. If the Actual Quantity is less than the Q-guess, the buyer loses. (The example below makes all this clearer.)

When we say buy and sell, we do not mean them necessarily in the sense where the buyer and seller exchange payment at the time the agreement is struck. What we have in mind is an exchange of obligations. Thus the buyer does not need to pay the seller at the time the agreement is struck, but can pay when the bet settles. At that point, the buyer may not have to pay anything, for he might have profited in the bet. On the other hand, the buyer might have lost. Because the difference between the actual quantity and the Q-guess determines the winnings, we call the bet a delta bet.

The buyer and seller may agree to a maximum amount that is at risk-a ceiling on how much each can lose.

For example, let us say that Jim and Beth want to bet about how many gumballs are in a jar. Let's say that Jim is the Placer, he enters a bet statement and makes the following offer:

| Bet Statement: | There are __ gumballs in the jar. |
|---|---|
| Q-guess: | 567 |
| Side Picked: | Sell |
| Stakes: | $1 per gumball |
| Ceiling: | $100 |

This means that Jim will pay the actual quantity to Beth and he will get $567 from Beth for doing so. Now, if the actual quantity turns out to be greater than 567 he loses. If it turns out to be less, he wins. As noted, the Q-guess is also called a price. Thus, a person selling at a certain a price thinks that the actual quantity will be lower than the price. A person buying at a certain price thinks that the actual quantity will be higher than the price.

15a1. Definitions for Delta Bets

Q-guess (also called the Price)

In a delta bet, the Q-guess is the quantity (multiplied by the stake figure) that one party, the Buyer, agrees to pay to the other party, the Seller, in exchange for the Seller agreeing to pay the actual quantity (multiplied by the stake figure) to the buyer.

The Actual Quantity

The actual quantity is the quantity that is found in settling the bet. It is also the quantity (multiplied by the stake figure) that one party, called the Seller, agrees to pay to the other party, called the Buyer, in exchange for the Buyer agreeing to pay the Q-guess (multiplied by the stake figure) to the Seller.

Stake Figure

The amount of money or points that is to be paid per unit of the Q-guess and the actual quantity.

Buyer

The party in a delta bet who pays the Q-guess multiplied by the stake figure.

Seller

The party in a delta bet who pays the actual quantity multiplied by the stake figure.

Ceiling

The maximum amount that both parties can win or lose in the bet.

Result

The actual quantity that is defined by the bet statement and entered into the UBSR's of the two parties in the bet for the purpose of settling the bet.

15a2. Placing a Straight Delta Bet

When a user enters a delta bet and only offers to take one side, buy or sell, we call this a Straight delta bet.

The CSUB program includes the following steps for enabling users to place a straight delta bet:

inputs designation of a straight delta bet, inputs and stores the bet statement, inputs and stores the Q-guess, inputs and stores the stake figure, inputs and stores the ceiling, inputs and stores the user's choice of side, a Buy offer or Sell offer, labels the user as the Buyer if he has entered a Buy offer, and as the Seller if he has entered a Sell offer, outputs the bet information that has been entered and stored.

(Now, as discussed, we leave out many steps previously described for creating a UBSR, for authenticating Jim's identity, for designating the kind of bet, and so on. We take these to be understood.)

15a3. Accepting a Delta Bet

The CSUB program includes the following steps for enabling users to accept a delta bet (as before, we leave out steps previously discussed):

registers the acceptance of the Buy or Sell offer, labels the user as the Buyer if she has accepted a Sell offer, and as the Seller if she has accepted a Buy offer, stores the acceptance and alerts the placer of the acceptance.

15a4 Settling a Delta Bet

The CSUB procedure for settling a delta bet is much the same as previously discussed as far as achieving a settle result is concerned. What is required is that the two parties enter matching results or designate a judge who enters a result. What is different is the payoff procedures.

Again, we leave out steps previously discussed, especially concerning the matching of results. We presume that a matching result or a judge's result has been entered. Thus, the CSUB program includes the following steps for enabling users to settle delta bets:

takes (Actual Quantity—the Q-guess) to yield a Difference, multiplies the Difference by the Stake Figure to yield a Transfer Amount, if Transfer Amount is greater than the Ceiling, sets the Transfer Amount equal to the Ceiling (while maintaining the sign of the Transfer Amount), adds the Transfer Amount to the buyer's account and deducts the Transfer Amount from the seller's account.

registers the bet result, and the Difference, in the users' UBSR's.

alerts both parties that the bet is settled.

15a5. Delta Flip Bets

As with P-bets where the CSUB gives Jim the option of placing an actual odds bet, also called more generically a flip bet, the CSUB enable users to place delta flip bets. In these, Jim enters the bet statement and the stakes and a Q-guess, and then allows Beth to pick the side, Buy or Sell.

For example, Jim can designate a flip bet about how many gumballs are in a jar and set the Q-guess at 567 and then let Beth decide whether to buy or sell. As with actual odds flip bets, the incentive here is to make one's best guess as to the actual quantity when one is setting the Q-guess, for one is letting the opponent pick the side. As with actual odds flip bets, the idea is a variation of the Solomon's method of dividing a loaf of bread. Thus, the CSUB program can include the following steps for enabling users to enter delta flip bets:

In Placing Mode inputs and stores designation of delta flip bet, inputs and stores a bet statement, inputs and stores a Q-guess, inputs and stores a stake figure, leaves the side of the bet, buy offer or sell offer, open for an Acceptor to choose, outputs the bet information.

In Accepting Mode inputs and stores choice of side (Buy or Sell), if Buy is chosen, labels the Acceptor as the Buyer and the Placer as the Seller, if Sell is chosen, labels the Acceptor as the Seller and the Placer as the Buyer, outputs the bet information.

15a5. Delta Range Bets

The CSUB can also enable Jim to place delta range bets. The idea here is that people often express quantity estimates in the form of ranges. A range bet then allows Jim to offer to buy at the lowest quantity in the range and offer to sell at the highest quantity in the range. For example, if Jim thinks that there are at least 500 gumballs in the jar and at most 700, then he can offer to buy at 500 and offer to sell at 700. If he is right, that the actual quantity is somewhere in between, then he will automatically win, if either bet is accepted, of course.

As with odds range bets, when Jim chooses the Range Bet option, the CSUB creates two different bet offers with different Q-guesses and different sides. Here we call the Q-guesses by the term prices. Thus, the CSUB program can include the following steps for enabling users to place delta range bets:

In Placing Mode inputs designation of a delta range bet inputs bet statement, inputs the stake figure, inputs price range, labels the user as the Buyer at the lowest price in the range, labels the user as the Seller at the highest price in the range, outputs the bet information.

When a user accepts one of these offers, the CSUB may or may not cancel the other offer. The Placer may be able to win both bets, middling as it is called, but at the same time, he can demonstrate the accuracy of his estimate. So the CSUB may or may not automatically cancel a second offer of a delta range bet, when a first has been accepted. The CSUB can enable Jim to decide whether a second offer is to remain on the table when a first has been accepted.

15a6 Delta Bets with a Margin of Safety

The CSUB can enable Jim to add a margin of safety into the Q-guess of a delta bet. Jim enters a Q-guess and then enters a margin of safety (MOS) quantity. The CSUB registers the MOS in the UBSR along with the base Q-guess.

In a straight bet, the CSUB adds the MOS to the Q-guess if Jim has chosen Sell, and subtracts the MOS quantity if Jim has chosen Buy. For example, if Jim has chosen Sell at 600, then the CSUB creates a Sell offer at 650.

In a flip bet, the CSUB creates two bet offers, one with Jim taking Buy at the base Q-guess minus the MOS, the other with Jim taking Sell at the base Q-guess plus the MOS. For example, Jim may think there are 600 gumballs in the jar and he may want a margin of safety of 50. He enters the flip bet option, sets 600 as the base price, and enters an MOS of 50, and the CSUB then registers a buy offer at 550 and to sell offer at 650.

Thus in the case of flip Q-bets the margin of safety creates a kind of range bet. As before with P-bets, it can be useful to label a margin of safety figure distinctly from a range or a profit margin, for all these can mean different things semantically.

In a range bet, the CSUB can also enable a user to apply a margin of safety. In this case, the range is widened; the MOS is added to the Sell quantity and subtracted from Buy quantity.

Another way the CSUB can enable users to enter a margin of safety is as a percentage of the Q-guess. Thus, if Jim enters, say, a flip bet and an MOS of 10%, the CSUB creates two offers, one a Buy offer at the base Q-guess minus 10%, the other a Sell offer at the base Q-guess plus 10%.

Now, the CSUB can also have procedures for enabling users to enter projected profit margins into a delta bet. The mechanics are the same as with a margin of safety, but the name is different. Jim may prefer to call the amount he has entered by the name profit margin rather than margin of safety. The CSUB can include means for enabling him to do that.

15b. Hybrid Bets

A kind of bet that is very similar to a delta bet is what we will call a hybrid bet. The reason we call it hybrid is because it uses quantity estimates and actual quantities to determine who has won, but it uses an odds figure to determine the payoffs. Usually the odds figure is 1-1.

This is how a hybrid bet agreement works:

a) The parties agree to a bet statement that defines how a quantity is to be measured.

b) The parties agree to the same stakes figure that both put at risk (presuming the odds are set at 1-1).

c) The parties agree to a Q-guess, also called a price.

d) The parties pick different sides of the price, Higher and Lower.

e) The party who picks Higher wins if the actual quantity is higher than the price, and the party who picks Lower wins if the actual quantity is lower than the price.

f) When the bet is settled, the winner gets the loser's stake.

In hybrid bets, the person who picks Higher thinks that the actual quantity will be greater than the price, and the person who picks Lower thinks that the actual quantity will be lower than the price. For example, let us say that Jim and Beth want to bet on who will win a football game between the Cowboys and the Redskins. Let's say that Jim is the Placer and he enters a bet statement and makes the following offer:

| Bet Statement: | The Redskins will beat the Cowboys by __ point |
|---|---|
| Q-guess: | −10 |
| Side Picked: | Lower |
| Stakes: | $100 |

This means that Jim thinks that the Redskins will lose by more than ten points. If the Cowboys lose or if they win by less than 10 points, Jim loses. If they win by 10, the bet is push. And if they win by more than ten, Jim wins. (Note: the bet above is a little confusing because a negative Q-guess is used. In fact, we state it this way to illustrate the possibility of negative Q-guesses. Normally, a person would state the bet as:

| Bet Statement: | The Cowboys will beat the Redskins by __ point |
|---|---|
| Q-guess: | +10 |
| Side Picked: | Higher.) |

(Many of the procedures for hybrid bets are basically the same as those for delta bets. The Q-guess in a hybrid bet is directly analogous to the Q-guess in a delta bet. The payoff procedures are what create the differences in the bets. It will therefore seem that we are repeating a lot below.)

15b1. Definitions for Hybrid Bets

Q-guess (Price)

In a hybrid bet, the Q-guess is the quantity that the two parties agree will be compared to the actual quantity to determine who has won the bet.

Stakes

The amount each party puts at risk.

Sides

A hybrid bet has two sides, Higher and Lower. One party takes Higher and the other takes Lower. If the actual quantity is higher than the Q-guess, then the party that took Higher wins. If the actual quantity is lower, then the party who took Lower wins.

Result

The actual quantity that is defined by the bet statement and entered into the UBSR's of the two parties in the bet for the purpose of settling the bet.

15b2. Placing a Straight Hybrid Bet

When a user enters a hybrid bet and only offers to take one side, we call this a Straight hybrid bet.

The CSUB program includes the following steps for enabling users to place a hybrid bet:

inputs designation of a straight hybrid bet, inputs and stores the bet statement, inputs and stores the Q-guess, inputs and stores the stake figure, inputs and stores the Placer's choice of side, Higher or Lower, outputs the bet information.

(As discussed, we leave out many steps previously described.)

15b3. Accepting a Hybrid Bet

The CSUB program includes the following steps for enabling users to accept a hybrid bet (as before, we leave out steps previously discussed):

inputs the acceptance, assigns the Acceptor the opposite side of the Placer, stores the acceptance and alerts the Placer of the acceptance.

15b4 Settling a Hybrid Bet

The CSUB procedure for settling a hybrid bet is the same as previously discussed as far as achieving a settle result is concerned. What is required is that the two parties enter matching results or designate a judge who enters a result. What is different is the payoff procedures.

Again, we leave out steps previously discussed, especially concerning the matching of results. We presume a matching result or a judge's result has been entered into each user's UBSR. Thus, the CSUB program includes the following steps for enabling users to settle hybrid bets:

compares the Actual Quantity to the Q-guess, if the two quantities are equal, declares the bet a tie, if the Actual Quantity is higher, declares the party who picked Higher the winner, if the Actual Quantity is lower, declares the party who picked Lower the winner, adds the Stake to the winner's account and deducts it from the loser's account.

alerts both parties that the bet is settled.

15b5. Hybrid Flip Bets

The CSUB gives Jim the option of placing hybrid flip bets. In these, Jim enters the bet statement and the stakes and a price, and then allows the Acceptor to pick the side, Higher or Lower.

Thus, the CSUB program can include the following steps for enabling users to enter hybrid flip bets:

In Placing Mode inputs and stores designation of hybrid flip bet, inputs and stores a bet statement, inputs and stores a Q-guess, inputs and stores a stake figure, leaves the side of the bet open for an Acceptor to choose, outputs the bet information.

In Accepting Mode inputs and stores the Acceptor's choice of side (Higher or Lower), assigns the opposite side to the Placer, outputs the bet information.

15b5. Hybrid Range Bets

The CSUB can also enable Jim to place hybrid range bets. Again, the idea is that people often express quantity estimates in the form of ranges. A range bet then allows Jim to pick Higher at the lowest quantity in the range and Lower at the highest quantity in the range. For example, if Jim thinks that there are at least 500 gumballs in the jar and at most 700, then he can pick Higher at 500 and Lower at 700. If he is right, that the actual quantity is somewhere in between, then he will automatically win, if either bet is accepted, of course.

As with odds range bets, when Jim chooses the Range Bet option, the CSUB creates two different bet offers with different payoff figures and different sides. Thus, the CSUB program can include the following steps for enabling users to place hybrid range bets:

In Placing Mode inputs designation of a hybrid range bet inputs bet statement.

inputs the stake figure.

inputs price range.

assigns the user Higher at the lowest price in the range.

assigns the user Lower at the highest price in the range.

outputs the bet information.

When a user accepts one of these offers, the CSUB may or may not cancel the other offer. The Placer may be able to win both bets, middling as it is called, but at the same time, he can demonstrate the accuracy of his estimate. So the CSUB may or may not automatically cancel a second offer of a hybrid range bet, when a first has been accepted. The CSUB can enable Jim to decide whether a second offer is to remain on the table when a first has been accepted.

15b6 Hybrid Bets with a Margin of Safety

The CSUB can enable users to add a margin of safety into a hybrid bet. Jim enters a Q-guess and then enters a margin of safety (MOS) quantity. The CSUB registers the MOS in the UBSR along with the base Q-guess.

In a straight bet, the CSUB adds the MOS to the Q-guess if Jim has chosen Lower, and subtracts the MOS quantity if Jim has chosen Higher. For example, if Jim has chosen Lower at 600, then the CSUB creates a bet at 650 where Jim is assigned (has picked) Lower.

In a flip bet, the CSUB creates two bet offers, one with Jim taking Higher at the base Q-guess minus the MOS, the other with Jim taking Lower at the base Q-guess plus the MOS. For example, Jim may think there are 600 gumballs in the jar and he may want a margin of safety of 50. He enters the flip bet option, sets 600 as the base Q-guess, and enters an MOS of 50, and the CSUB then registers a the he picks Higher at 550 and Lower at 650.

Thus in the case of flip bets the margin of safety creates a kind of range bet. As before with margins of safety in P-bets, it can be useful to label a margin of safety figure distinctly from a range, for they can mean different things semantically speaking.

In a range bet, the CSUB can also enable a user to apply a margin of safety. In this case, the range is widened; the MOS is added to the Q-guess where Jim has taken Lower, and subtracted from Q-guess where Jim has taken Higher.

Another way the CSUB can enable Jim to enter a margin of safety is as a percentage of the price. Thus, if Jim enters, say, a flip bet and an MOS of 10%, the CSUB creates two offers, one an offer of Higher at the base price minus 10%, the other an offer of Lower at the base Q-guess plus 10%.

15c. Triple Delta Bets

In a triple delta (3D) bet, Jim and Beth make different estimates of a quantity and whoever is closer wins by the amount that he or she is closer. When the actual quantity is found the difference is taken from each estimate. And the difference is taken from the two differences, yielding who is closer and by how much. Because three differences are taken, we call this kind of bet a triple delta bet. For example, if Paul and Lisa bet about gumballs in a jar, and Paul enters 630 and Lisa enters 550, and the actual quantity is 600, then Paul is the winner by 20.

As with the single delta bets, users also enter a stake figure, to multiply the ultimate difference by yielding a total winnings figure, also called a transfer amount. Thus, if the stakes are $1 Paul wins $20 from Lisa.

A key difference, obviously, between delta and 3D bets is in the acceptance of a bet offer. In a 3D bet, the acceptor must also enter a quantity estimate rather than just an acceptance of a Buy or Sell offer.

Like the other basic bet agreements previously discussed, a 3D bet also can take the form of a straight bet, a flip bet or a range bet.

In the case of a straight bet, a Placer restricts the Acceptor to only choosing a Q-guess that is higher or lower than the Placer's Q-guess.

In the case of a flip bet, the Placer does not restrict the Acceptor to either side of the Placer's Q-guess.

And in the case of a range bet, the Placer enters a range from a first estimate to a second estimate. The Acceptor then is restricted to entering a Q-guess is outside that range.

As with a delta bet, the two parties in the 3D bet can set a ceiling on the amount they can win or lose.

15c1. Some Definitions for 3D Bets

Q-guess

In a 3D bet, there are two Q-guesses entered, one from each party. A Q-guess then is a quantity that a party enters to be compared with the actual quantity and with the counterparty's Q-guess.

Sides

A first party may specify that the opponent's Q-guess has to be higher or lower than the party's Q-guess. The two sides of a 3D bet then are Higher and Lower. If the first party chooses Higher then the opponent must enter a lower Q-guess. If the first party chooses Lower then the opponent must choose a higher Q-guess.

Result

The actual quantity that is defined by the bet statement and entered into the UBSR's of the two parties in the bet for the purpose of settling the bet.

The Resulting Difference

In a 3D bet, the difference is taken between each Q-guess and the actual quantity. The two differences are then compared, yielding a resulting difference.

Stake Figure

The amount of money or points that is to be paid per unit of the resulting difference.

Ceiling

The maximum amount that both parties can win or lose in the bet.

15c2. Placing a Straight 3D Bet

When a user enters a 3D bet and only offers to take one side, Higher or Lower, we call this a Straight 3D bet.

The CSUB program can include the following steps for enabling users to place a 3D bet (Again, we leave out many steps previously discussed.):

inputs designation of a straight 3D bet, inputs and stores the bet statement, inputs and stores the Placer's Q-guess, inputs and stores the stake figure, inputs and stores the ceiling, inputs and stores the Placer's choice of side, Higher or Lower, outputs the bet information that has been entered and stored.

15c3. Accepting a 3D Bet

The CSUB program includes the following steps for enabling users to accept a hybrid bet (as before, we leave out steps previously discussed):

inputs the Acceptor's Q-guess, if the Placer is assigned Higher, and the Acceptor's Q-guess is higher than the Placer's, reject s the acceptance, if the Placer is assigned Lower, and the Acceptor's Q-guess is lower than the Placer's, rejects the acceptance, if the Placer is assigned Higher and the Acceptor's Q-guess is lower than the Placer's Q-guess, stores the Acceptor's estimate and registers the acceptance, alerts the Placer of the acceptance.

if the Placer is assigned Lower and the Acceptor's Q-guess is higher than the Placer's Q-guess, stores the Acceptor's estimate and registers the acceptance, alerts the Placer of the acceptance.

15c4. Settling a 3D Bet

The CSUB procedure for settling a 3D bet is the same as previously discussed as far as achieving a settle result is concerned. What is required is that the two parties enter matching results or designate a judge who enters a result. What is different is the payoff procedures.

Again, we leave out steps previously discussed, especially concerning the matching of results. We presume a matching result or a judge's result has been entered. Thus, the CSUB program includes the following steps for enabling users to settle delta bets:

takes the difference (Dif 1) between the Placer's Q-guess and the actual quantity, takes the difference (Dif 2) between the Acceptor's Q-guess and the actual quantity, takes the difference between Dif 1 and Dif 2 (Dif 1 - Dif 2), yielding a Resulting Difference, if the Resulting Difference is negative, declares and registers the Placer as the winner, if the Resulting Difference is positive, declares and registers the Acceptor as the winner, multiplies the Resulting Difference by the Stake Figure to yield a Transfer Amount, if Transfer Amount is greater than the Ceiling, sets the Transfer Amount equal to the Ceiling (while maintaining the sign of the Transfer Amount), subtracts the Transfer Amount from the Placer's account and adds the Transfer Amount to the Acceptor's account, registers the Resulting Difference, and who won, in the users' UBSR's.

alerts both parties that the bet is settled.

15c5. 3D Flip Bets

In 3D flips bets, the CSUB registers the designation of a 3D flip bet and then the procedure is the same as with straight bets except that:

1. the system does not input and register a side for either party, and 2. the system enables the Acceptor to enter a Q-guess that is either higher or lower than the Placer's.

15c6. 3D Range Bets

The CSUB program can include the following steps for enabling users to place a 3D range bet:

In Placing Mode inputs designation of a 3D range bet, inputs and stores the Placer's range of Q-guesses (Q1-Q2), (Again, we leave out many steps previously discussed.)

In Accepting Mode inputs the Acceptor's Q-guess, if the Acceptor's Q-guess is within the Placer's range, rejects the acceptance, if the Acceptor's Q-guess is outside the Placer's range, registers the acceptance, alerts the Placer of the acceptance.

15c7. Margin of Safety in 3D Bets

As with other bets described, the CSUB can enable the user to add a margin of safety into a 3D bet.

In the case of straight bets, the CSUB adds MOS to the Q-guess if the user has chosen Higher, and subtracts the MOS if the user has picked Lower.

In the case of flip bets, the CSUB creates the equivalent of a range offer where the range is defined by the Q-guess plus and minus the MOS. The system adds the MOS to the Q-guess and registers Higher for the user, and subtracts the MOS from the Q-guess and registers Lower.

15d. Winner Take All Bets

A simple variation of the 3D bet is one where the two parties put up equal stakes and the winner takes the loser's stake. This can also be thought of a another kind of hybrid bet since the odds are set at 1-1. We will call it a winner take all bet. The CSUB can enable users to place winner take all bets. The steps for placing the bet and accepting the bet are the same as with 3D bets except that the stakes and payoff rules are different, as just discussed. Otherwise, all is the same.

Let us then just give the steps for transferring stakes upon the settling of a winner take all bet (we take the definition of Dif 1 and Dif 2 from the previous discussion):

if Dif 1<Dif 2, add the stake figure to the Placer's account and subtract it from the Acceptor's account, if Dif 1>Dif 2, add the stake figure to the Acceptor's account and subtract it from the Placer's account.

15e. Independent Quantity Estimates

With all the quantity bets described, the CSUB enables Jim to also enter an independent quantity estimate (IQE). An IQE is directly analogous to an Independent Probability Estimate (IPE) in that it has nothing to do with payoffs. The IQE is registered in its own field in the UBSR.

The CSUB can also enable Jim to enter only an IQE without a bet offer. The procedure for doing this are the same as those discussed with IPE's in section 8. Jim simply chooses an IQE option and the CSUB enables him to enter an IQE to be part of his UBSR, regardless of whether he has a bet offer on the table or not.

As with an IPE, Jim can enter what we will call a straight, flip or range IQE. A straight IQE is one where Jim enters a figure and also states whether the quantity defined in the bet statement will be greater or less than the figure. A flip IQE is one where Jim enters just a single figure that represents his best guess as to the quantity being guessed at. And a range IQE is one where Jim enters two figures that define a range within which Jim says the quantity will fall.

15f Market Options for Q-bets

Market options for Q-bets are basically the same as those for P-bets. The essential differences between P-bets and Q-bets are in the definitions of price and better price. These differences cause minor differences in the procedures for striking bets. However, these differences are superficial as far as market option for presenting bet offers are concerned. The same situations arise with P-bets and Q-bets, and therefore, the same procedures are employed in enabling people to present P-bet and Q-bet offers. In other words, the three categories of market options remain: the first serve method, auction methods, and the split-the-difference method.

We will define price, price offer and better price for Q-bets, and then give a very brief discussion of how the market options described in section 9 also apply to Q-bets. The discussion is very brief because the procedures for Q-bet market options are basically the same as those for P-bets.

The Definitions of Price and Price Offer in Q-bets

The price in a Q-bet is the Q-guess.

A price offer in a Q-bet includes a price and a user taking a side. In other words, when a user makes a price offer he not only specifies the Q-guess, but also specifies which sides the two parties are to take.

The Definition of Better Price in Q-bets

In a Q-bet, a price is compared to another price from the point of view of a given side. We will give a list of the different Q-bets and what better price means in each.

In a delta bet: If a user chooses Buy, then a second price is better than a first price when $p2<p1$. For example, if Jim offers to Buy at a price of 567, a better price for him is one where Beth offers to let him buy at less than 567. Conversely, f a user chooses Sell, then a second price is better than a first price when $p2>p1$. For example, if Jim offers to Sell at a price of 567, a better price for him is one where Beth offers to let him sell at greater than 567.

In a hybrid bet: If user chooses Higher, then a second price is better than a first price when $p2<p1$. For example, if Jim offers to take Higher at a price of 567, a better price for him is one where Beth offers to let him take Higher at less than 567. Conversely, if a user chooses Lower, then a second price is better than a first price when $p2>p1$. For example, if Jim offers to take Lower at a price of 567, a better price for him is one where Beth offers to let him take Lower at greater than 567.

In a 3D bet and a Winner Take All bet: Recall, in a 3D and Winner Take All bet there are two Q-guesses, one by each opponent. In these bets, a better price for a user refers to the second Q-guess, the Q-guess that is entered by the user's opponent. Thus, if user chooses Higher, then a better price than a given opponent's price is one that is less than that opponent's price. For example, if Jim offers to take Higher at a price of 567, and Beth enters her price of 550, a better price for Jim is if another user offers to take less than 550. Conversely, if a user chooses Lower, then a better price than a given opponent's price is one that is greater than that opponent's price. For example, if Jim offers to take Lower at a price of 567, and Beth enters her price of 580, a better offer for Jim is one where another user offers to take greater than 580.

Basic Striking Procedure in Q-bets

As with P-bets, the basic striking procedure in Q-bets is simple and is the universal method for striking two price offers. There are two essentials to a striking a bet:

a. The two parties presenting offers must have chosen opposite sides.

b. The two parties must offer each other equal or better prices than the parties offered themselves.

For example, in a delta Q-bet, if Jim enters a price of 567 and takes Buy, and Beth enters a price of 547 and takes Sell, then their offers will strike. Where the offers strike—547, 567, or somewhere in between—depends on the market option that applies.

We now briefly discuss the basic market options as they apply to Q-bets.

The First Serve Method

The first serve method for Q-bets is the same as for P-bets except that he stakes do not have to be adjusted to be in proportion to the payoff odds.

(Note: the striking of bet offers with unequal stakes is described in subsection 15g.)

Auction Methods

Auction methods for Q-bets are the same as those for P-bets except that the definitions of better price are different. To repeat, the differences are superficial. In an auction, the system still selects the best price offer above the user's bottom line.

The bottom line in a P-bet was called the minimum price. Rather than say that Jim enters a minimum price in a P-bet, we might say that Jim enters a worst price, the worst price that he will agree to that is. We use the term worst price because minimum connotes that the price cannot be lower than a given price. But, if Jim takes Buy or Higher in a Q-bet, he wants a lower price offer because a lower price is a better price. Thus we say that Jim sets the worst price he will agree to. The system then selects the best price offered him that is greater than the worst price.

Where bidders choose the auction option as well, the same problem remains of how to strike offers when multiple different offers can strike.

The Split the Difference Method

The split-it method is the same except that the price means different things in a P-bet and a Q-bet. In a P-bet the price refers to a probability figure that also is a payoff figure. In Q-bets, the price is a quantity estimate that is also a payoff figure. In a Q-bet, when there is an overlap in two price offers, the bet is struck at (Price1+Price2)/2. The prices, of course, are Q-guesses. As before, an overlap is created when both parties offer each other better prices than they offered themselves initially.

Procedures for having multiple parties use the split-it method are also basically the same with Q-bets and P-bets. The problem of whose offer to strike with whose remains.

15g. Covering Only Part of the Opposing Side's Stake in a Q-bet

In the previous subsections we have assumed that two parties in a bet have agreed to equal stakes. As with P-bets, the CSUB can allow people to strike bets with unequal stakes. The procedure for Q-bets is easier than with P-bets because the system does not have to set stakes in proportion to a payoff odds figure. In the case of Q-bets, the system simply strikes a bet at the lower of two stakes figures and then creates a second bet offer with the remaining stake for the user who entered the larger stake figure.

For example, if Jim offers to bet at stakes of $1 in a delta bet, and Beth only offers to bet at stakes of 25 cents, then the system strikes a bet between Jim and Beth at stakes of 25 cents and creates second offer by Jim that is identical to his first offer except that the stake figure is 75 cents.

Thus, the CSUB can include the following steps for enabling users to strike Q-bet offers where a first party puts more at stake than a second party:

strike the bet at the second party's stake, create a new bet offer, including UBSR, for the first party such that all the terms of the first party's offer are the same those in the struck bet except that the stake is set at:

(the first party's original stake)—(the second party's original stake).

15h. The Secondary Market for Q-bets

The secondary market for Q-bets works the same way as it does for P-bets and G-bets, except for important differences in the quotations of prices. Prices in P-bets and G-bets can be quoted in terms of probability and those probability figures can be converted into expected values.

Expected values do not apply to Q-bets. Thus Q-bets need to be quoted in terms of cash or points.

We do not go in any depth here because the essentials of a secondary market for bet agreements were covered in section 13.

16. The Spectrum

In a conventional market there is what is called the market price. For example, a stock might be selling at a market price of $80. The market price has some wiggle room in it, the spread between bid and ask. But basically the spread, at least in most financial markets, is usually quite narrow. The principle of market price applies to betting markets as well, where the market price is called the line. Here too there is some wiggle room between bid and ask, but again, the spread is usually quite narrow.

In conventional markets it makes no sense to post offers to buy and sell that are far outside the market price. For example, if the market price of a stock is $80, it makes no sense to post an offer to buy or sell at $50. If the line on Secretariat winning the Belmont is 1-20, it makes no sense to post an offer of 1-5. If the line on the Redskins in the Superbowl is +10 points, it makes no sense to post an offer of +6 points. Why not? Because the purpose of conventional markets is sales, transactions; it is not communication. A conventional market, say a stock market, could not care less that someone thinks that a stock is worth $50, when the stock is transacting at $80.

And that is one way that CSUB markets are vastly different than conventional markets. The purpose of the CSUB is to register and display bet offers whether at a current transaction price or not. In other words, the point is to display offers whether those offers are likely to be accepted or not. Moreover, the CSUB enables users to register independent probability estimates and independent quantity estimates. These too can be shown (or kept secret), regardless of the current transaction price range.

G-bets illustrate how the CSUB is a system for registering and displaying offers regardless of whether they are accepted or not. G-bets often will not be accepted because the people who enter them will be sure of their facts. The very non-acceptance shows that the G-bets are reliable guarantees.

While we can never really capture how a community estimates a probability or a quantity (unless the probability is 0 or 1, or the quantity is known), showing the spectrum of offers is far better than showing just a current market price.

Of course, people will usually, though not always, seek a better price from themselves than they think is fair. Therefore, the current market price can still be critical in influencing the spectrum of offers. For example, if Secretariat will win the Belmont Stakes is transacting around 1-20, and Jim thinks that the horse is really a 1-30 shot, he will not offer to take True at 1-25. That's because 1-20 is a better deal. Thus, the market price of 1-20 affects the offer he will enter, at least on True.

Jim may, on the other hand, offer to take False at 1-45 (where False is paying 45-1), even though that is outside the transaction range. His offer to take False at 1-45 will not transact, but that is beside the point; the point is that his offer will be registered and shown. People will often offer bets at prices that are worse for other people than the current market price.

We call the collection of offers and estimates the Bet Statement Market Record, or Market Record for short. We introduce here another name for it, the Spectrum. This name is in contrast to the Line.

The idea of registering and showing all offers-rather than just those in a narrow range where sales are occurring—is simple and significant. It enables the CSUB to show a community's reaction to a given bet statement through the various kinds of information the CSUB registers: the distribution of offers per side of the bet, the times those offers were made, the stakes involved in each, the IPE's and IQE's, who is in the market, how many people are in the market, and the current line, and more. The kinds of statistics that can be developed are too great to be detailed here. Most are not yet imagined. Below we elaborate just a little on how the Spectrum can be informative.

Showing an Individual's Estimate as a Range

The spectrum enables the CSUB to show that individuals often express estimates in a range (which, of course, is the reason for range bets). For example, Jim might state a range on the chances that it will rain. The range might be from 10% to 20%. Thus Jim offers to take True at payoff odds of 10% and False at payoff odds of 20%. We might pretend in this case that the current line is 15%. And so, neither of Jim's offers will, at the current time, cause any bet to be struck. Nevertheless, the offers express Jim's estimate. Likewise with quantity range bets. For example, Jim can state that the increase in the Consumer Price Index next year will be from 2% to 7%. Thus he can offer to take Higher at 2% and Lower at 7%. Let's pretend the current line is 4%. Again, neither of Jim's offers will be transacted at the current time, but they potentially can be at a future time, and therefore they express Jim's opinion.

Showing the Distribution of Offers

The spectrum enables the CSUB to show the distribution of offers for a given bet statement. For example, let us say that a bunch of weather forecasters get together to make bets whether it will rain on the statement, It will rain on October 1. The bets may be submitted by silent auction. When the offer are revealed, the CSUB can display all the various payoff offers submitted. Whether any offers are struck or not is beside the point. The CSUB can show, say, what fraction of forecasters offered 10% or more on True, what fraction offered 11% or more, what fraction offered 12% or more, and so on. Of course there can be actual odds bets, in which case the CSUB can show what fraction of forecasters gave actual odds offers at each percentage between 0% and 100%.

The CSUB can include various functions for doing statistical analyses of the spectrum. A bar graph of the distribution of the odds offers is one of the simplest. The same principle applies, of course, to analyzing the distribution of offers concerning Q-bets. For example, the forecasters might make Q-bets on how many tenths of an inch of rain there will be on October 1. The distribution of offers can then be seen.

Showing How an Individual's Offer Compares With Other People's

The spectrum enables the CSUB to show how Jim's offer compares to other people's and also enables the CSUB to show how well Jim estimates compared to other people. (Here we will switch from Jim to Ted in honor of Ted Baxter.)

Say that a weather forecaster, Ted, picks True and sets an offer of 90% (1-9) on the bet statement, It will rain on October 1. And let's say that 50 people offer to accept Ted's offer. The system registers how many people offer to accept and further registers how many people offer to take Ted's side of the offer.

Let's say that no one offers to take Ted's exact offer and that the closest offer on True is 60%. Well, we see that Ted is bucking the "conventional wisdom." Now if it rains Ted is vindicated, and his win is recorded in his UBSR and, consequently in his UR. It can then be seen, sort of, that he has estimated better than others.

(Actually, it is meaningless to say that a person has given a better probability estimate based on a single trial. Still, we somehow feel that a person who wins a longshot bet has estimated better than the competition, particularly when no one is willing to join him in the original bet offer.)

The situation is a little clearer—though by no means clear—with Q-bets. So let's assume that Ted has also said that there will be more than 0.5 inches of rain and offers to take Higher in a Q-bet with the quantity offer set at 0.5.

Again, let's say that there are 50 people who offer to accept, who offer to take Lower that is. And further, let's pretend that the closest offer in the spectrum on Higher is 0.1 inch. The spectrum reveals that Ted is bucking the conventional wisdom. If it rains more than 0.5 inches, Ted is shown to have estimated better than the crowd.

In plain English, the scenario laid out above is that of a forecaster who is predicting a very high chance of a downpour on October 1, where most people don't even think it will rain. The spectrum allows us to see this in a unique way. With the spectrum, people can see concretely how a given person's estimates differ from those of other people. The same applies to IE's, not just payoff offer estimates.

Certain statistics for a given MR—especially those that show how a user's estimate compares to other people's—can be entered into the user's UBSR. Over a series of bets these kinds of statistics, which are also collected in the UR, can show how a person's judgment compares to other people's.

Display and Search Functions

How is the spectrum to be displayed for a given bet statement? There is no ideal way. A simple way to display the spectrum is in ascending order of offers on a given side of a bet-from the lowest payoff offer for a given side to the highest offer. This applies to P-bets and Q-bets. G-bets can be shown separately. With such a display, the CSUB can easily show Jim what the best and worst offers are for a given side of a given bet statement. However, this way is not necessarily practical given the number of offers that there can be in a given market, and further given the variety of conditions that can be included in offers.

Thus, CSUB can include search function for finding the best offer where the search is restricted by search parameters that can be entered. The CSUB can include functions for finding the most advantageous offer for a given side, and a given commodity, at a given time. Additional parameters can be added for specifying any of the options that have been discussed previously. To give a minor example, Jim can ask to see bets by people who are not betting anonymously. There are, of course, numerous parameters that the CSUB can enable Jim to enter in order to find a bet offer.

17. User Statistics (Statistics Created from an Individual's UBSR's)

As discussed in section 8, all of a user's UBSR's are grouped in a record called the user record (UR). The CSUB uses information in the UR to create statistics for evaluating the user's performance over a series of bet agreements, bet offers, and independent probability and quantity estimates. In this section we describe some useful statistics that can be created and displayed. However, it should be noted that most such statistics are not yet imagined because the CSUB is a novel system for registering information about people's guesses. The point of this section is to show how the CSUB can enable people to use the information that is collected in UR's. We will call statistics created from a UR by the name user statistics (U-stats). As usual, our users will be Jim and/or Beth.

The CSUB can include option buttons for displaying various named U-stats. These U-stats can potentially be accessed from any bet offer Jim makes and through Jim's name. As previously noted, the CSUB also includes an option for enabling Jim to restrict access to his U-stats.

17.1 Examples of User Statistics

The CSUB can include options for displaying statistics such as the ones described below. Of course the CSUB must include means for calculating these statistics as well.

Average Edge Per Bet

The CSUB can calculate Jim's average winnings or losses per dollar or point at stake. This is a simple and potentially useful measure.

Odds Offers, Quantity Offers and Guarantees Compared to the Actual Record

The CSUB can create a plot of the actual results of bets as compared to the odds and quantities offered (including sides taken) in those bets. Let us consider pay-off odds first.

Not only can the CSUB classify bet results according to odds offers and sides taken, but also according to the type of bet (straight, flip or range). The type of bet can be of major importance because Jim's odds-estimates can be very different depending on the type of bet. Jim's payoff odds in an actual odds bet should be a better reflection of his honest probability estimate than the payoff odds in a straight bet. In the case of range bets, the CSUB groups the results for each different odds range that Jim has entered. A range offer is far different than a flip offer and a straight bet odds offer. For example, an offer of 80%–90% in a range bet is very different than an offer of 85% in a straight bet, which is very different than an offer of 85% in a flip bet.

Again, for simplicity in illustrating, let us pretend that Jim has made 40 straight bet offers at payoff odds of 10% taking True in each. The CSUB can show the actual record of those bets that have settled and those that have not. Further, the CSUB can show the record including bets where Jim's offer was not accepted, but where people in the same bet market did settle. Their surrogate settle results can be used (as discussed in section 12).

Let's pretend that of the 40 bet offers that 20 were accepted and settled. Out of these let's say that the settle results were 4 True, 14 False and 2 Undecided. The actual record then for those 20 bets is 20% true. So we see that Jim was conservative in his odds offers—for he offered 10%.

Let's assume that in the additional 20 offers that 10 were never settled but that the remaining 10 were settled by others in the same bet markets. Let's pretend that of these the settle results were 6 True and 4 False—60% true. So, we see that in these cases Jim seems to have been very conservative in his odds offers of 10%.

The CSUB can do a plot showing at each different odds offer what the actual results were, including bet agreements that were settled, not settled and not accepted. Jim will have different numbers of trials at each odds offer figure but that is beside the point; the plot is still made.

The issue of the number of trials is important though in evaluating Jim's performance. One of the problems with splitting out bet results according to individual odds figures is that it is hard to compile a large number of trials at a given figure. For example, Jim may have only made one bet with odds at $^{4}/_{21}$ (17-4) on True, while he might have made a dozen at $^{1}/_{5}$ (4-1) on True. The number of possible offers is of course infinite. A solution would appear to be to take ranges, for example: 50+%–55%, 55+%–60% .... The problem with this is that there can be a magnificent difference in payoffs at different ranges. For instance, the difference between odds of 98% and 99% is just over a doubling of the payoff obligation. There is no great solution to the reality of limited trials.

Now let us take Q-bets. Q-bets come in more varieties than P-bets. Not only are there straight, flip and range varieties, but there are four different kinds of bets where the payoff rules differ. So the CSUB can split out statistics on these four kinds and their straight, flip and range variations.

The CSUB can show quantity offers and plot them against the actual quantities that are found (or not found). As with probabilities, there are many pitfalls involved. It is hard, if not ridiculous, to compare estimates about different things. For example, an estimate of 98 degrees Fahrenheit is different than an estimate of 98 degrees in a triangle and different than an estimate of 98 gumballs. Further, getting a large number of trials at any given quantity is more difficult than with probabilities because the range of quantities is far greater than from 0%–100%.

A potentially useful statistic that the CSUB can keep track of is the average difference between quantities offered and actual quantities found. This statistic can be revealing where flip bets and IQE's are concerned.

For evaluating Jim's performance in Q-bets, another useful statistic is his accumulated record of wins versus losses. Still another useful statistic, especially in delta bets, can be the average margin of victory, with the margin being taken as a percentage of the actual quantity found.

Now let us take G-bets where the payoff offer is a guarantee. These are simpler in many ways, for there is no payoff figure. The most important statistics then seem to have to do with the percentage of Jim's guarantees that are collected on. Other important statistics are those about Jim's retraction rate.

With G-bets it is, of course easier to gather a large number of trials because a G-bet is a distinct kind of bet that can be used whenever Jim want to show that he s sure of some fact (statement).

Statistics About Non-accepted Bets

As noted in section 12, the CSUB can keep track of what percentage of Jim's bet offers are not accepted, and can keep track according to odds offers as well. Keeping track according to the quantity offered is not as relevant with Q-bets. But keeping track according to bet type—straight, flip or range—is important because Jim will normally have different behavior when giving quantity offers in each of these types of bets.

Retraction Statistics

The CSUB can keep track of what percentage of bets Jim has retracted. The CSUB can keep track according to the type of bet. Further it can keep track according to whether the bet is open or struck.

The system can show the odds offers plotted against the bets retracted. Doing this can show if there is a bias in retracting at certain odds offers. For example, a person who offers 1–99 taking True may retract quite often, for that can mean a large payoff obligation, depending on the stakes.

Retraction statistics can be important for showing how confident Jim is about initial bet offers. Retraction statistics can also help Beth who is considering going to the effort of accepting Jim's bet offer. If Jim has a history of consistently canceling bets, this is revealed in retraction statistics, and can show that it is not worth the trouble of betting with him. Retraction statistics can also indicate whether Jim's initial bet estimates are reliable or not.

Opposition Statistics

Keeping statistics about Jim's opposition can be very important. Thus, in a given UBSR of Jim's, the CSUB can register certain U-stats about the strength of Jim's opponent(s). We cannot say what these are exactly, for they have not been imagined yet. The point is that the CSUB can include a field or fields in the UBSR for indicating the strength of the opponent in a bet. The strength of opponents in a series of bets can then tabulated as well. All measures will be flawed, but some indication is often better than none. We see this in football statistics, for example, where an important statistic is the win/loss record of a team's opponent(s). We also see it in the rating of chess players where a player's rating depends on the ratings of the players she has beaten.

Beside statistics for evaluating the strength of the opposition, another important set of opponent statistics that the CSUB can calculate and display are those concerning whether Jim is "bucking the crowd" or "following the crowd." These phrases are vague but they get the flavor across. The idea is that for each UBSR, the CSUB can register, at various times (especially those times when Jim makes an offer), what percentage of market participants are taking Jim's side in the bet, and at how their offers compare to his. What percentage of offers are higher or lower than his? And how many offers are there in the market? Seeing where all other market participants stand at a given time shows where Jim stands relative to those people, of course. If the bets in a given market settle, the system can also show how Jim has done as compared to the other market participants.

Classifying U-stats In Various Ways

To make U-stats more useful, it is best to classify them according to various characteristics. The CSUB can enable users to call all the statistics up at the press of various, named option buttons, each named for a different statistic that is.

The CSUB can classify U-stats according to cash and CP bets. The CSUB can classify U-stats according to P-bets, Q-bets and G-bets. The CSUB can classify U-stats according straight, flip and range bets. All these classifications can be important because Jim's estimating can be very different in each of these different kinds and types of bets.

In addition, the CSUB can enable Jim to enter a subject heading for a each bet he makes. U-stats can then be classified according to subject. Enabling Jim to enter subject labels is important because Jim's record on some subjects might be great and in others poor. To mix all results together with no discrimination among subjects defeats one of the key objects of the invention, which is to allow people to demonstrate expertise in certain areas. With subject headings, other users can see that Jim knows a lot about certain subjects and not much about others.

In both P-bets, Q-bets and G-bets, the CSUB can classify all statistics according to how many dollars or points the user has at stake. There can be great differences in a Jim's estimating behavior (the care he takes) depending on how much there is at risk.

Another important option button that the CSUB can include is one that allows Jim to designate a bet as "On the record" or "Off the record." With on the record bets Jim can be more careful. With off the record bets he can think less about the matter at hand than he does about his bets that "count." If a person's record in bets is an important thing, and if there were no "off the record" option then it would be a big nuisance for people to bet routinely, for they would have to apply their concentration on every bet. Thus the option to classify one's bets as "off the record" can make the system more usable.

17.2 Examples of How U-stats Can Be Used

U-stats can be used in many ways to indicate a person's knowledge (or lack of knowledge) on a given subject. Let us take the example of G-bets, for in some ways they are simplest.

Imagine a 16 year old chemistry buff who takes a drink at her school water fountain and sees a sticker that says, "Certified Lead Free as Defined by the State Safe Drinking Water Act." She gets curious and looks up the regulations in her state and decides to test the water. She performs the experiment in her school's lab and finds that the lead level is higher than allowed by law. So she repeats her experiment at different times of the day and her results all come out in a narrow range, all over the legal level. She decides to publish a report on the level of lead in the water in her school, and she makes a guess about the level at other sites in her city. So she publishes a report and places a G-bet that the lead level is within a certain range at her school, and she defines the measurement process.

Now, let us add one more twist: she has done this kind of thing ten times before, and no one has ever collected on one of her G-bets. Therefore, people seeing her G-bet will have strong reason to believe she is right, regardless of what the water company and fountain maker might say.

Who would you believe more, a person with a Ph.D. who does not back up his statements with bets, or a 16 year old who does, and who has a spotless record in G-bets? What about a Ph.D. holder whose guarantees have failed on several occasions?

Switching examples, imagine a set of weather reporters who not only forecast the weather but make P-bets about it. Now, which weather reporter would you listen to more carefully, the one with the best record in bets or the one with the worst record in bets?

17.3. Using IPE's and IQE's

We should not underestimate the importance of statistics based on IPE's and IQE's which we refer to together as Independent Estimates (IE's).

The methods of creating U-stats based on IE's are basically the same as those based payoff offers. As with payoff offers in P-bets and Q-bets, the CSUB can create numerous statistics concerning the accuracy of Jim's IPE's and IQE's versus the actual results of the bets involved. And further the CSUB can create numerous statistics concerning where Jim stands at given points in time compared to both the market's spectrum of payoff offers and IE's. These statistics can be accessed from named buttons.

The difference between IE's and payoff offers is one of incentives. When entering a payoff offer in a range or straight bet, Jim usually will not give his best estimate, but will try instead to give himself a favorable bet. When entering an IE Jim's incentive is to give his best estimate. Thus IE's can be of great importance in judging Jim's ability to estimate.

IE's are also important because Jim's ability to estimate is not necessarily seen in Jim's winnings or losses. Winnings or losses show how one's guesses compare to one's opponents' guesses, not necessarily how one's guesses compare to the actual record.

IE's are also important because often Jim will not even make a bet offer but will only be making an IE.

IE's point up how different the CSUB is from conventional, automated betting systems. Conventional systems do not have not means for registering IE's because these systems are not meant for communication, for registering a community's uncertainty about bet statements.

18. Communications Options and Aspects

In this section we step back and see how the system can be used as a communications medium. We talk about how the invention combines aspects of several kinds of communications systems. And we elaborate on several communications options disclosed in Part 1. However this section is brief and cannot do justice to the spacious subject of how the CSUB can enable people to communicate.

18.1 CSUB as a Statement Registry/Switchboard

The CSUB can be used as a central registry for supported statements (SS's). When we say registry we mean that people store their SS's outside the CSUB and store references to those SS's inside the CSUB-in the UBSR's of supporting bets. Thus users can locate ordinary statements outside the system through bets inside the system. For example, let's pretend that Jim has written an article for a national magazine and has given many arguments as to why a team candidacy for President would be successful. Okay, now Jim also wants to make a bet on the thesis of his article. So, he enters the bet in the CSUB and enters reference data to his article along with the bet. Now people who find the bet in the CSUB can see the reference and then find the article. Furthermore, people who look at the article can find the bet, assuming that the article has reference data to the bet.

Now, if an SS is stored in an electronic data base other than the CSUB, and if that data base is connected to a "net" connected to the CSUB, and if the contents of the second data base can be accessed from the CSUB, then the CSUB can create an active link, a hypertext link for example, between the bet and the SS. A person "at" a bet can then be switched to the SS and vice versa. In this sense we can think of the CSUB as a switchboard. The CSUB may also display the SS together with the bet.

(Note: It is also possible that the bet statement is not even stored in the CSUB, but only reference data to the bet statement which itself can be stored elsewhere. The full bet statement is simply represented by reference data. We do not go into this possibility but point out that the CSUB remains the apparatus by which the bet is transacted.)

Storing SS's outside the CSUB in connected electronic data bases is a small step technically from storing them inside the CSUB. However, commercially it can make a big difference, for people may want to keep their SS's in their own systems.

This fact is important not only because Jim might want to store his SS outside the CSUB, but because he may be referring to someone else's statement that has been stored outside. That statement may or may not have a supporting bet originally. Just as people routinely reference other people's works, Jim can enter a bet and also reference someone else's work. He might make a bet, for instance, about hurricanes in Florida and cite Bubke's article, "Storms and Global Warming." Bubke's article becomes an SS, in the sense of the CSUB definition—a statement that is linked to a bet or referred to in a bet as being supported by the bet.

If Jim has not authored the SS, then the system registers that fact and displays the fact to users who see the SS. Now if Jim has not authored an SS, then the CSUB does not copy Jim's bet data into the SS or SS record. Only if Jim is the author of both the bet and the SS does the CSUB, if it is physically possible, copy bet data into the SS and or SS record. This principle holds whether the SS is stored inside or outside the CSUB.

Since all statements will not be in the CSUB, clearly the ability to reference and access SS's outside the CSUB from bets inside the CSUB can be a useful feature of the system. Thus, the CSUB can include an option for linking a bet to a statement in another electronic data base. The CSUB can include the following steps for enabling users to link bets with supported statements that are stored outside the system:

input bet (SB) terms and create UBSR, store reference data for linking UBSR to supported statement (SS) record in another data base such that, a. the SB record can be opened by selecting reference data in the SS record, b. the SS record can be opened by selecting reference data in the SB record, and if the user is the author of the SS, such that, data from the SB record is copied into the SS record.

18.2 CSUB as a Library

The CSUB can be used as a library where people can store and find bets and ordinary statements. As with any library, works are given reference numbers, and titles and can be abstracted. A bet statement may be quite lengthy, and therefore it is often useful to abbreviate it and give the bet a title. Most bet statements will not be as short as Dream Team will win the election because of the spelling out of definitions. In fact, Dream Team will win the election is more like a title or an abstract.

Of course, the CSUB can enable users to find full bet statements by title and abstract and reference number. And, of course, reference numbers, titles, and abstracts can be used to refer to supported statements as well. These matters, except the titling and abstracting of bets, have already been discussed. We are just taking a moment to think of the CSUB from the point of view of an electronic library.

18.3 CSUB as a Central Bulletin Board and Mail System

The CSUB can be used as an electronic bulletin board where users post their bets for the community to see. The CSUB can also be used as a mail system for sending bet offers directly to given people. In addition to enabling people to send bets to people, the system can register and display that a given bet has been sent to a given person.

In addition to enabling people to send bet offers, the system enables people to send what we will call challenges. We will elaborate on challenges in order to describe this useful option that the CSUB can include. In describing challenges, we will also illustrate the bulletin board and mail aspects of the system.

A challenge is a bet statement without an odds or quantity offer attached. The system enables Jim to select a Challenge option for entering and sending and posting challenges. When Jim selects this option, the CSUB presents him with a form for entering a bet statement, and any other terms he likes except the payoff offer. The CSUB creates a UBSR because Jim is entering a bet statement. The system registers in the UBSR that the statement is meant as a challenge. When the CSUB posts the bet statement of a challenge, it displays a challenge message along with the statement (this message can be implicit though because the payoff offer is missing). By challenge message we mean that Jim challenges someone, or anyone, to make a bet offer on the statement that Jim has entered.

Now a challenge can include more conditions that just a naked bet statement. It can ask that a certain kind and/or type of bet be made, that certain stakes be pledged, that cash be staked—all the conditions that can be put in a bet offer except the payoff offer. These conditions are all registered in the UBSR, of course.

Challenges can be used in some of the same ways as bets. For example, they can be linked to supported statements. And as noted, the system enables Jim to send a challenge to individual users and show that fact on the public bulletin board. The identities of the targets of Jim's challenge are also registered in his UBSR. Not only does the CSUB show on the public bulletin board who a challenge has been sent to, the system also registers and displays whether any of the people the challenge was directed at have made a bet offer using Jim's bet statement.

For example, Jim can enter:

| Challenge | |
|---|---|
| Bet Statement: | Dream Team will win the election. |
| Stake: | Nothing entered |
| Side: | Nothing entered |

Jim can post this challenge for the community to see, choosing a Post Challenge option that the system can include. Using a Send option that the system can include, Jim can also send the challenge to, say, potential Dream Team members and to the President, daring them to put odds on the statement. The President, presumably, would not want to admit that he would lose to an alternative candidacy, and let's say, would decline to bet. As noted the CSUB can include means for registering and displaying this fact as well.

(A challenge means that Jim enters a bet statement, causing the system to create a UBSR and marking the statement as a challenge. The CSUB can enable users to post challenges that do not have bet statements but are simply ordinary challenges to make a bet offer on a given subject— "I dare you to make a bet on so and so subject." Such challenges can be useful but they are not what we mean when we say challenge. We might call these kinds of challenges by the name vague challenges.)

All the procedures for sending a challenge also apply to bet offers. The CSUB includes steps for registering not only whether a user has received a bet offer but whether the user has responded.

18.4 CSUB as an Improved Newspaper and Bulletin Board System

One might dramatically say that no statement is an island. Statements are usually part of a continuing discussion, or story, or debate. We see this reality tangibly in letters to the editor in newspapers and in the postings on electronic bulletin board systems (BBS's).

The CSUB is a system where a people can carry on discussions-for example, pursuing the subject of an article, adding to it, modifying opinions, and so on. But the CSUB is not like an ordinary newspaper or BBS. It enables people to carry on extended conversations in a new way because of the specificity of bet statements and payoff offers, and because of the transaction of bets.

Let us illustrate with an example. The example is limited because it describes just one hypothetical response to a hypothetical report. Yet it should get across the principle of responding to a given statement and/or bet. Imagine then that a reporter, Smith, has written a story accusing an executive of fraud. And imagine that the executive, Kim, is outraged and suspects that certain witnesses (sources) have been lying about him. Finally, imagine that the executive enters a response, a letter of protest, into the CSUB and supports it with it the following bet offer:

---

1. Bet Statement:

If ten randomly selected lawyers, who are also alumni of the SEC, were to review the facts in my letter of 9/20/96, and in Smith'story, "Executive Suspected of Fraud" (9/17/96), none of the lawyers would say that I had committed fraud as defined by the Universal Commercial Code.
1a. Definitions:

Random selection to be by any mutually agreed on process. Review is defined as however the lawyers want it to be defined up to $50,000 in review costs. (I will fund the review up to $50,000 of the lawyers' time.)
2. Odds: 1–19
3. Side: True
4. Stake: $100,000
5. Independent Probability Estimate: 99+%
6. Cash Challenge Offer: $10,000
7. Cash Challenge Sent To: Jane Q. Editor
8. Counter Bet to: Smith, 9/17/96, News Chroni
9. Supported Statement: Kim, 9/20/96, CSUB
10. Counter Statement to: Smith, 9/17/96, News Chroni

---

To illustrate how the CSUB can be used, we show more UBSR information than just straight bet terms. (Note: We leave out much that we have described previously. For example, we leave out important market statistics that can enable users to see how many people are willing to accept Kim's offer.) We will take the UBSR information above one field at a time, using the reference numbers above.

In 1–4 we see straight bet terms, with Kim picking True. The only new aspect we see above is that the CSUB can enable users to separate the bet statement into the part that is found true, false or undecided, from the part that sets forth the definitions for the first part. We consider these parts together to make up the bet statement, but for the sake of clarity it can be easier to split them out. It can also be more user friendly to have a third part of the bet statement for elaborating on the settling rules and any other provisos of the bet, such as dispute resolution rules.

In 5 we see an IE where Kim states his independent estimate of the chance that his bet statement is true. In this case we imagine that Kim wants to advertise the IE and so has chosen to have it displayed. As noted, the CSUB can include an option for hiding an IE.

In 6 we see that Kim also makes a cash challenge offer. By that we mean that he will pay someone to make a bet offer on the same bet statement. (Cash challenges will be explained further in section 19.)

In 7 we see that the cash challenge is restricted to a single person, Jane Q. Editor, the key editor, we imagine, of Smith's article.

(Smith and Jane Q. may or may not respond to Kim's bet and challenge. Whether they do or not can also be registered by the CSUB and displayed.)

In 8 we see that Kim has labeled his bet offer as a counter-bet to the article by Smith. (See section 6 about counter-bets and counter-statements.) If Kim's offer can be linked to Smith's article , then the CSUB makes Smith's article electronically accessible from Kim's bet offer. (Smith's article may be outside the CSUB and electronically inaccessible.)

(Note, when we say that a counter-statement is linked to another statement or bet, we do not mean that any data is copied from one file into the other. That can only happen when a person is the author of both statements that are linked.)

In 9 we see that Kim has entered an SS, his letter, into the CSUB. The CSUB enables users to open Kim's letter from his bet offer, and vice versa.

In 10 we see that Kim has labeled his SS a Counter-Statement to Smith's article. Again, if Smith's article is electronically accessible, the CSUB can enable users to open Smith's article from Kim's letter.

Figure 15:
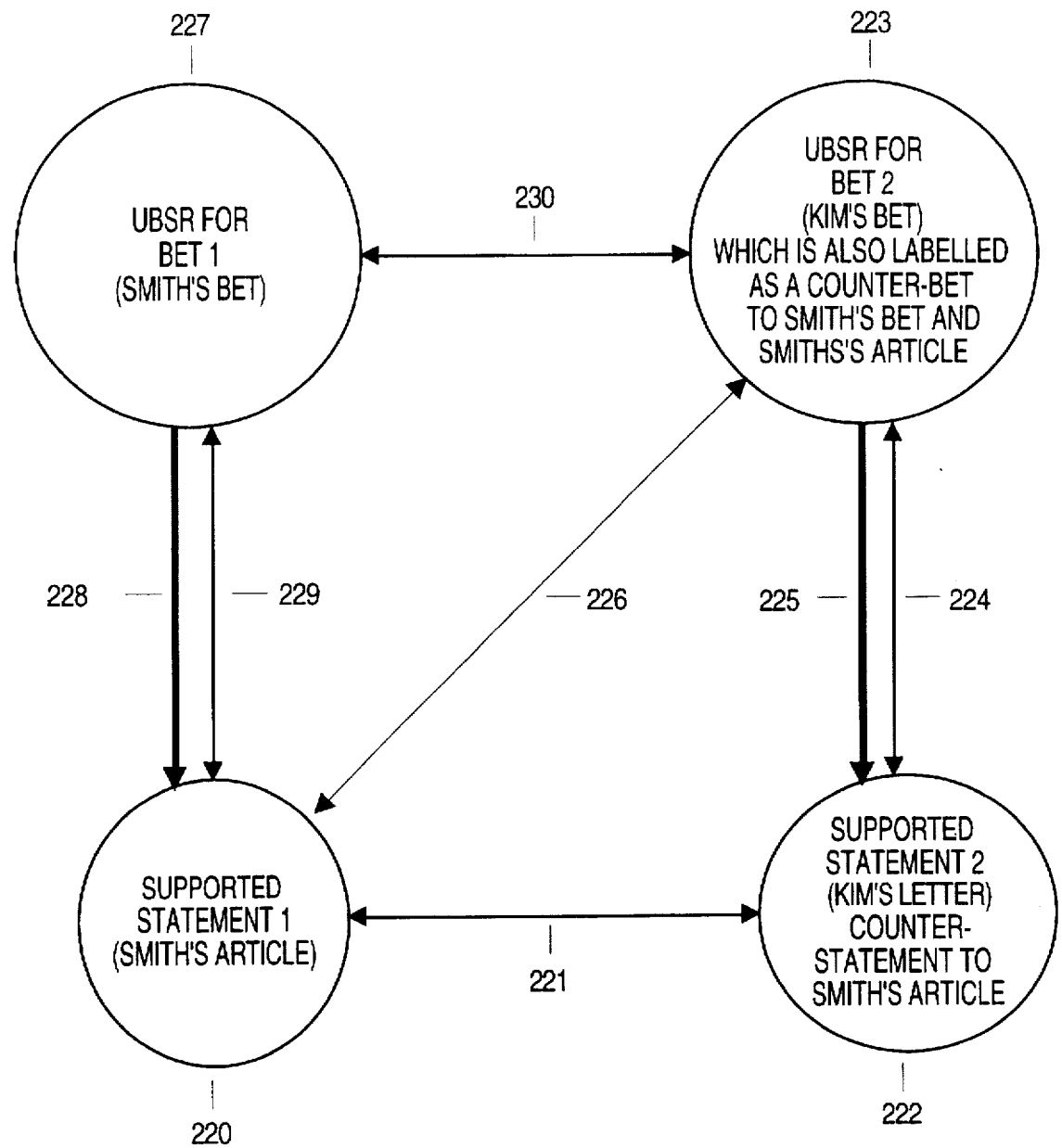
FIG. 15 shows a schematic of bets and counter-bets.

As shown in FIG. 15, we picture Smith's article 220 and a file opening link 221 between it and Kim's letter 222. By file opening link we mean that a user can open one file (record) from another. We see two links between Kim's letter and Kim's supporting bet 223. The first link 224 is a file opening link and the second 225, pictured with a thicker line, signifies that bet data from Kim's supporting bet can be copied into Kim's letter. We also picture a file opening link 226 between Kim's bet and Smith's article.

Just to show the relationships, we also picture, though it is not described above, that Smith has made a supporting bet 227 for his article 220 and that it is linked 228, 229 to his article such that the files can be opened from each other and such that bet data is copied into the article. We also picture a file opening link 230 bet ween Kim's bet and Smith's bet. Kim's bet is labelled as a counter-bet to Smith's bet and Smith's article.

Aside on IPE's and Payoff Odds

We notice here as an aside, that even when a person believes a statement to be true with nearly 99+% confidence, he will not offer a P-bet with odds that reflect that confidence figure. Why? Because, then he would have to bet at worse than 1–99, giving his opponent better than a 99–1 payoff offer. The opponent would have so little at stake that there would be no pain in accepting the bet. So normally, Jim would offer less than his honest estimate in the payoff odds. (Here we are just showing a straight bet. Jim can enter bets with a minimum expected profit margin.)

It is also interesting to note that Jim probably would never want to take False if he was 99%+ sure that his statement was true. So in these cases, flip and range bets are not usually relevant. Minimum expected profit margins and G-bets, however, are relevant and can be important.

Evolving Statement Nets

In many ways, the CSUB is better than a conventional newspaper or BBS because changes in opinion can be seen in bets, counter arguments can be seen in the form of bets, the relationship of one bet to another can be seen, and the relationship of one statement to another can be seen. There can be multiple statements and counter statements, bets and counter bets, involved over time. We might say that an evolving statement "net" can be seen in the CSUB, with the novel benefit that we can see concrete changes in opinion in the form of bet statements, bet terms, independent estimates, bet results and bet statistics.

Further, writers who have messed up will be much more inclined to change their minds if they have bets in the system. Because the CSUB has options for retracting bets, placing a bet is not necessarily a big risk; one simply has to be willing to retract. Indeed, the CSUB can b e seen as a system for readily acknowledging one's mistakes. The CSUB forces upon users the attitude of admitting mistakes, for if one does not admit one's mistakes then, as at a poker table, one literally, as well as figuratively, gets busted.

19. Paying for Attention

Attention is not free in this world. So we often have a problem is getting other people to pay attention to us. A bet offer is a fundamental way of getting people to pay attention to a statement because a bet promises a possible financial reward to someone who accepts the bet. In order to decide whether accepting the bet is a profitable idea, a person has to think about the bet statement, and possibly investigate it.

However, just because one has made a bet offer is no guarantee that anyone will pay attention to it, or to any supported statement attached to it. But what even does it mean to get someone to pay attention? what is it that we want exactly when we say that we want someone to pay attention? Do we want someone to:

a. read a statement carefully,
 b. respond to a statement honestly,
 c. make an honest statement on a subject,
 d. take a certain action concerning a subject?

The problem is not just to get someone to "pay attention" but to get someone to admit that we are right, presuming we have made a good guess about some subject or statement.

The problem is still poorly defined. Nevertheless, in this section we will describe additional ways that bets can be used to get attention paid to a subject or statement. Before getting to the use of bets we digress and discuss the merit of getting people to pay attention to a message by paying those people to read the message.

Digression: Reverse Postage Stamps

One simple way to get attention to what you say is to pay people to read what you have written. Even a small payment can distinguish one's message from "junk mail." Thus the CSUB can enable Jim to send messages—bets and SS's—with a reverse postage stamps appended. A reverse postage stamp is a check that can be cashed by the recipient, call her Beth. This method can also be useful for screening mail according to friendship since there can be an understanding that a postage stamp from a friend is not to be cashed.

Stamps can come in any denomination, even fractions of a cent. Small amounts can be paid by an expected value payment method (U.S. Pat. No. 5,269,521) or can be accumulated in an account. E-mail can also be screened according to the amount on the stamp. Thus, if one has an important message one might put a larger stamp on one's message.

The problem with reverse postage stamps is that there is no guarantee that Beth will read the E-mail. She might just cash the stamp. Bets offer certain ways around this problem.

The Case of Dr. Don Francis

To illustrate how bets can be used together with payment offers to get attention, we will consider that case of Dr. Don Francis. Dr. Francis was a noted immunologist and epidemiologist at the Centers for Disease Control in the 1970's and 1980's. He was among the first to understand the threat of the AIDS virus and was one of the earliest and most forceful advocates for the mandatory testing of blood donors. He was opposed by gay groups, by the blood banking industry, and by politicians. These groups used poor statistics and an inadequate knowledge of the situation to justify not forcibly testing donors.

Though he struggled hard to get the blood banking industry to institute mandatory testing, he was unable to do so. The lack of testing caused tens of thousands of deaths, especially among hemophiliacs. The question is, how could Francis have gotten his message through, how could he have forced the blood banker's to think the problem though properly, and how could he have forced others to confront the problem?

The Missile Missive

Let us pretend that Dr. Francis (Don) tries to interest Mike Wallace (Mike) in doing an expose about the threat to the nation's blood supply of a mysterious virus. Why should Mike listen?

Well what if Don sends his case in the form of a paper and sends it along with a bet offer that has a lock-in provision, meaning that Don cannot retract his offer. Now Mike knows that he, or one of his staffers, can make a bundle if Don is wrong, and so he sees it may be worthwhile to investigate, if only to prove Don wrong.

Let's say that Don's bet is the following:

| Bet Statement: | 5,000 hemophiliacs will be diagnosed with AIDS by the year 1988. |
|---|---|
| Odds: | 75% |
| Side: | True |
| Stake: | $50,000. |

Further, let us say that Don offers to pay Mike $5,000 to read Don's paper, provided that Mike accepts the bet. The catch is that if Mike does not accept the bet, he does not get the payment. Now, if Mike investigates and finds that Don may be right, then Mike will not want to accept Don's bet. Don's point will be made; his message will have gotten through.

Of course, whether it gets through or not actually depends not only on how much Mike may make in the bet, but on several cost and factors: how much Mike values his time, how much it costs to test the bet statement, how much it costs to investigate whether the bet is favorable or not. Do we pay attention? Well, it depends on these kinds of costs.

Though a bet offer alone may entice Mike to investigate, Don's offer to pay extra money to have Mike read Don's paper gives Mike a greater incentive to read the paper, and, further demonstrates that Don believes the opinion crystallized in the bet offer.

We call this technique of paying for attention the missile missive because it is way to get a letter through the defensive screens of people. Of course it will not work every time. The missile missive imposes a cost upon the reader. It is not a free offer to pay someone for reading something. That's why it can work where a straight offer to pay cannot. It enables a sender, Don, to offer to pay a lot of money to a recipient, Mike—as long as Don's bet offer includes a large stake as well.

The missile missive method can be automated within the CSUB. A sender, Don, can choose the Missile Missive option to send a missile missive to a recipient, Mike. The CSUB can then:

1. enable Don to send Mike:
   a. a bet offer with a lock-in provision.
   b. a supported statement.
   c. an offer to pay Mike a given amount to read the supported statement. provided that Mike accepts the bet.
2. create a UBSR and register whether Mike accepts the bet.
3. if Mike accepts the bet, transfer the given payment amount from Don's account to Mike's account. (The system can reverse the payment if Mike pulls out of the bet. But, we assume that if Mike accepts the bet that the bet is sealed.)

The Cash Challenge

Now let us pretend that Don wants the leaders of the gay community and the blood banking industry to acknowledge that the nation's blood supply may be contaminated by a yet unidentified virus. In other words, he wants them to admit that he is right about the threat of the virus. So, he crystallizes his position in a bet, say the bet above.

(Rather than think of a group of leaders let us just say that there is one leader.)

Let us say that the leader refuses to accept Don's bet, saying, he does not have the time to look into Don's bet offer. Let's further pretend, for the moment, that Don is not a noted scientist but is a Joe Shmo, so that the response of the leader is entirely reasonable. He cannot look into every bet offer that every Shmo proposes to him.

One recourse that Don then has is what we will call a cash challenge. We use this name to distinguish it from a challenge, which was discussed in section 18. In a challenge, Don enters a bet statement and then challenges someone else to put odds on the bet statement and to pick a side. In a cash challenge Don offers to pay someone (in this case the leader) to put odds on the bet statement and pick a side at a certain minimum stake.

By offering to pay the leader to make a bet offer Don has changed the economics of the pay attention equation for he has offered to pay the leader for the time spent considering Don's bet statement. Of course, whether the leader will pay attention, or whether he will be expected to pay attention, depends on how much Don offers to pay. So, let us say that Don offers the leader $10,000 to put odds on Don's bet statement. In a cash challenge, Don will also specify the minimum stake that the leader must put up. That's because if Don is offering to pay, he must make the bet acceptance cost something that is potentially greater than the payment offer. For example, if he offers to pay $10,000, and the leader makes a bet offer with stakes of $1,000, then the leader automatically will profit by at least $9,000. Thus Don needs to set a minimum stake figure that is greater than the amount Don offers to pay.

If Don offers a substantial amount of money, it becomes difficult for the leader to refuse to make a bet offer, or a statement of ignorance in which he says, "Look I don't know about this bet statement so I'm not going to make a bet offer." This admission can be crucial for it changes the leader's position from one of, "I don't think the AIDS virus is a threat to the blood supply," to "I don't know, it may be a threat."

A cash challenge can be automated within the CSUB. The CSUB can include a Cash Challenge option. A sender, Don, can choose this option to send a cash challenge to a recipient, the leader. The CSUB can then:

1. enable Don to send the leader:
   a. a bet statement,
   b. a payment amount to be paid if the leader makes a bet offer using Don's bet statement.
   c. a minimum stake figure for the bet offer.
2. the system:
   a. creates a UBSR.
   b. displays the cash challenge.
   c. registers whether the leader makes a bet offer using the bet statement and minimum stake.
   if so, display s that the Cash Challenge is accepted and shows the leader's offer, and transfers the payment amount from Don's account to the leader's account.
   if not, displays that the Cash Challenge is not accepted.

Vague Cash Challenge

Now the leader may try to escape Don's clutches with the excuse of "I'm not going to get in a bet about Don's rigged bet statement." So Don can issue a vaguer cash challenge that the leader make a bet offer on the general subject that concerns Don. In other words, Don offer the leader money to formulate his own bet statement and bet offer.

Normally, Don would agree to pay the cash challenge amount with the proviso that the leader comes up with a mutually acceptable bet offer. (Don may instead designate a judge who can rule on whether the leader's bet statement is reasonable given Don's request.)

In a vague Cash Challenge the system can display the challenge but cannot automate a payment process on Don's behalf. It can however transfer payment upon Don's approval.

Currently we cannot pay someone to make a statement because that statement could be mush. A bet offer is a statement that imposes a cost upon the stater and, therefore, we can feasibly pay someone to make a bet offer. The offer to pay someone to come up with a bet is a useful communication device because it can show that a person does or does not want to face a subject squarely. If a person refuses to come up with a bet even though that person has been offered a large sum of money to do so, then the person probably does not want to face the bet subject squarely.

20. Miscellaneous

In this section, we very briefly mention a few aspects of the system that can greatly influence how the system is used.

Usage Fees

The CSUB, of course, can charge usage fees.

Secret and Anonymous Bets

As noted, the CSUB can enable users to place and accept bets secretly. The CSUB can include an option button for designating that a bet offer and struck bet are to be kept secret, non-displayed to the public that i s. An Acceptor then must be authorized (have a PIN given by the Placer). The option to have a bet be kept secret can be a useful feature because Jim may not want others to know about his bet. Public knowledge of the bet may affect the outcome or have some other cost. For example, if a lawyer, say Beth, makes a public bet about the guilt of her client, then that can affect the defense of the client. But, if the bet is secret that may enable Beth to still state an opinion through the CSUB such that the opinion is recorded to be part of her UR, and such that it can be displayed to selected people authorized by Beth.

A previously mentioned alternative to a secret bet is an anonymous bet. There are, of course, many reasons that Jim might want to be anonymous in a bet. For example, a publicly stated opinion in a bet might threaten his position in an organization. Thus, the CSUB can include an option button for designating that Jim's identity is to be kept anonymous. Through this means Jim can have all information concerning his bet registered, while not worrying that his opinion is public. An anonymous bet is different from a secret bet in that the bet information (except Jim's identity) is publicly displayed. The CSUB identifies Jim as "anonymous" for the purposes of displaying the bet and classifying the bet information in the MR and UR.

Margin Requirements

Margin requirements mean how much a bettor has to put up to be held by the CSUB (though there could be another escrow agent) before a struck bet settles. A margin requirement may be zero, where bettors trust each other or where points are wagered. If the history of conventional financial markets is any guide, margin requirements will have a large effect on how people use the CSUB for cash bets.

Situations in the CSUB can be very different from those in financial markets though because in the CSUB many bets will have no definite settle date. This is also the case for many financial instruments, such as stocks, but still, in the case of a bet the "time of reckoning" can be especially far off and indefinite. For example, if two oceanographers bet on the depth of the ocean at a particular longitude and latitude, the bet might not be settled for years, if ever. It is unreasonable then, and probably unfeasible, to have all or part of their stakes held until the bet settles.

Naturally, we can make no rules about margin requirements that will apply well to all situations. One solution that the CSUB can include is to have a margin option that can be applied to a bet offer. By this we mean that the CSUB can include a field in the UBSR for specifying the margin requirement. (There can be another field for designating the escrow agent.) If Jim fills in this field then the margin requirement becomes part of the bet offer so that if Beth accepts the offer, she is also accepting the margin requirement.

The CSUB can automate the margin process by deducting the margin amounts from Jim's and Beth's accounts when the bet is struck, and holding the amounts in escrow until the bet settles. The system can also enable Jim to set a future date when the margin is due. In other words, the margin requirement may not be due at the time the bet is struck, but at some other time, specified by Jim and agreed to by Beth. The CSUB, if it is the designated escrow agent, can deduct the specified margin amounts at the specified time.

Experiment Field

In order to settle a bet, an experiment must be carried out. The result must be found out by some operations, that is. The actual conditions of this experiment might be fully described by the bet statement. For example, in a bet on a football game, the game is the experiment. However, for many bets, the exact details of the experiment will have to be arranged and will not be fully specified in the bet statement.

The CSUB can enable Jim and Beth to enter the specifics of the experiment to be conducted. The experiment may be real or proposed. For example, to settle their bet, Jim and/or Beth may arrange to measure the depth of the ocean at a certain place and time by a certain method. The place and method may be specified in the bet statement. But the actual time and the people doing the experiment might have to be arranged.

It can be useful for Jim and/or Beth to display the actual or proposed actual experiment so others can be witnesses, and so that others can possibly cooperate in the funding of the experiment. Thus, the CSUB can include a field in the UBSR for describing the experiment that Jim and/or Beth propose and possibly execute.

Who Funds the Experiment

A bet is a means for proposing an experiment, a test. Sometimes the results of the experiment will be cheap to obtain because someone will already have been doing the tasks necessary to reveal the result. For example, if a bet is on the inflation rate as defined by the rise or fall in the CPI, then the US government will have done the work necessary in tabulating the CPI.

But often a bet will not be so easily settled. For example, if a bet is about the average wind speed at the top of Mount Tenley, as measured from the roof of Tenley Point, every hour, for the month of November, well that bet implies an expensive test. People can make all the bets they want about the speed, as measured this way, but it will cost a lot to find the result.

If Jim is willing to fund all or part of a test for settling a bet his willingness can be important for evaluating his bet offer. Previously we used the hypothetical example of an executive who felt he was libeled and who offered to fund the test that was described in his bet statement. In that example we imagined that the executive was willing to fund the test up to $50,000. The fact that he is willing to spend $50,000 on the test—in addition to the stake he puts up-affects one's interpretation of the executive's total statement. By total statement we mean his odds offer and his IPE and his supported statement.

One crude way to see the effect is to calculate an "effective" odds figure, which shows what his odds offer is when the cost of the test is added to his stake. When we say added we do not mean that the opponent can win the cost of the test, but that there is an additional amount that the executive has at risk. The stake plus the testing cost equals the total amount at risk. This total is fundamental to whether a bet is settled or even offered.

Of course, both parties in a bet can fund the test. In fact, some or all the participants in a given bet market can fund the test. If this is to happen, the parties have to agree on a given test that will be done to settle the bet. The description of this test can be stored in an experiment field of one or more of the UBSR's in the market. The description and can be designated by the participants in the market. In order for the identification of a particular test to be made easy, the CSUB can enable users to post proposed tests. Users can see the postings and possibly choose to support a given test.

The CSUB can include means for registering commitments to a particular test from any number of participants in a market. Thus the system can include a Funding option button which Jim can press to:

1. identify a proposed test,
2. commit to funding that test up to a certain amount of money and,
3. specify the time period that the commitment lasts.

These facts are registered in standard fields in Jim's UBSR. The CSUB can total up user commitments and can hold all the money in escrow.

A funding commitment is something that the CSUB cannot usually monitor, but usually can only display. The terms of the commitment can be spelled out in a comment field, while the amount can have its own field. Further, as noted, the CSUB can calculate and display an effective odds figure based on the funding amount that Jim enters.

Rules for retracting such commitments can vary and can be the same as those for retracting a bet offer. In this sense, the CSUB can take the transactional step of rejecting an attempt to retract a commitment where a sealing deadline has passed.

As noted above, one important transactional step the CSUB can take is to deduct Jim's funding commitment from his account and hold it in a pot made up of funds from all the parties who have made commitments. Because commitment terms can vary so widely, this transactional step also needs to be designated by Jim.

As an important acceptance condition of a bet, Jim can specify that any Acceptor must fund a certain portion of the test cost. The CSUB then can include a Funding Condition option so that Jim can spell out in the UBSR what the funding obligations are of parties in the bet. This special acceptance condition can be quite important for it may be of no use for Jim to get into a bet with someone who will not contribute to the costs of finding out the result of the bet.

The topic of the funding of tests goes to the heart of the CSUB as a communications medium and a machine for gathering knowledge (answers) and for stimulating the search for knowledge. The topic is especially relevant when the CSUB is incorporated into a second, larger system, AC, which has been described in another patent application. Unfortunately, there is not time to go into these matters in any depth.

21. Appendix: Venture Capital Bets

The method described here requires a divisional application, for it does not concern statement bets. It is a registration and auction system for a particular kind of investment agreement, which we call a venture capital bet (VCB). VCB's do not only apply to venture capital situations; they can be used for financing in general. However, it is in "high risk" situations where the advantages of VCB's seem greatest.

To introduce VCB's, let us consider that case of Ken Olsen, a legendary entrepreneur, and Georges Doriot, a legendary venture capitalist. Olsen founded Digital Equipment Corporation (DEC), and built it into the third largest computer maker in the world with sales of over $10 billion. He founded it in 1957 with $100,000 supplied by Doriot's firm, American Research and Development (ARD). ARD took about 77% of equity while Olsen and his partner got about 23%. Olsen pulled off one of the great management feats of the 1960's and 1970's, as virtually every computer maker founded in the 1960's had failed by 1980. Many feel that Olsen should not have had to give up so much equity. Under a VCB, he would have had to give up no equity.

In the discussion below we will call the two characters Ken, for the entrepreneur, and Dors, for the investor. We will call the investment agreement a VCB. We will call the entity to be invested in DEC.

Unlike conventional investment agreements, such as a loan agreement or a stock agreement, a VCB is explicitly based on the probability that an investor will get his investment plus a profit back. The price of a VCB deal is quoted explicitly in terms of a probability and a corresponding X-1 payoff. Thus, Dors can just say, "Well, I think DEC is a 15-1 shot to hit big so I'll ask for a 20-1 payoff." And Ken can say, "Well, I think DEC is a 15-1 shot to hit big, so I'll offer a 20-1 payoff." Of course, Ken and Dors may disagree on the probability of success and on the deserved payoff.

Further key differences between VCB's and other investment agreements have to do with the rights that Dors has to his payoff and the limitations that Ken has in getting money out of DEC. In a VCB Dors does not have the rights of a debt holder in the sense of receiving fixed payments at fixed times. And Dors does not have the rights of a stockholder in the sense of owing a share of a company. What Dors has is a lien holder's right to get the payoff amount before Ken receives more than a certain amount of money from DEC.

As an example, Dors might invest $100,000 at 20-1. Thus Dors expects to get back a total of $2,100,000, made up of his initial investment and the profit. Now Ken is forbidden from realizing any personal profit from DEC until Dors gets paid. There can be numerous provisions specifying what kinds of money Ken can transfer out of DEC and what kind of deals Ken can strike with other investors, but the point is that Dors is a lien holder.

A typical lien holder has the right to be paid by a given time. In a VCB agreement there may be no specific time for payment. The key restriction on Ken may simply be that he makes no money until Dors is paid. (Of course there can be many variations. There may be a deadline set for paying the payoff amount. For example, Dors may be able to have his investment converted into stock at a certain time, if Ken has not paid off.)

Now, there can be many things factored into the ultimate payoff offer, and it can be chopped up with numerous provisions. There will, for example, be provisions concerning partial payments where Ken can only pay Dors part of the full payoff amount. But the basic idea is that a return is quoted as a bet stake and a corresponding payoff amount.

Note: We have left interest rates out of the discussion so far, yet they can play a major role in the pricing of VCB'S. That role will be explained a little later below.

21a Essential Data Fields for a Computer System for Registering VCB's

An automated computer system for registering VCB's enables Ken and Dors to post the terms of VCB offers and to post the assumptions behind those terms. We describe the essential data fields necessary for the posting of offers and then describe additional "assumption" fields. We will, for simplicity's sake, say that Ken is posting an offer. We will call the registration and auction system simply by the name "the system."

Field 1: The Stake Sought

Here Ken enters the amount of investment funds, the stake, he seeks.

Field 2: The Lien Terms

Here Ken spells out the terms for paying back the stake plus the profit, together which make up the payoff amount. We call the terms "lien terms" because they spell out who has rights to money that DEC generates. The idea is that Ken restricts the money that he and his associates can get until Dors gets paid. Among other things, Ken can list his and DEC's other lien holders and their order of priority in getting paid.

Field 3: The Payoff Field (also called the Multiplier Field)

Here Ken enters the payoff amount he agrees to pay for his stake. Ken may also state the payoff as a multiple of the stake. Thus a single number, X, (not necessarily an integer) can be given as the payoff. For example, if Ken asks for a stake of $100,000, he can offer, say, 11.5, as the payoff amount—where he offers to pay back a total of $1,150,000.

The system can also enable Ken to enter a "make best offer" message instead of a payoff figure. This message signifies, of course, that Dors is to make an offer.

21b Assumption Fields

The fields above define the essential terms of a VCB. The system can also enable Ken to post reasons why he has offered those terms. Thus the system can include various fields where Ken can describe his assumptions.

Field 4: The Probability Field

Here Ken gives his probability estimate that Dors will receive the payoff amount. This estimate is the basis of the payoff multiplier but not the only basis. As we'll see, interest rate assumptions can be factored into the payoff amount.

Field 5: The Time Field

Here Ken gives his estimate as to when Dors will get the payoff amount.

Field 6: The Base Interest Rate

Here Ken gives the base interest rate that is built into the payoff figure. What do we mean that a base interest rate is built into the payoff offer? Well, we assume that Dors evaluates an investment according to the logic of present discounted values. Thus Dors expects at minimum to receive the current "risk free" interest rate for his investment. We might assume that this rate is the current treasury bill rate for a certain maturity date. Dors expects to make that rate as a base.

Thus the stake, say $100, is $100 with the compounded interest added. Let us assume that the period of the investment is 4 years and that the base interest rate is 5%. Dors then expects to receive a minimum of $121.55 by the end of the 4 year period. We will call the stake and compounded interest rate by the name the BASE.

So, Ken must be able to offer Dors an expected value that is at minimum equal to the BASE. The probability that the investment will hit big is multiplied by the payoff amount to yield the expected payoff. This expected payoff must be equal to or greater than the BASE: (Payoff amount) x (probability of success)>BASE.

A way for Ken to calculate the payoff amount then is to use the probability of success as a multiple of the BASE. When we say multiple we mean that the reciprocal of the probability is multiplied by the Base. For example, if the chance of success is 10%, then a fair bet is one where the multiplier of 10x. Thus a fair payoff amount is 10 times the BASE.

Field 7: The Expected Interest Rate

Of course, Dors may want to receive an expected return that is greater than the base interest rate. Therefore, Ken may have to offer a payoff amount that equals an expected return that is greater than the BASE. The system can include a field where Ken gives the expected interest rate.

This expected interest rate is the result of:

1. discounting the payoff amount by the probability of success and, 2. finding the interest rate that discounts the discounted figure so that the discounted figure equals the stake.

For example, if the payoff amount is $100,000 and Ken thinks that the chance of success is 10% then he thinks the expected value of the VCB for Dors is $10,000. Now, assuming he thinks payback will occur in 4 years, and assuming he is asking for a stake of $5,000, then the expected interest rate is about 19% (119% to the fourth power is 2.005.)

In other words, the formula is:

(The Stake)x((1+Interest Rate) compounded until the time of payback))=(the probability of success)xPayoff Amount.

We call the interest rate in this formula an expected interest rate because it relies on the probability of the investment working out. Of course, the expected interest rate also depends on the estimated time of payback.

Field 8: Miscellaneous Payoff Possibilities

What messes up the assumptions above is that often Ken will not be able to fulfill the full payoff amount obligation but may be able to make partial payments. To guess the value of a VCB deal, one must take into account the possibilities of partial payments and the times of those payments. Thus the VCB registration system can include a field where Ken explains the expected value of partial payments and explains how those are factored into the payoff amount (if they are factored into the payoff amount).

Field 9: The Story Field

Here Ken can give the reasons he thinks all the numbers in the previous fields are reasonable.

21c Transaction Functions

In addition to posting VCB offers, the system can enable users to strike deals. Thus Dors can accept a deal that Ken posts or vice versa. The system can register the acceptance as a valid contract, assuming that the system include authentication means.

More important perhaps, the system can enable Ken to auction his VCB offer to the highest bidder in an initial public offering. Thus the system can enable Ken to post an offer and set a deadline for bids. The system then registers payoff amount bids from various investors. The system selects the lowest bid offered by the deadline and registers the striking of a deal between Ken and the investor who offered that amount. The auction can be open or silent. This automated auctioning of a VCB is new way to present and strike an investment deal.

I claim:

1. A communications apparatus for the automated transaction of bets over a network, said apparatus comprising in combination, a computer including input/output means, memory means, processing means, and program means, said apparatus holding a central data base and connected to a network of input/output terminals, said program means directing the operation of said apparatus, said program means directing said apparatus to enable users to choose from among several modes for entering information into said central data base, including:

a user account mode for enabling a user to establish a user account in said data base, a search mode for enabling a user to search said data base, a placing a bet mode for enabling a first user to enter a bet into said data base, an accepting a bet mode for enabling a second user to accept said bet, a changing a bet mode for enabling either of said users to change said bet and, a settling a bet mode for enabling said users to settle said bet;

when a user chooses said user account mode, said program means directing said apparatus to execute the steps of:

creating a user record for identification data, contact data, billing data, credit/debit data, bet data, and bet result data, creating a user identification number (PIN) and storing it in said user record, outputting said PIN to said user, inputting and storing said user's name, contact, billing, and credit/debit data in said user record;

when a user chooses said search mode, said program means directing said apparatus to execute the steps of:

inputting search parameters for a bet, checking to see if a bet matching said parameters is in said data base,
- if said bet is not found, outputting a message saying that no such bet is found,
- if said bet is found, outputting the bet;

when a user chooses said place a bet mode, said program means directing said apparatus to execute the steps of:

creating a user bet statement record (UBSR) for storing data for a bet, storing the user's PIN in the record to identify said user as the Placer of said bet, inputting and storing in said record a bet statement, inputting and storing a designation that the Placer is making a guarantee (G-bet), inputting and storing in said record the type of commodity being bet, inputting and storing in said record the amount at stake, inputting and storing in said record an acceptance fee, inputting and storing a designation of the divide the pot method, inputting and storing an identifier identifying a beneficiary account for the acceptance fee, inputting and storing the necessary to accept the G-bet, inputting and storing a deadline for acceptances, outputting the information stored in said bet UBSR;

when a user chooses said accept a bet mode, said program means directing said apparatus to execute the steps of:

inputting search parameters for a bet, finding said bet, creating a UBSR for the user, called an Acceptor, outputting the identity of each Acceptor, outputting how many Acceptors there are, if the deadline has expired, stopping the inputting of acceptances, dividing the acceptance lee by the number of Acceptors, yielding an Acceptor's Share of the Fee, deducting the Acceptor's Share of the Fee from each Acceptor's account, crediting the beneficiary account with the fees deducted from each Acceptor's account;

when a user chooses said settle a bet mode, said program means directing said apparatus to execute the steps of:

inputting search parameters for a bet, finding said bet, checking said user's PIN to see if said user is either the Placer or Acceptor,
- if no, outputting a message, "You are not authorized to report a result,"
- if yes, receiving an input for a judge or a bet result, if said input is for a judge, sending a message to a CSUB judge, if said input is a bet result,
- storing the result in the bet record under the user identified by the PIN,
- checking to see if results have been entered by both Placer and Acceptor,
- if no, alerting the other party of said stored result,
- if yes, checking to see if results match,
    - if the results do not match, alerting both parties of the clashing results,
    - if the results match, storing the matching result in the bet and users' records, alerting the Placer and Acceptor that bet is settled,
    - if the matching result is "Undecided," declaring neither party the winner,
    - if the bet settles in favor of the Placer, registering the result in the Placer's and in each Acceptor's UBSR,
    - if the bet settles in favor of the Acceptors,
    - dividing the Placer's stake by the number of Acceptors, yielding a Share of the Stake,
    - deducting the stake form the Placer's account and add the Share of the Stake to each Acceptor's account,
    - registering the result in the Placer's and each Acceptor's UBSR.

* * * * *